(12) United States Patent
Kondiles et al.

(10) Patent No.: US 12,118,402 B2
(45) Date of Patent: Oct. 15, 2024

(54) UTILIZING KEY VALUE-BASED RECORD DISTRIBUTION DATA TO PERFORM PARALLELIZED SEGMENT GENERATION IN A DATABASE SYSTEM

(71) Applicant: Ocient Holdings LLC, Chicago, IL (US)

(72) Inventors: George Kondiles, Chicago, IL (US); Donald Scott Clark, Chicago, IL (US); Alexander Neben, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/540,004

(22) Filed: Dec. 14, 2023

(65) Prior Publication Data

US 2024/0118939 A1  Apr. 11, 2024

Related U.S. Application Data

(63) Continuation of application No. 16/985,957, filed on Aug. 5, 2020, now Pat. No. 11,880,716.

(51) Int. Cl.
| | |
|---|---|
| *G06F 9/50* | (2006.01) |
| *G06F 16/901* | (2019.01) |
| *G06F 16/906* | (2019.01) |

(52) U.S. Cl.
CPC ........ *G06F 9/5066* (2013.01); *G06F 16/9027* (2019.01); *G06F 16/906* (2019.01)

(58) Field of Classification Search
CPC .. G06F 9/5066; G06F 16/9027; G06F 16/906; G06F 16/24557; G06F 16/24532
See application file for complete search history.

(56) References Cited

U.S. PATENT DOCUMENTS

| | | |
|---|---|---|
| 5,548,770 A | 8/1996 | Bridges |
| 6,230,200 B1 | 5/2001 | Forecast |
| 6,633,772 B2 | 10/2003 | Ford |
| 7,499,907 B2 | 3/2009 | Brown |
| 7,908,242 B1 | 3/2011 | Achanta |

(Continued)

OTHER PUBLICATIONS

A new high performance fabric for HPC, Michael Feldman, May 2016, Intersect360 Research.

(Continued)

*Primary Examiner* — Sisley N Kim
(74) *Attorney, Agent, or Firm* — Garlick & Markison; Katherine C. Stuckman; Bruce E. Stuckman

(57) ABSTRACT

A record processing and storage system is operable to receive a set of records for storage. The set of records are included in a plurality of pages stored by a page storage system, and each page of the plurality of pages includes a plurality of records in the set of records. Key value-based record distribution data is generated for the set of records based on a plurality of cluster key values of the set of records. A cluster key domain spanned by the plurality of cluster key values is divided into a plurality of key space sub-intervals based on the key value-based record distribution data. The set of records are segregated into a plurality of row subsets corresponding to the plurality of key space sub-intervals. A plurality sets of segments are generated by processing the plurality of row subsets in parallel.

20 Claims, 55 Drawing Sheets

(56) References Cited

U.S. PATENT DOCUMENTS

| | | |
|---|---|---|
| 2001/0051949 A1 | 12/2001 | Carey |
| 2002/0032676 A1 | 3/2002 | Reiner |
| 2004/0162853 A1 | 8/2004 | Brodersen |
| 2008/0133456 A1 | 6/2008 | Richards |
| 2009/0063893 A1 | 3/2009 | Bagepalli |
| 2009/0183167 A1 | 7/2009 | Kupferschmidt |
| 2010/0082577 A1 | 4/2010 | Mirchandani |
| 2010/0241646 A1 | 9/2010 | Friedman |
| 2010/0274983 A1 | 10/2010 | Murphy |
| 2010/0312756 A1 | 12/2010 | Zhang |
| 2011/0219169 A1 | 9/2011 | Zhang |
| 2012/0109888 A1 | 5/2012 | Zhang |
| 2012/0151118 A1 | 6/2012 | Flynn |
| 2012/0185866 A1 | 7/2012 | Couvee |
| 2012/0254252 A1 | 10/2012 | Jin |
| 2012/0311246 A1 | 12/2012 | Mcwilliams |
| 2013/0332484 A1 | 12/2013 | Gajic |
| 2014/0047095 A1 | 2/2014 | Breternitz |
| 2014/0136510 A1 | 5/2014 | Parkkinen |
| 2014/0188841 A1 | 7/2014 | Sun |
| 2015/0205607 A1 | 7/2015 | Lindholm |
| 2015/0244804 A1 | 8/2015 | Warfield |
| 2015/0248366 A1 | 9/2015 | Bergsten |
| 2015/0293966 A1 | 10/2015 | Cai |
| 2015/0310045 A1 | 10/2015 | Konik |
| 2016/0034547 A1 | 2/2016 | Lerios |
| 2018/0285414 A1* | 10/2018 | Kondiles ............... G06F 9/505 |
| 2018/0316569 A1 | 11/2018 | Cilfone |
| 2020/0125568 A1 | 4/2020 | Idicula |
| 2022/0019574 A1* | 1/2022 | Villafuerte ............ G06F 16/285 |
| 2022/0092049 A1* | 3/2022 | Zhang ................... G06F 16/285 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. . com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37 node 37 database system 10

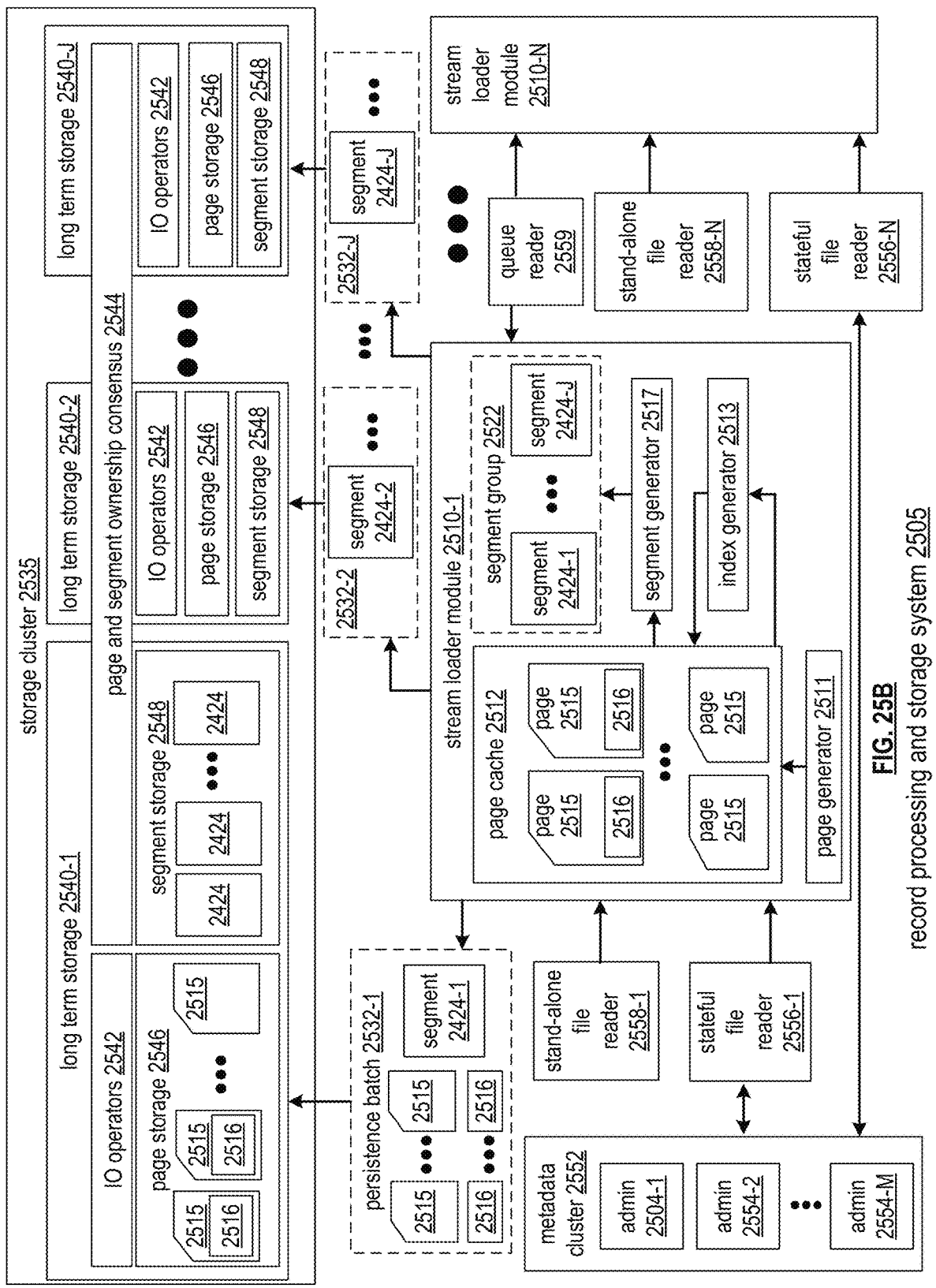

record processing and storage system 2505 segment generator 2517 conversion page set 2655

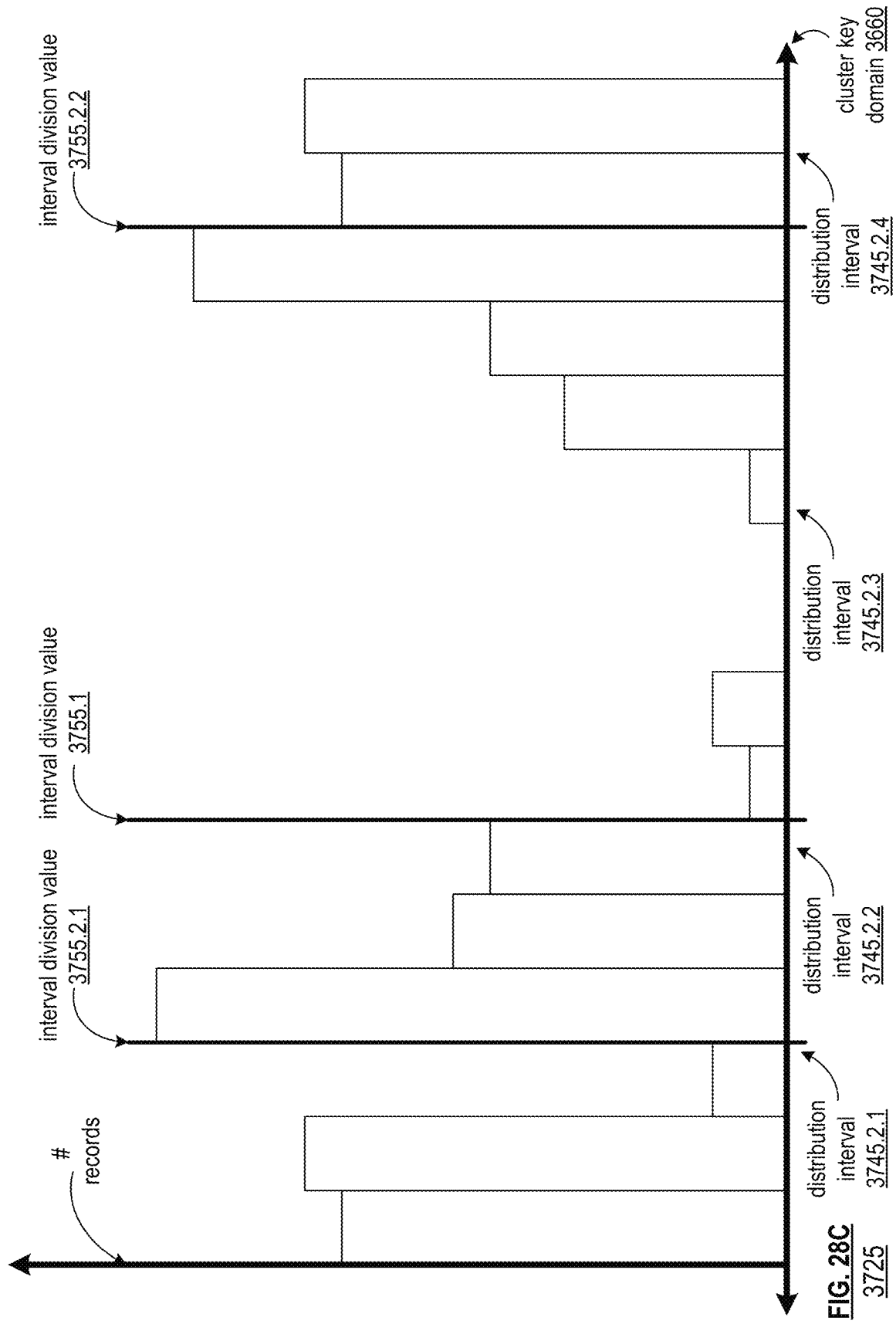

page and segment ownership consensus 2544

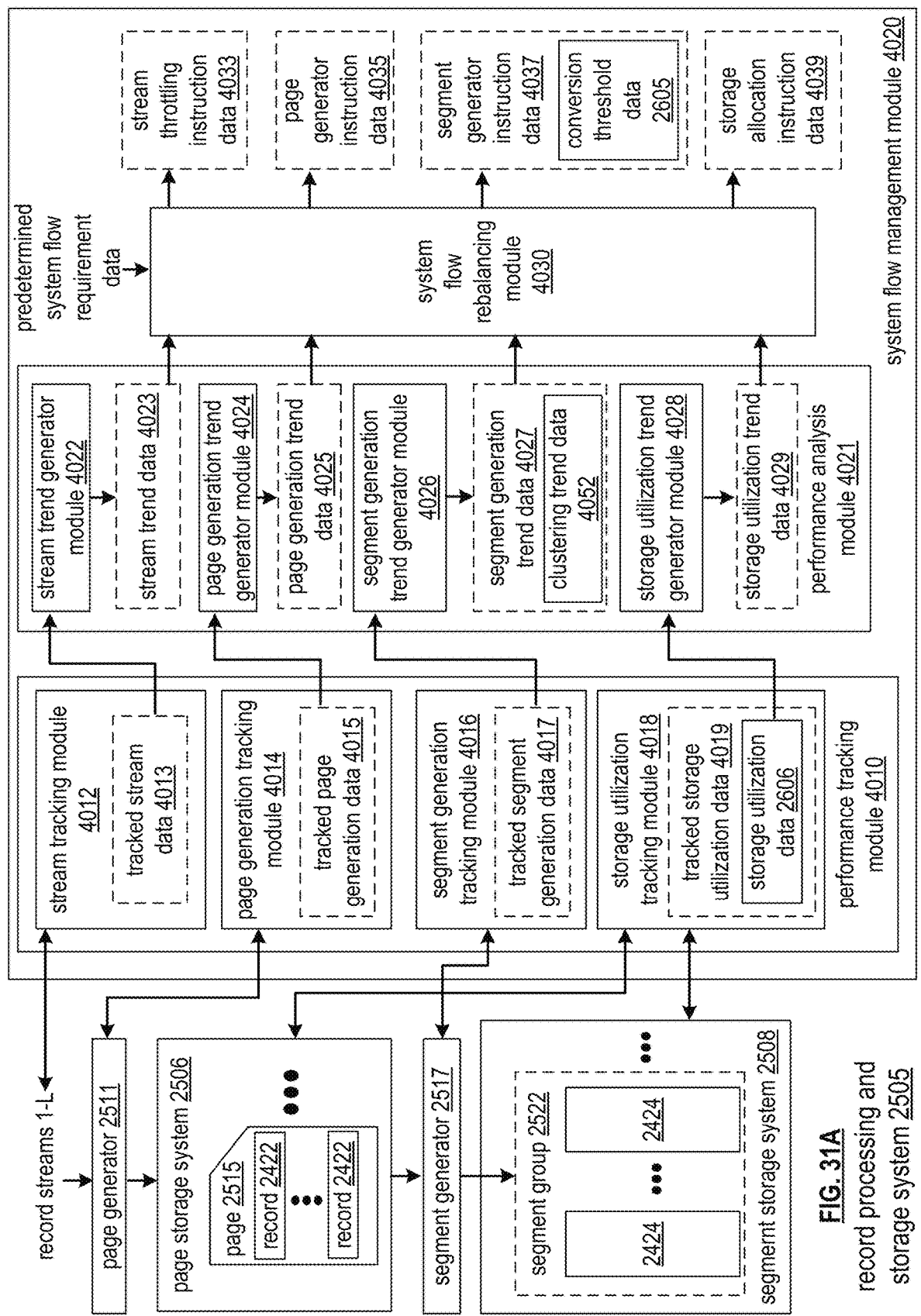
FIG. 31A record processing and storage system 2505 database system 10

UTILIZING KEY VALUE-BASED RECORD DISTRIBUTION DATA TO PERFORM PARALLELIZED SEGMENT GENERATION IN A DATABASE SYSTEM

CROSS-REFERENCE TO RELATED APPLICATIONS

The present U.S. Utility Patent Application claims priority pursuant to 35 U.S.C. § 120 as a continuation of U.S. Utility application Ser. No. 16/985,957, entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 25A-25B are schematic block diagrams of embodiments of a database system that includes a record processing and storage system in accordance with various embodiments of the present invention:

FIG. 28C illustrates an example distribution of cluster keys included in a plurality of interval divisions in accordance with various embodiments of the present invention:

FIGS. 31A-31B are schematic block diagrams of embodiments of a record processing and storage system that implements a system flow management module in accordance with various embodiments of the present invention.

DETAILED DESCRIPTION OF THE INVENTION

Figure 1:
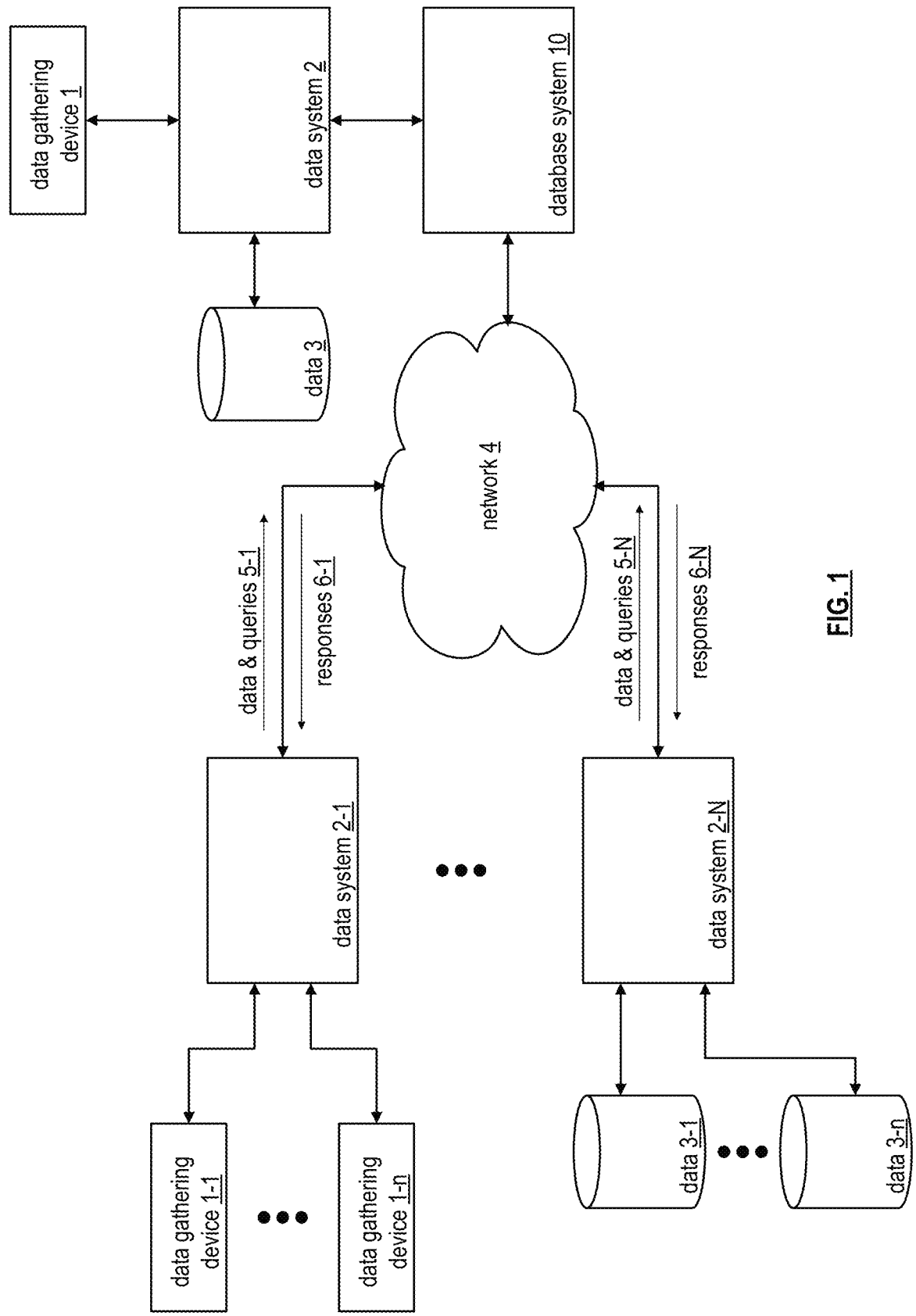
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries.

Storage of real time and non-real time data, the processing of queries, and the generating of responses will be discussed with reference to one or more of the subsequent figures.

Figure 1A:
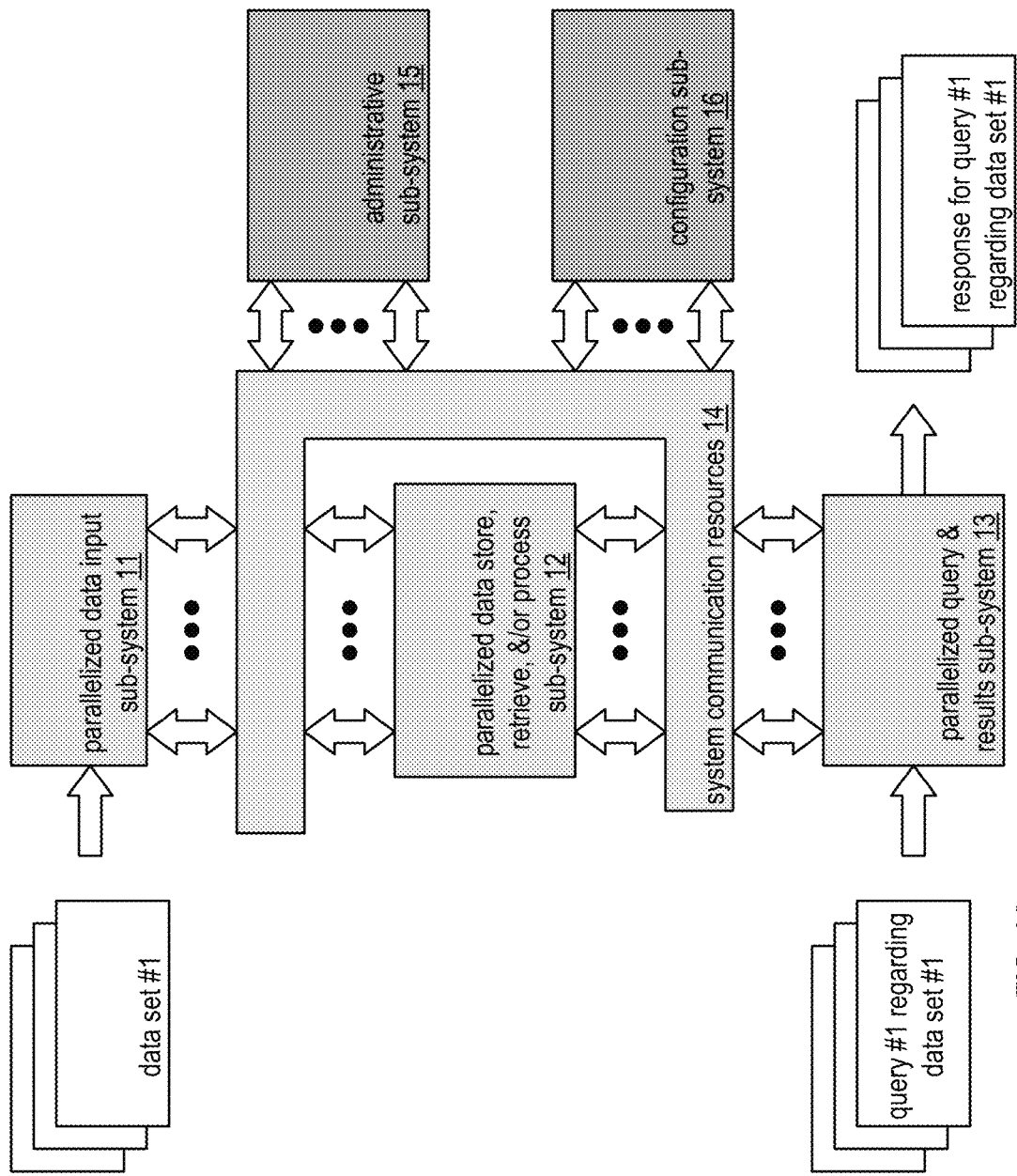
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
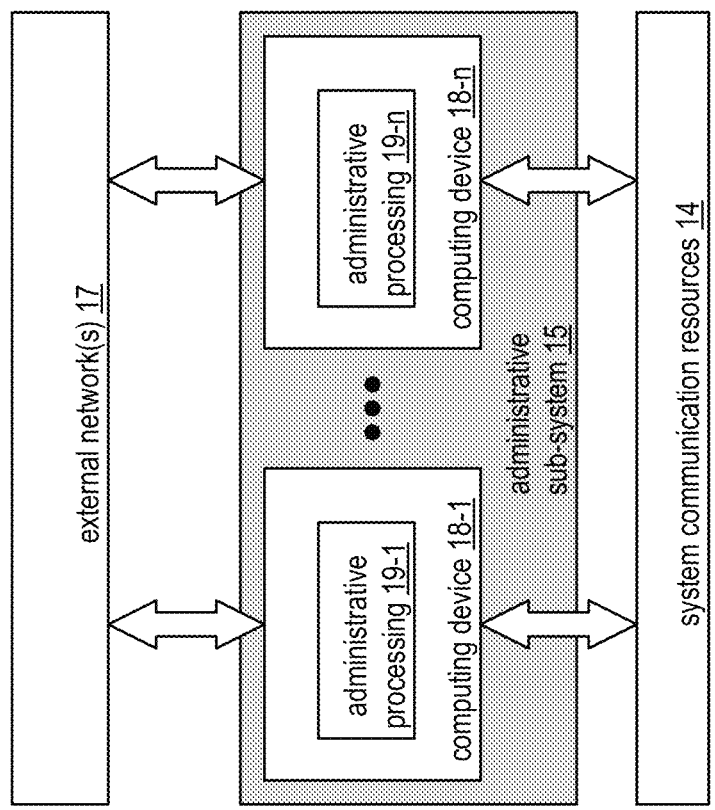
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
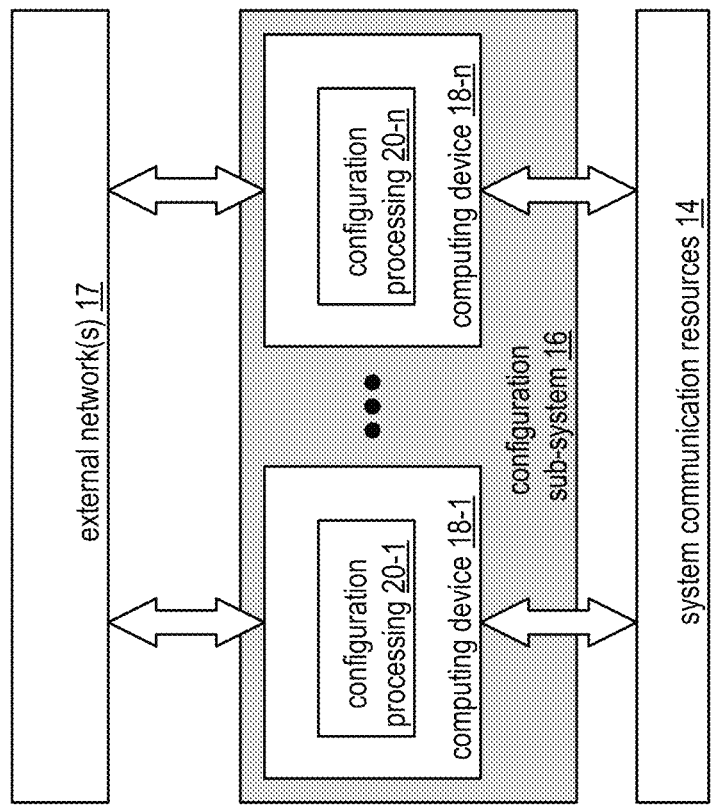
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
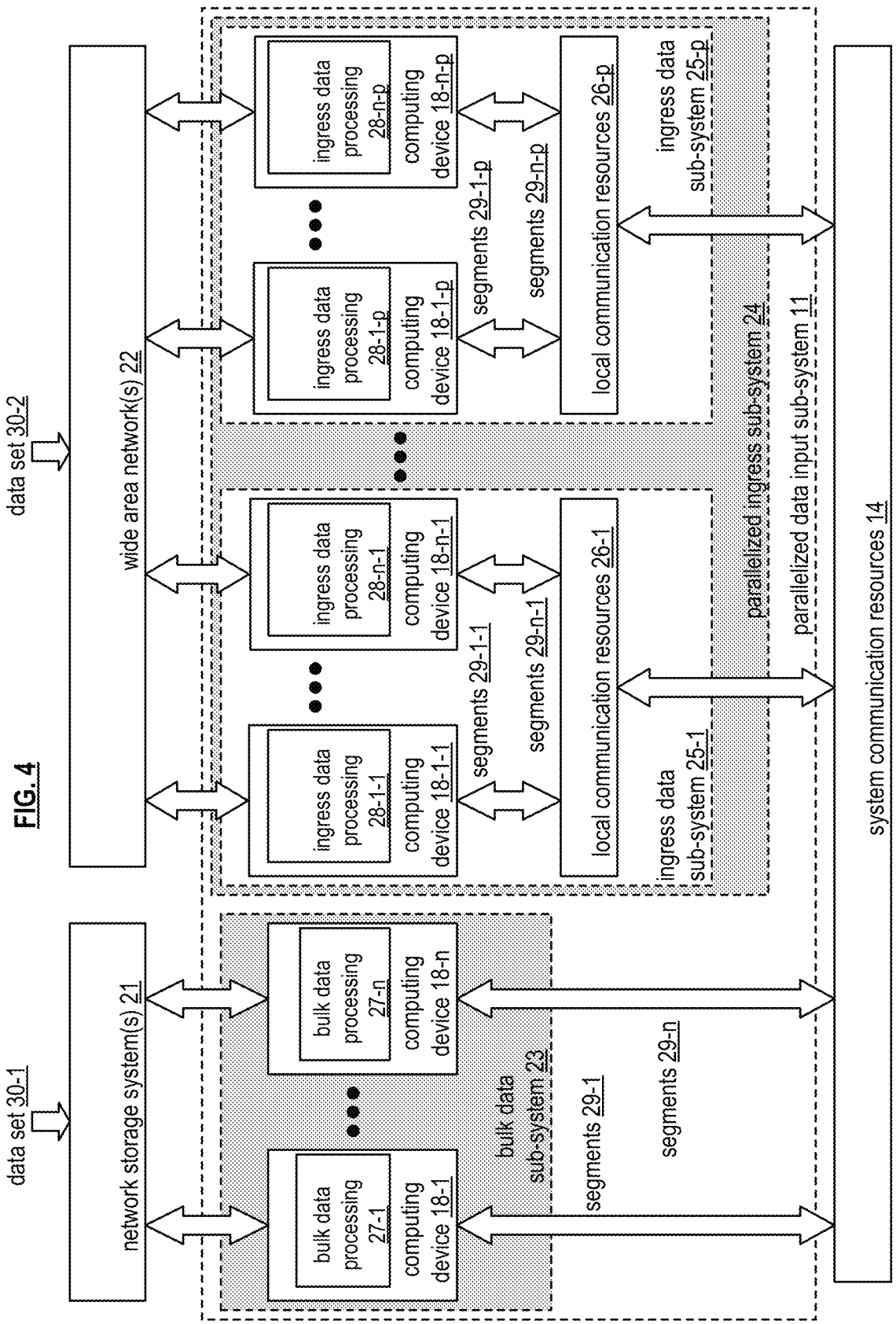
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
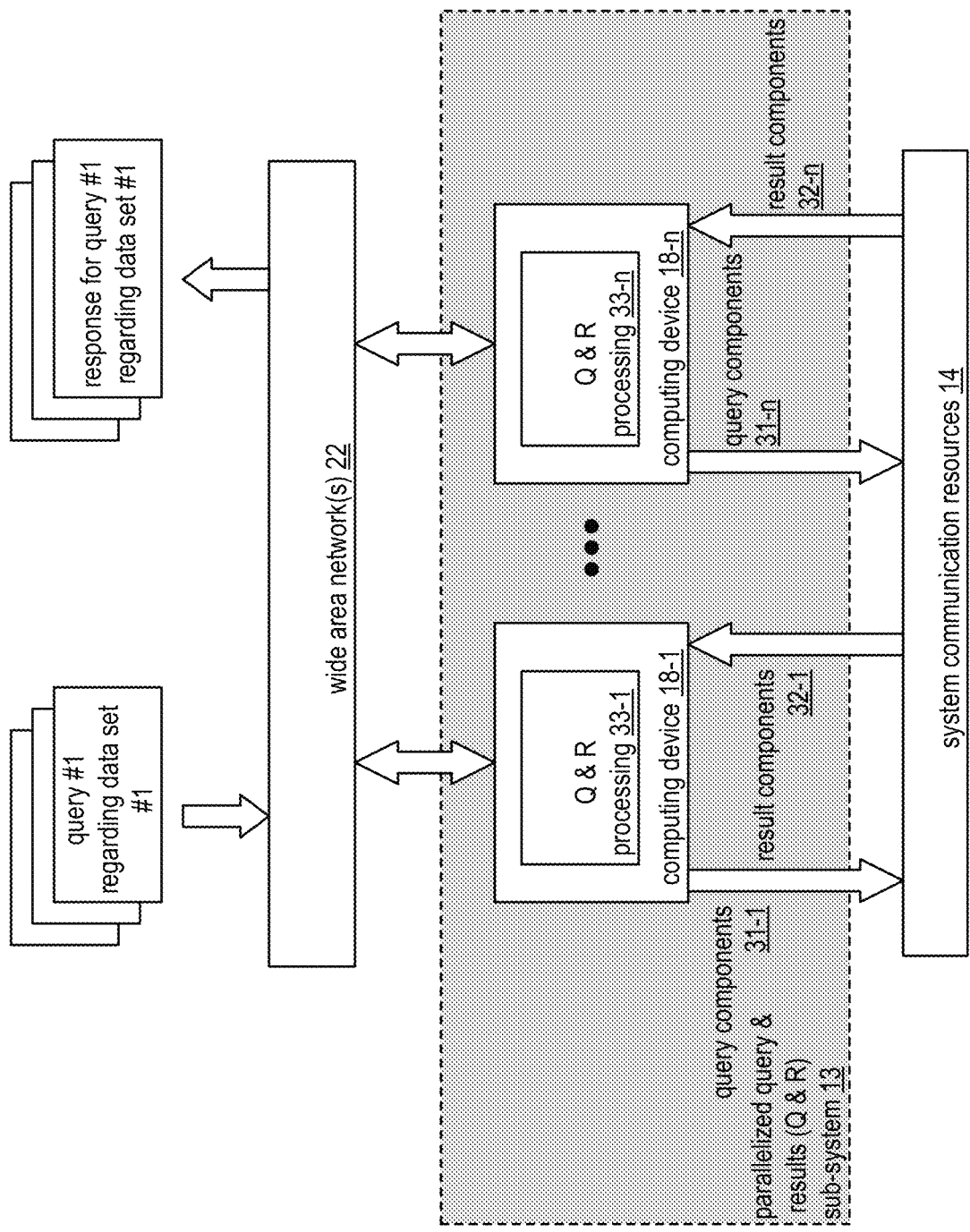
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
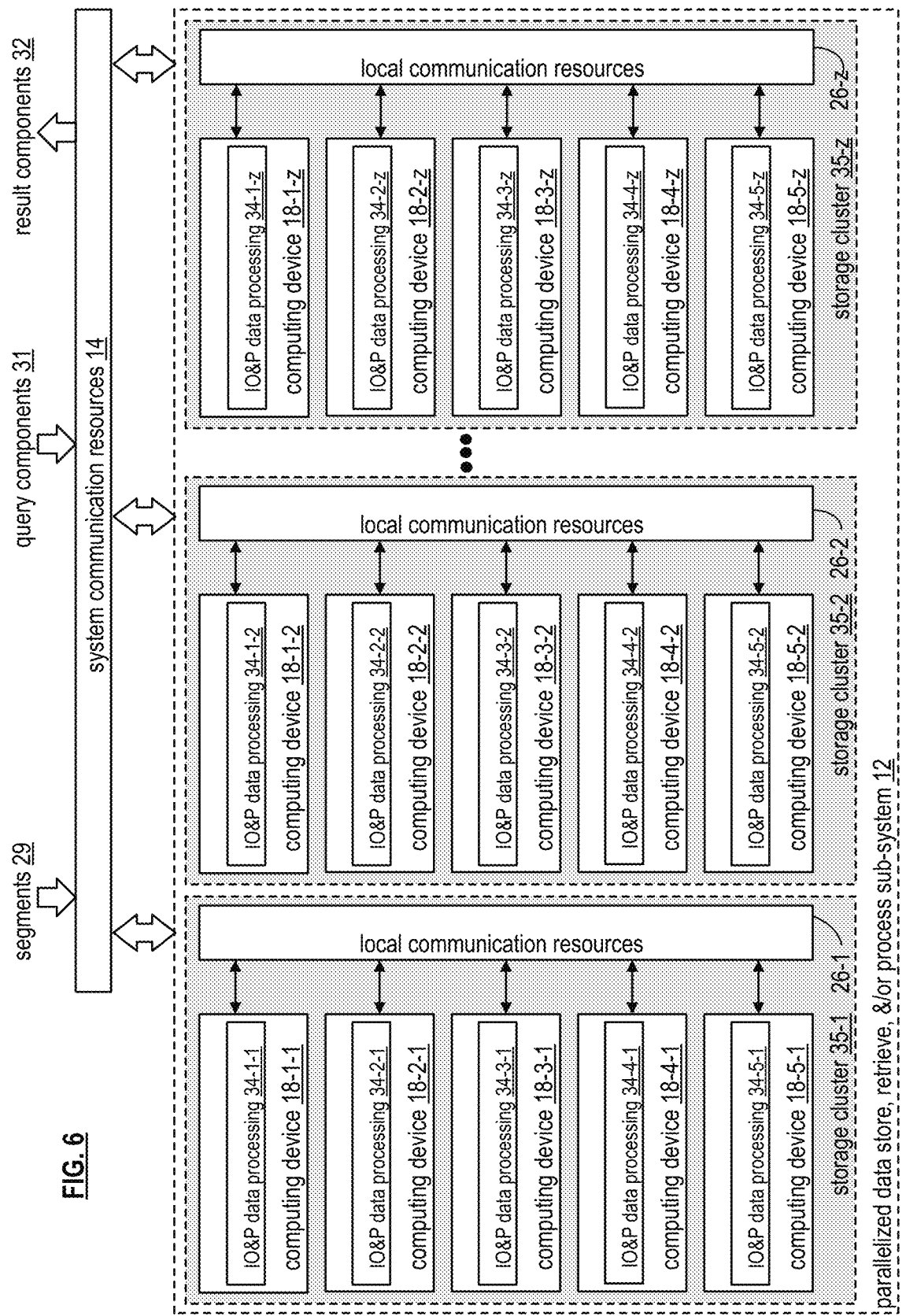
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
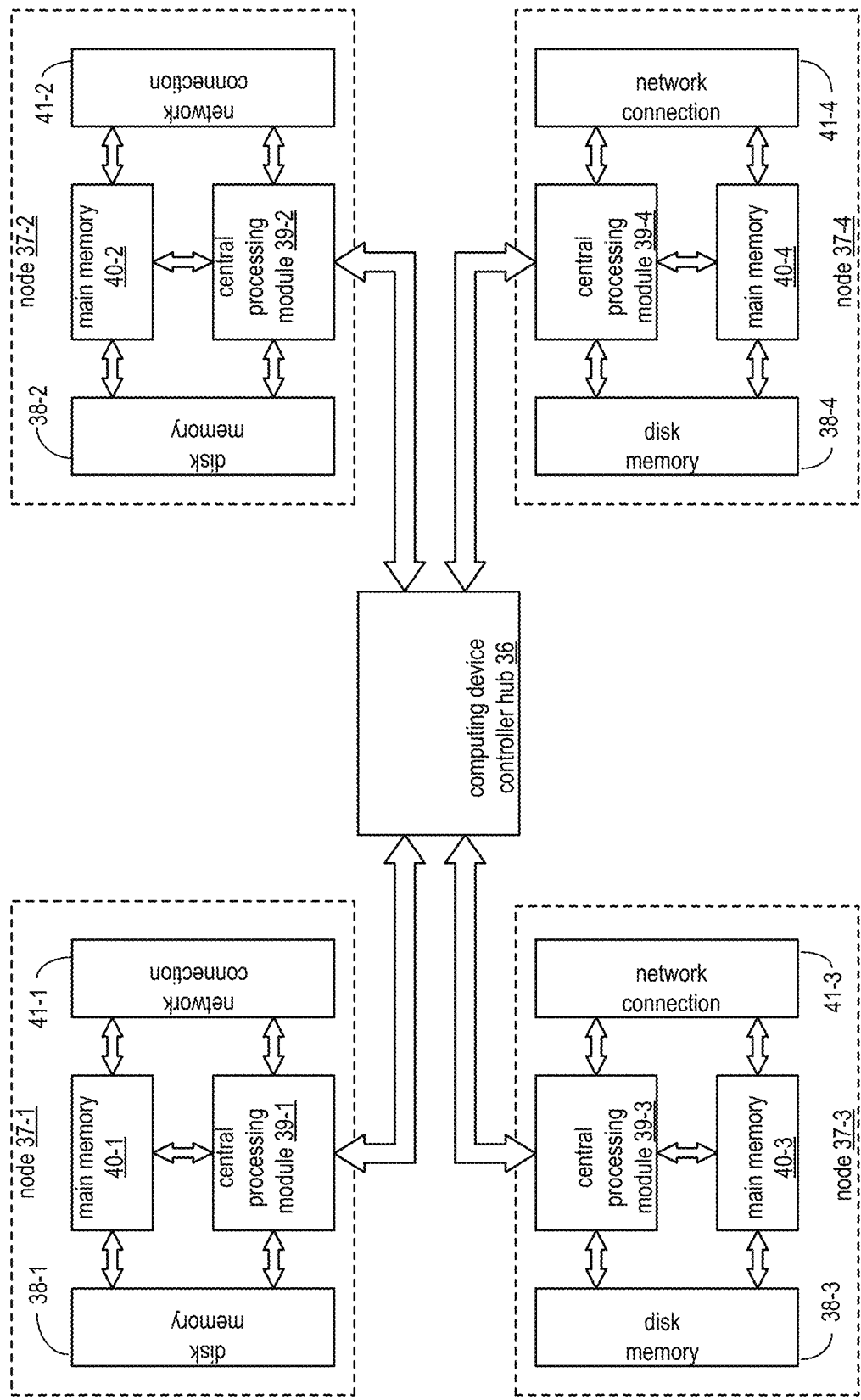
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more nodes function as co-processors to share processing requirements of a particular function, or functions.

Figure 8:
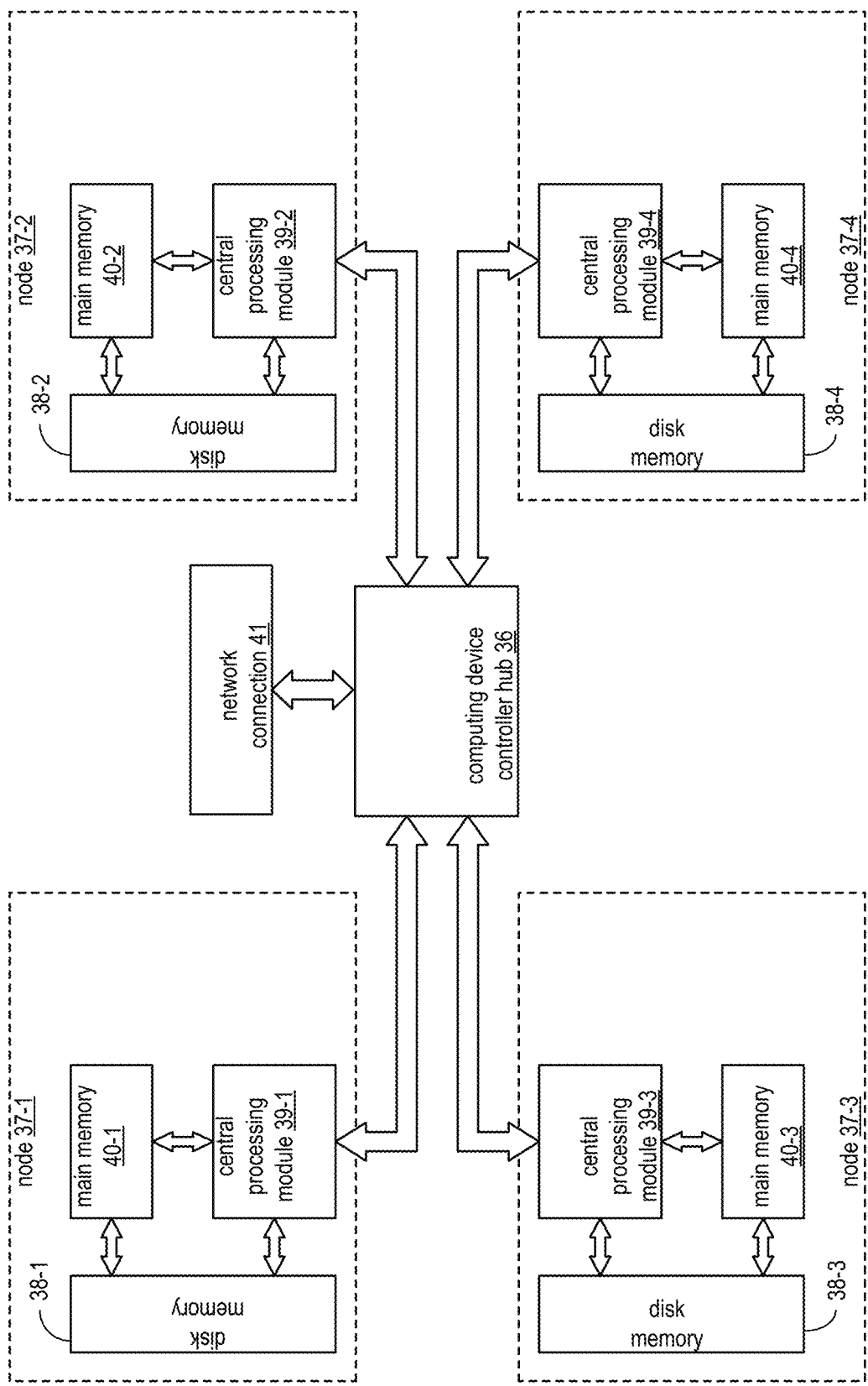
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
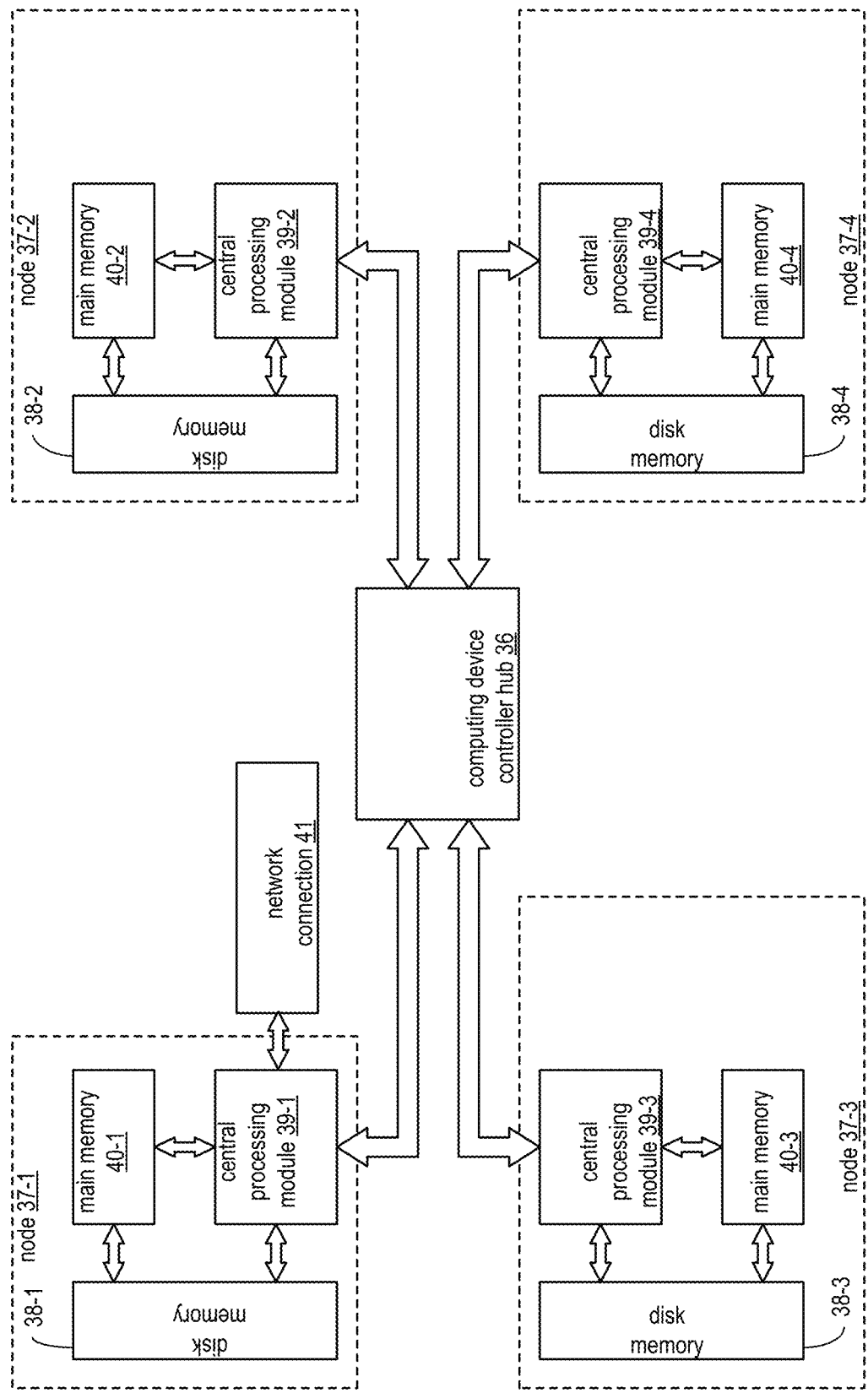
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
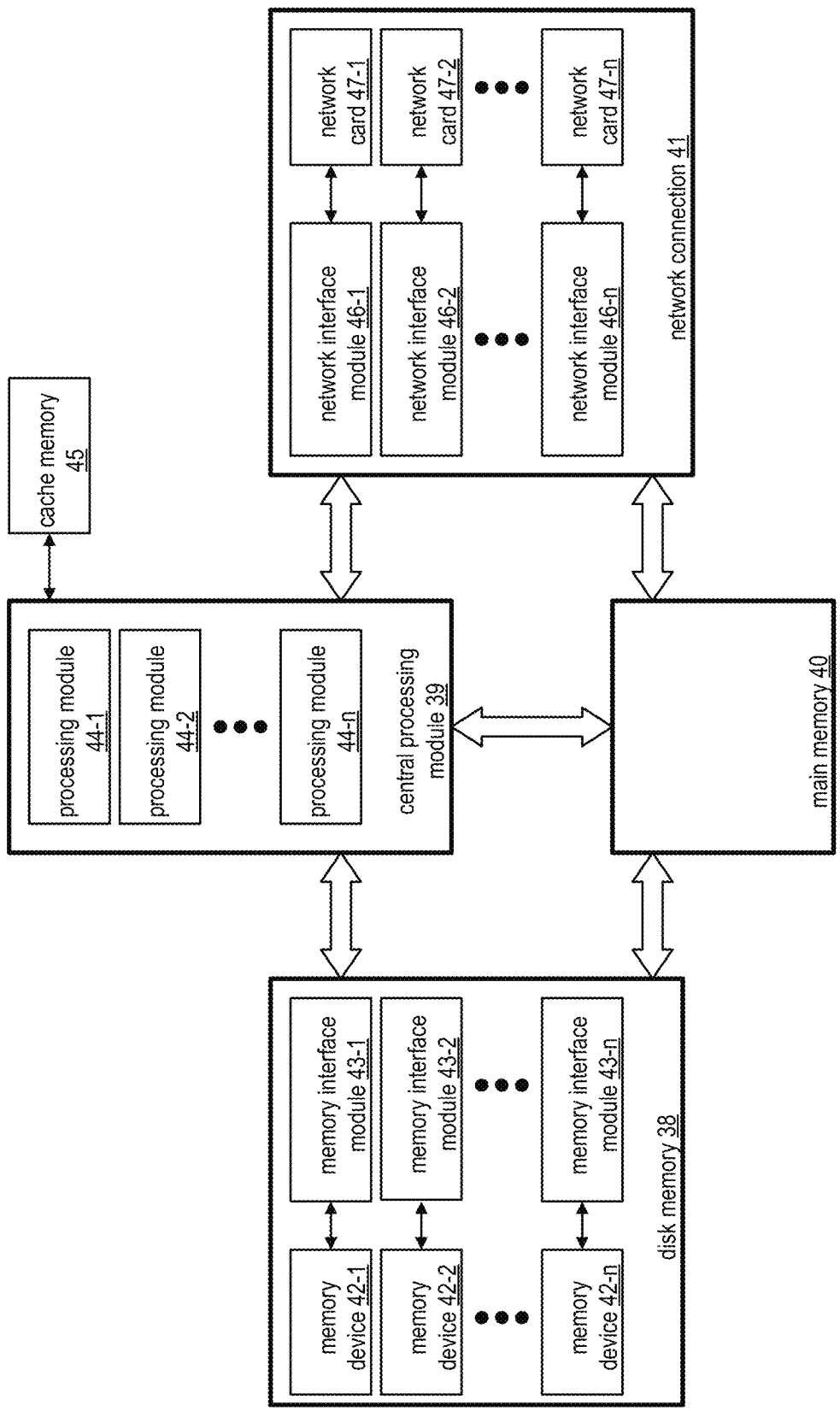
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n* is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software interface for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
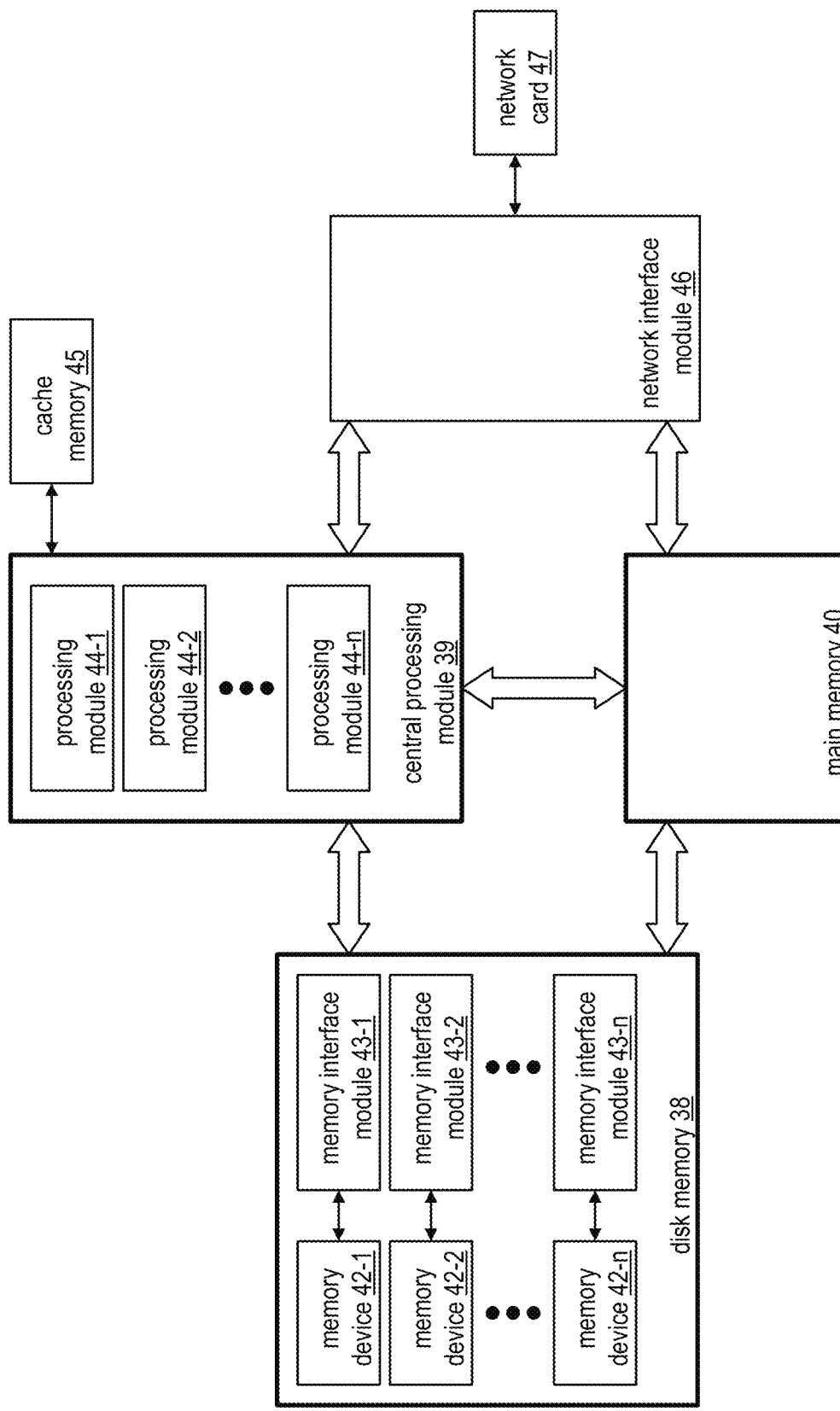
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
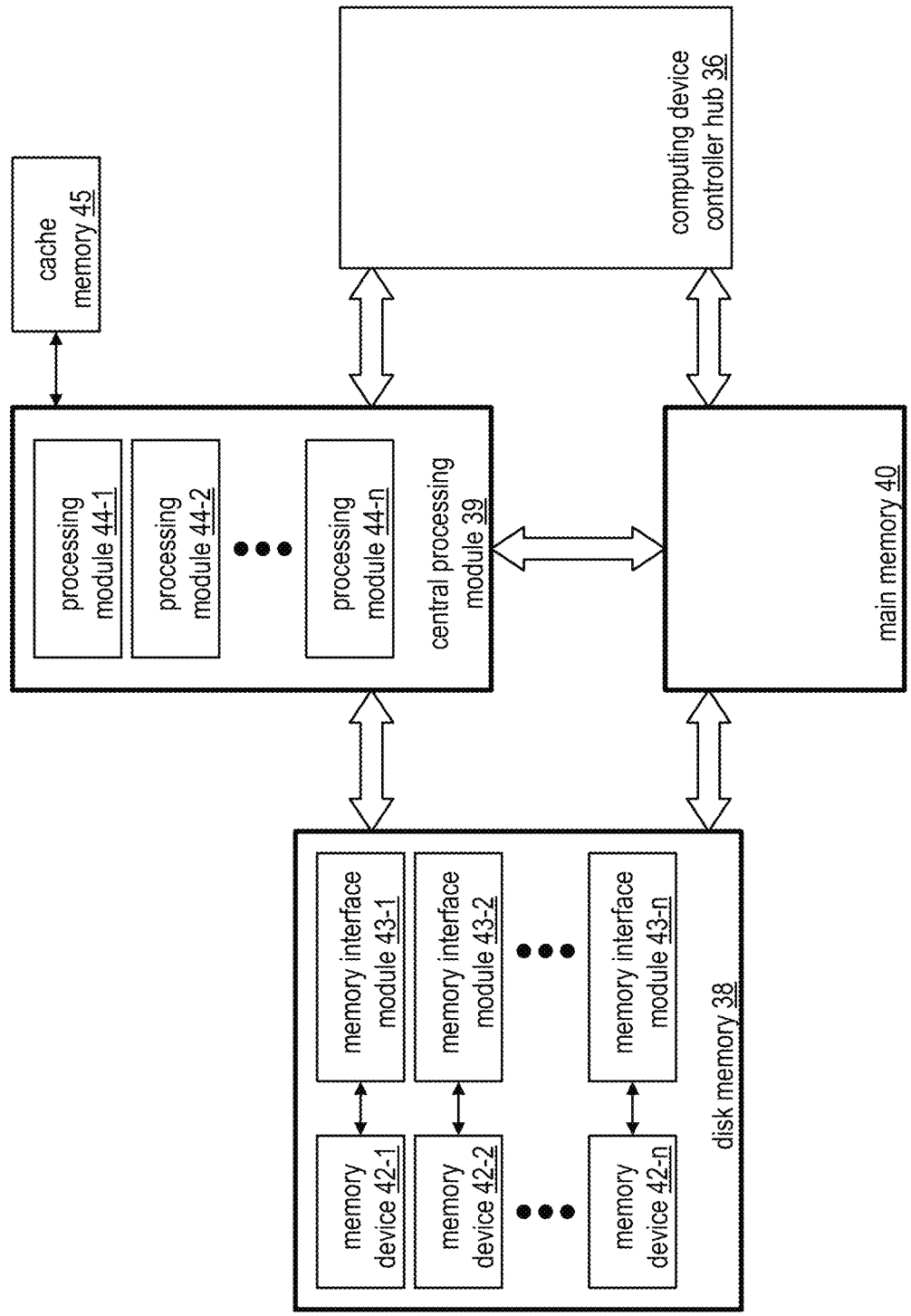
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
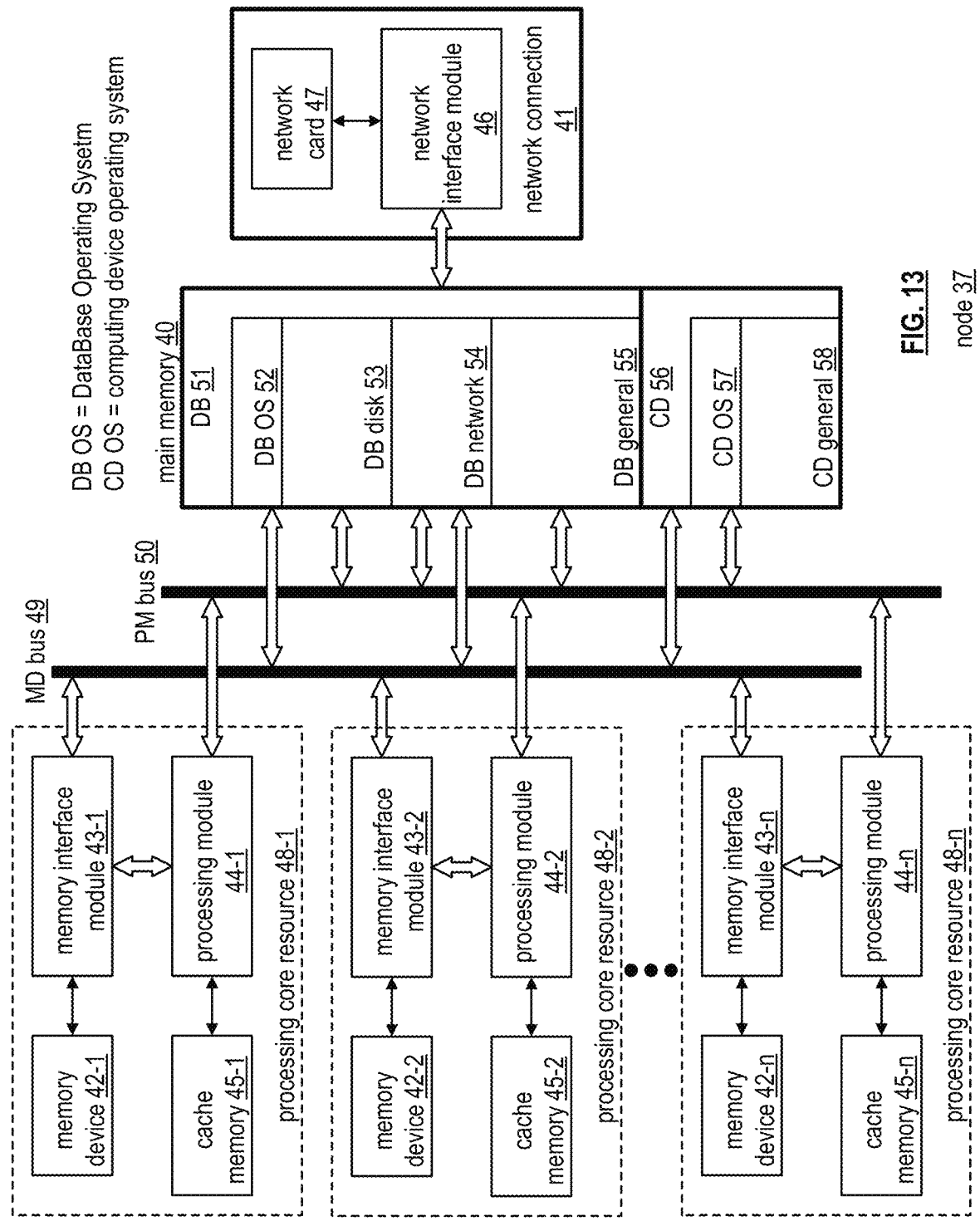
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n*. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58.

Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
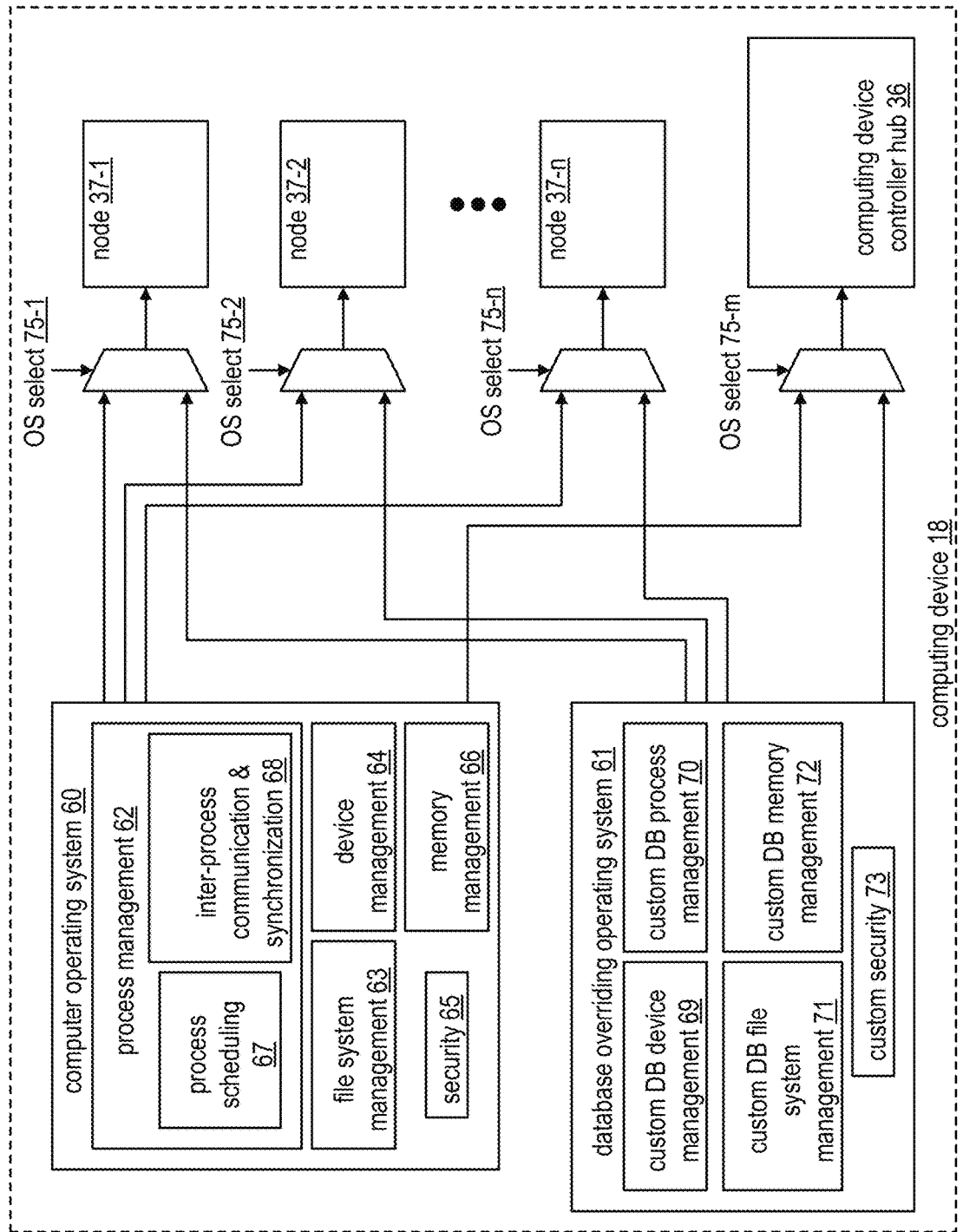
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-*n* when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
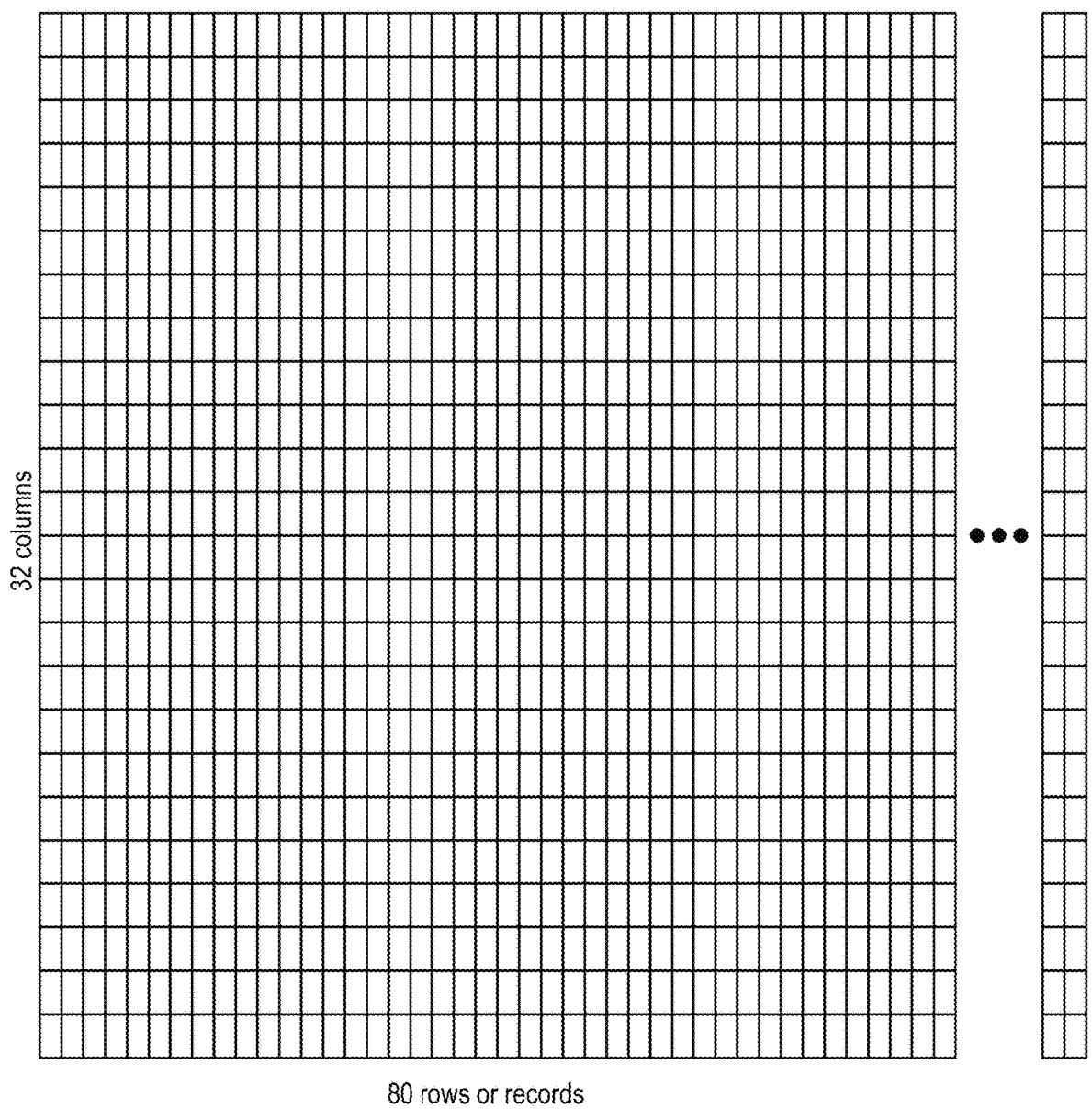
FIGS. 15-23 are schematic block diagrams of an example of processing a table or data set for storage in the database system in accordance with the present invention.

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
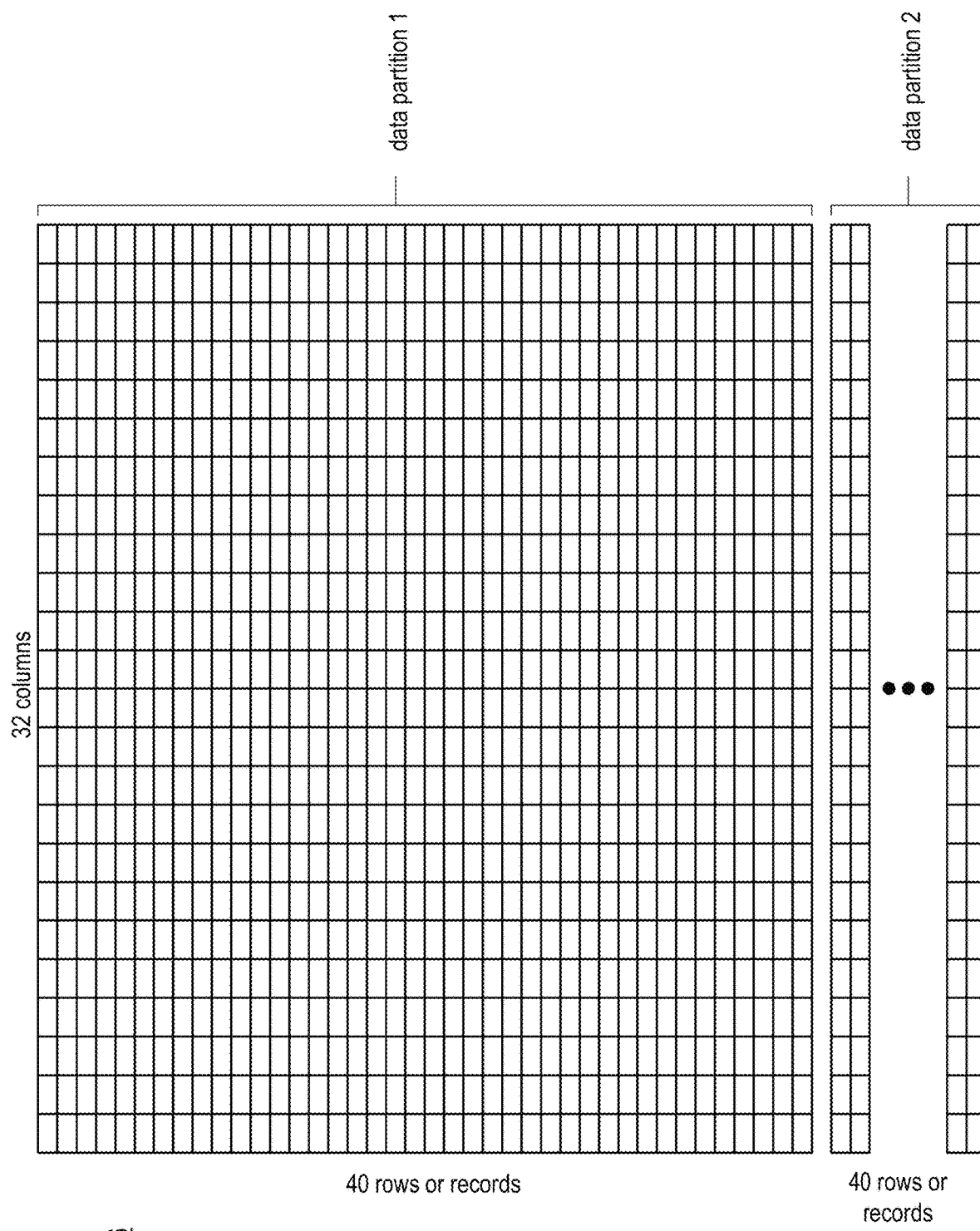

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
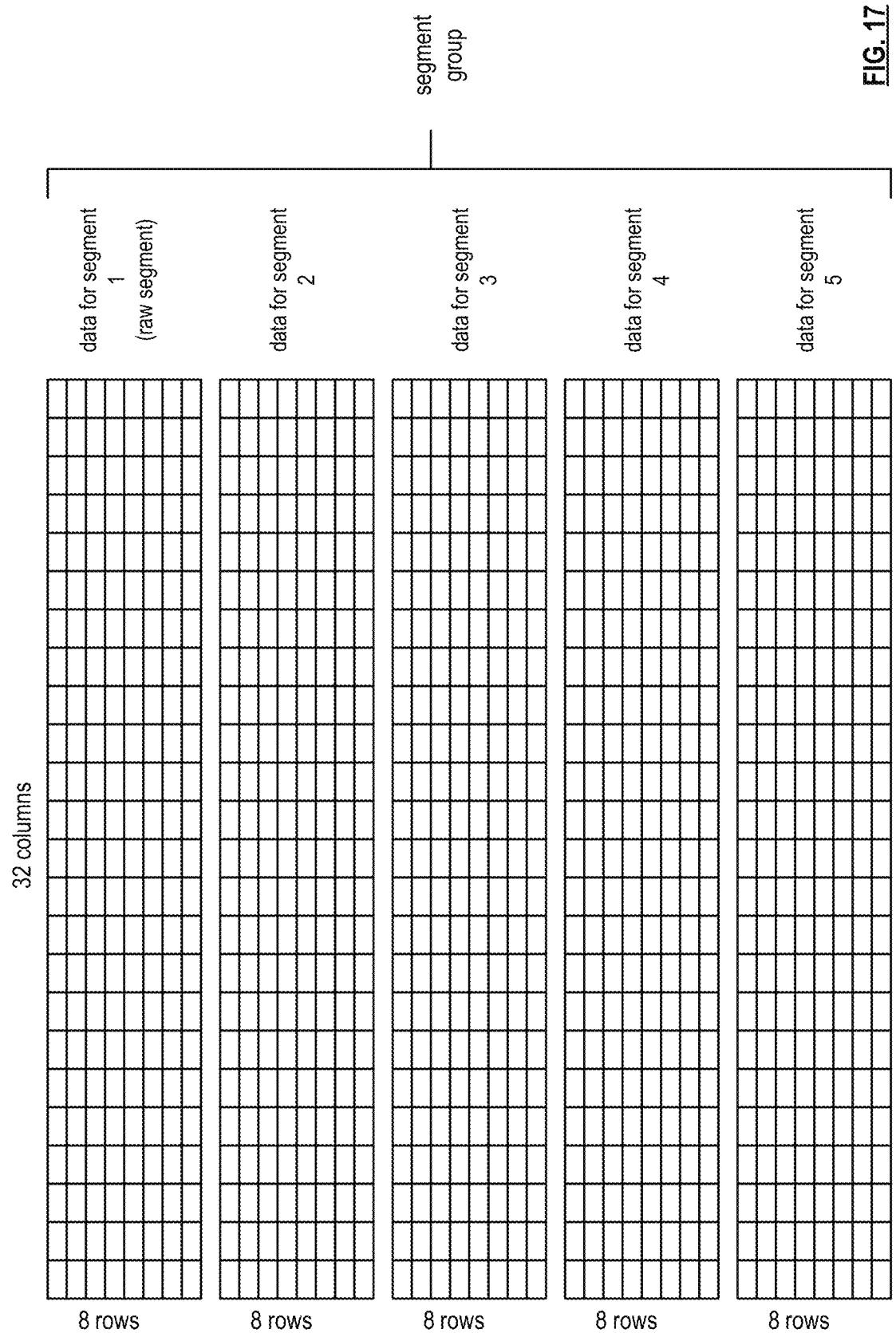

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces: thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
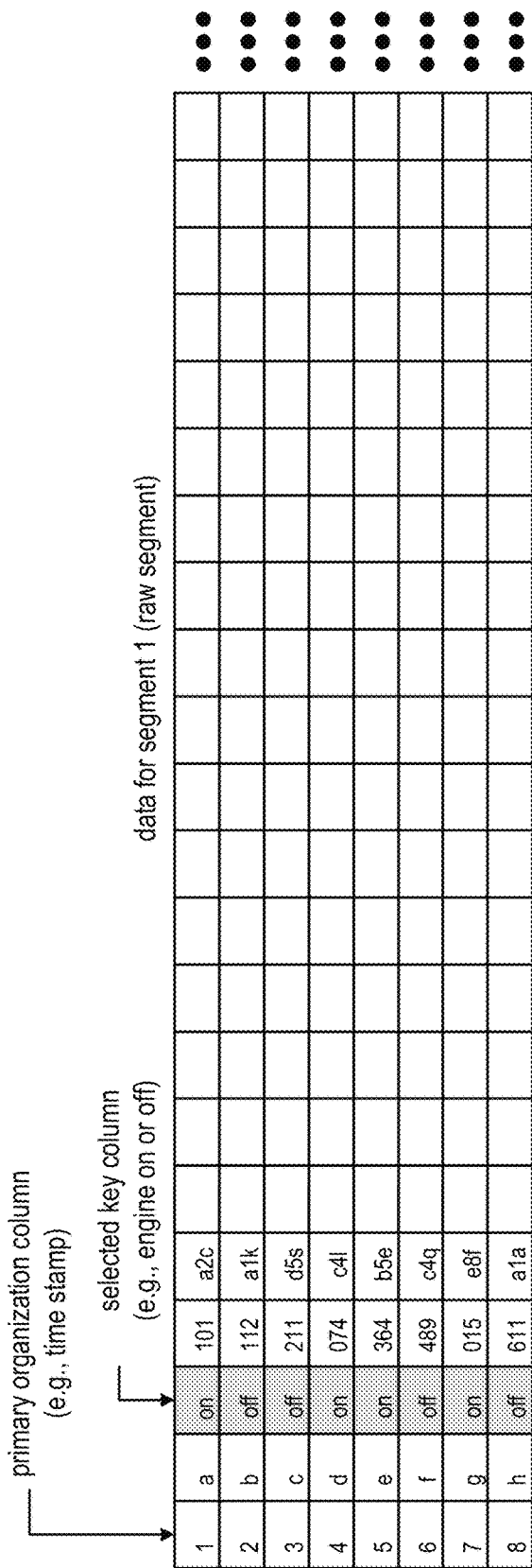

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
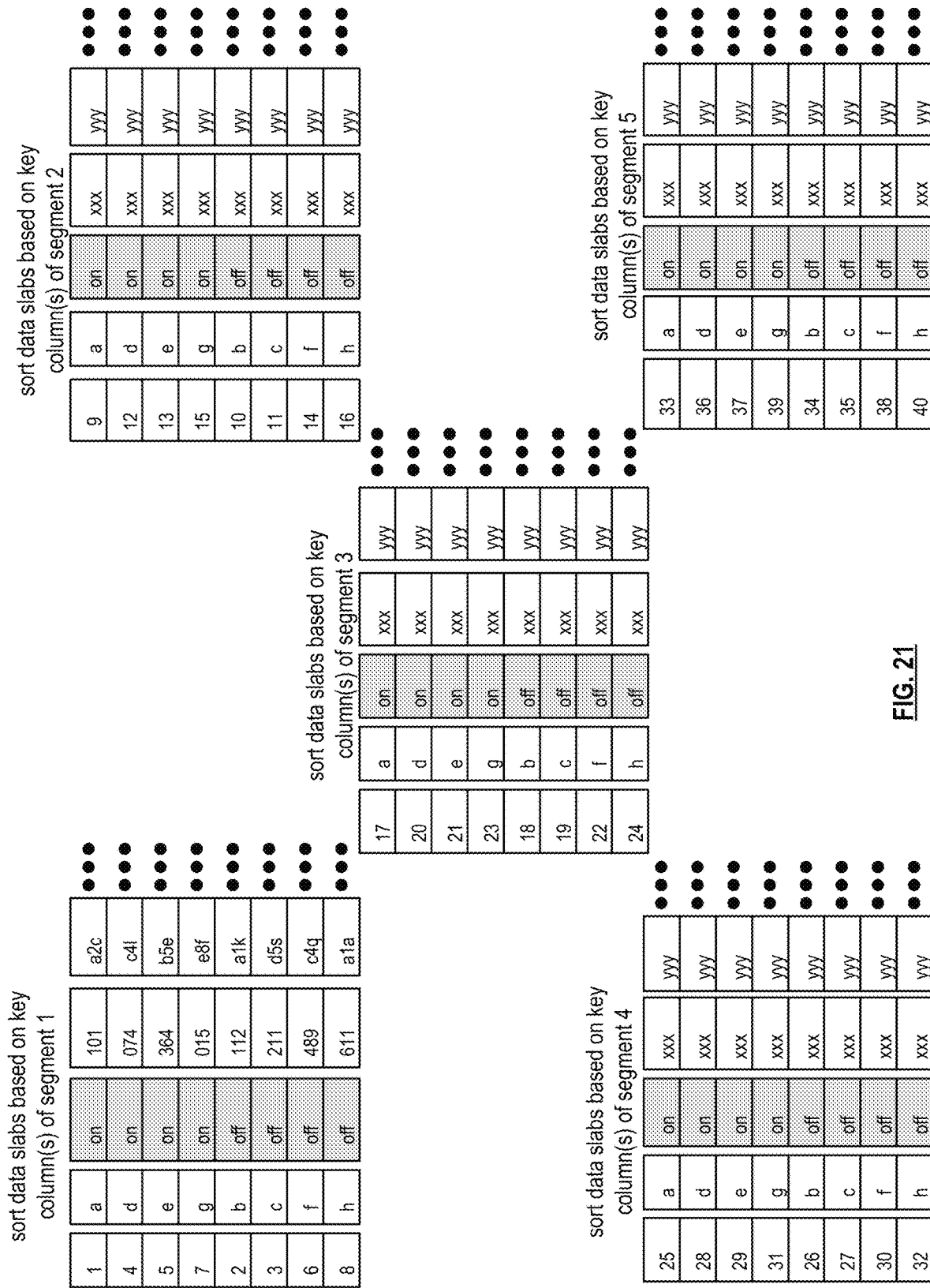

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
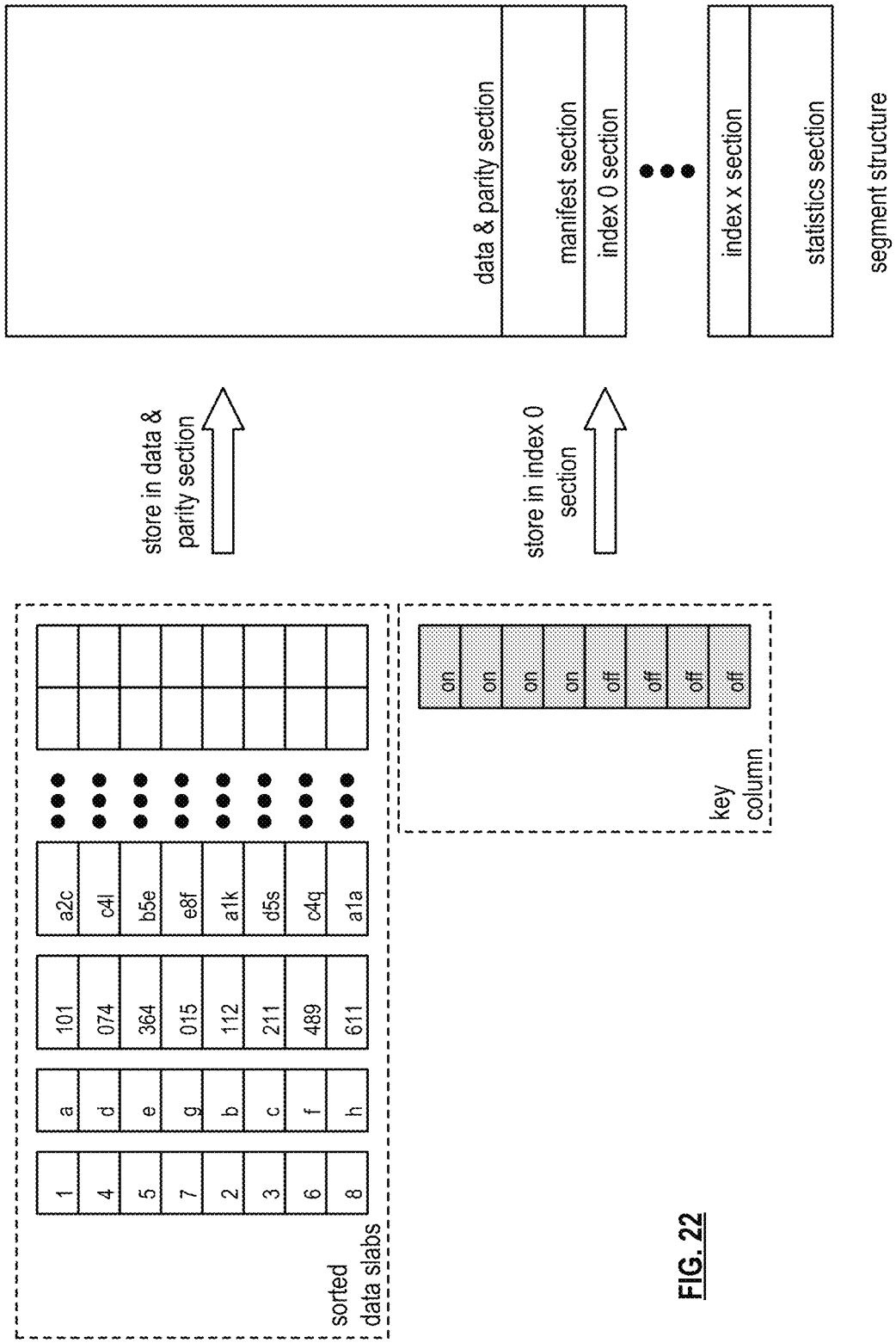

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
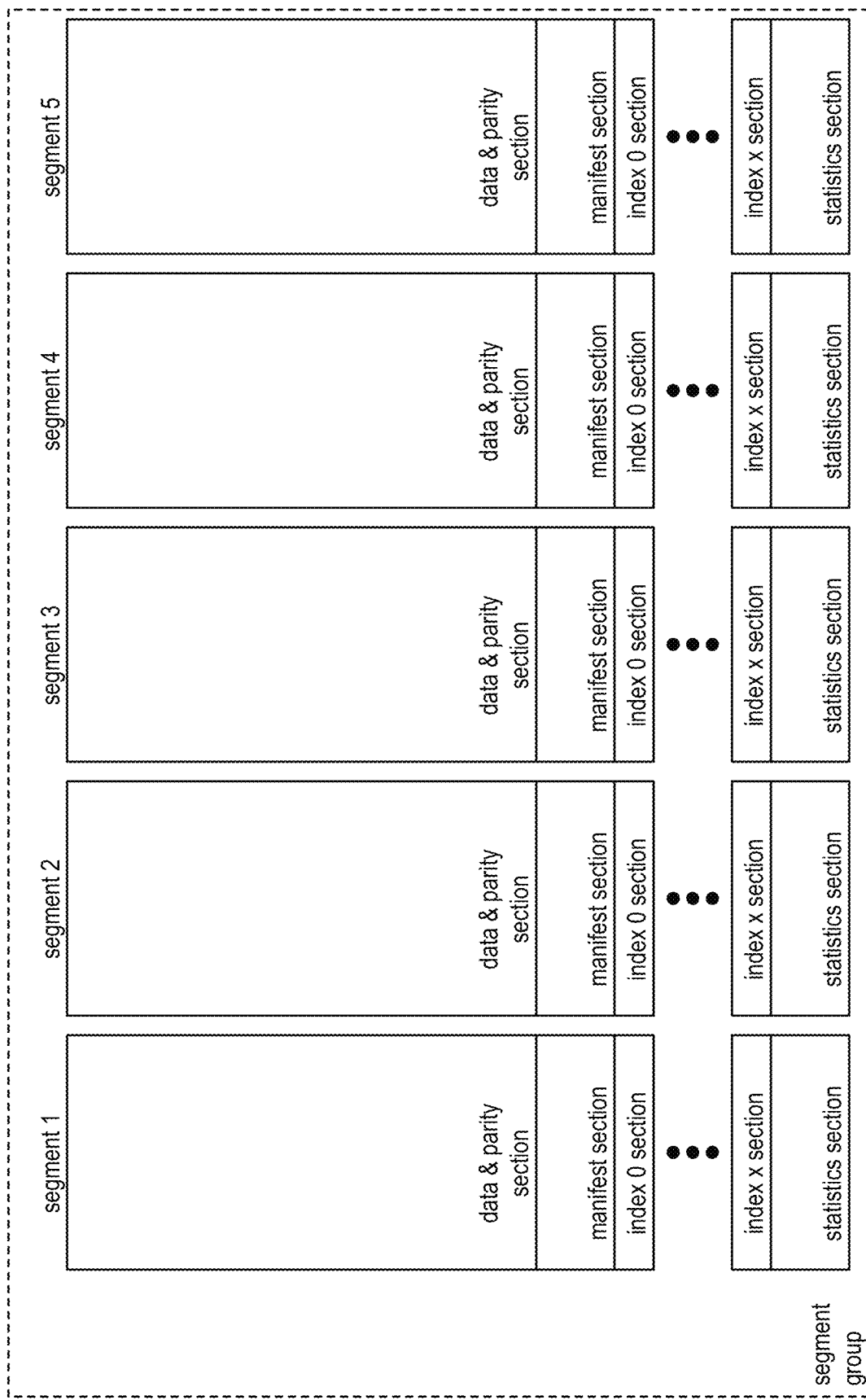

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
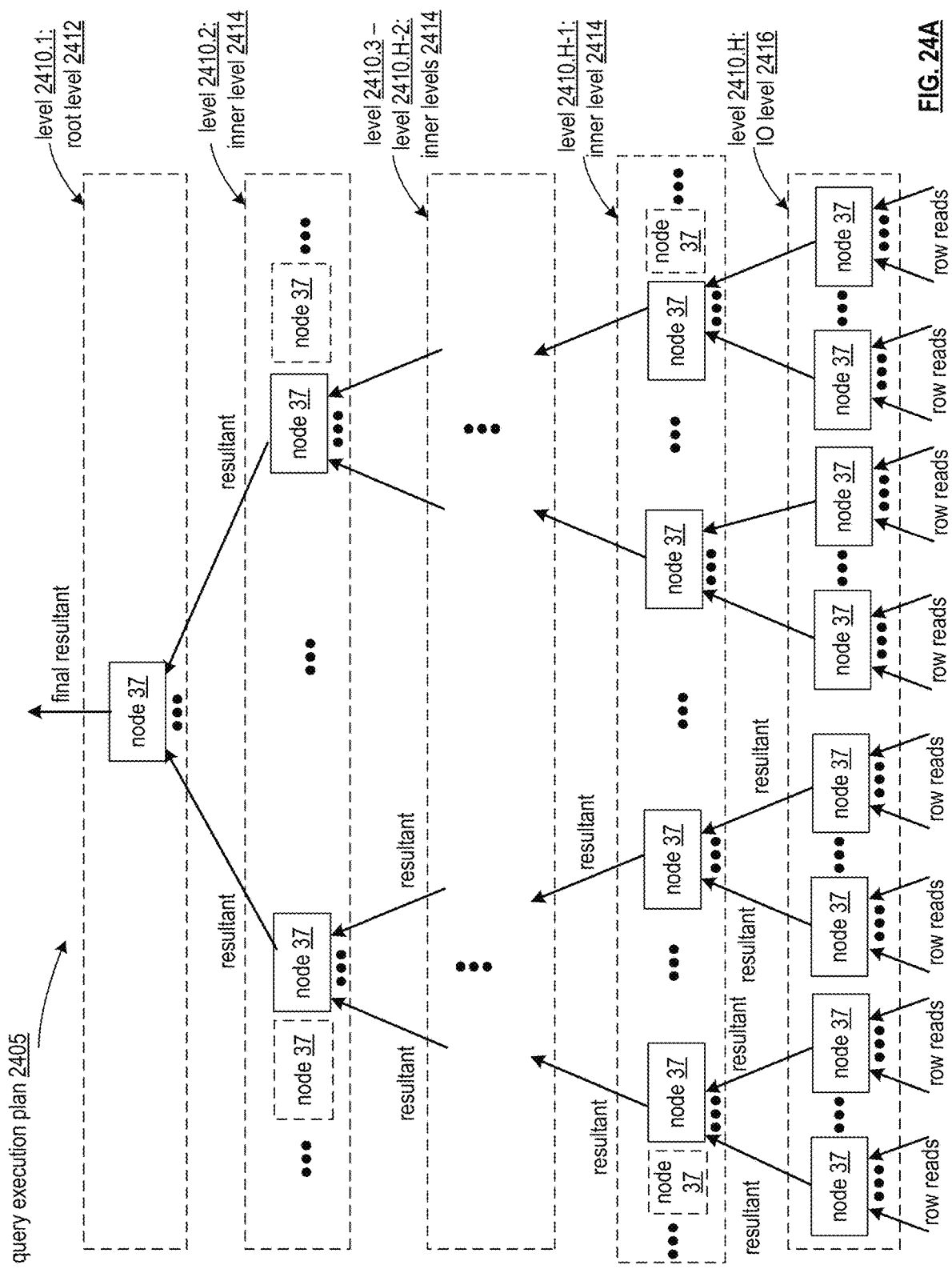
FIG. 24A is a schematic block diagram of a query execution plan implemented via a plurality of nodes in accordance with various embodiments of the present invention.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412: a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme: and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-*z* and/or all nodes in all storage clusters 35-1-35-*z*. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments: extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
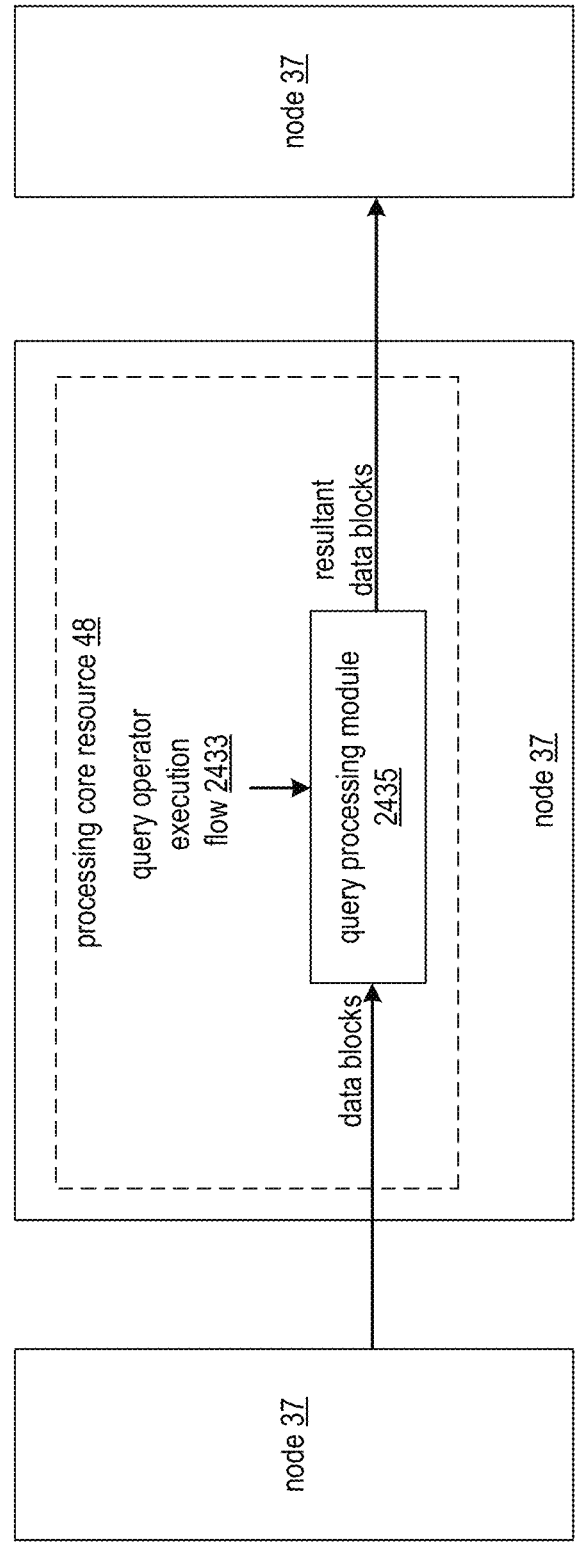
FIGS. 24B-24D are schematic block diagrams of embodiments of a node that implements a query processing module in accordance with various embodiments of the present invention.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405.

This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figure 25A:
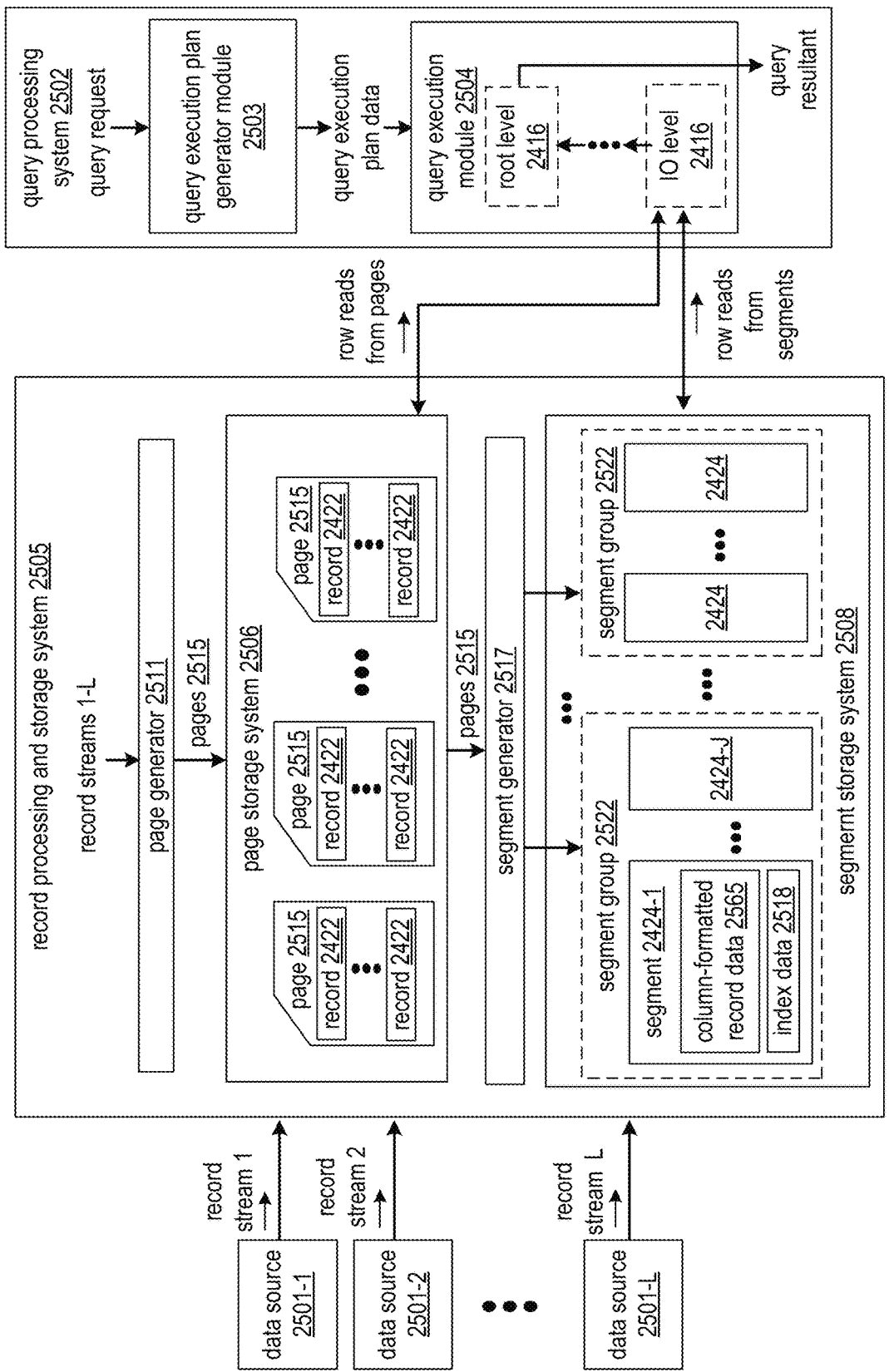
Figure 25C:
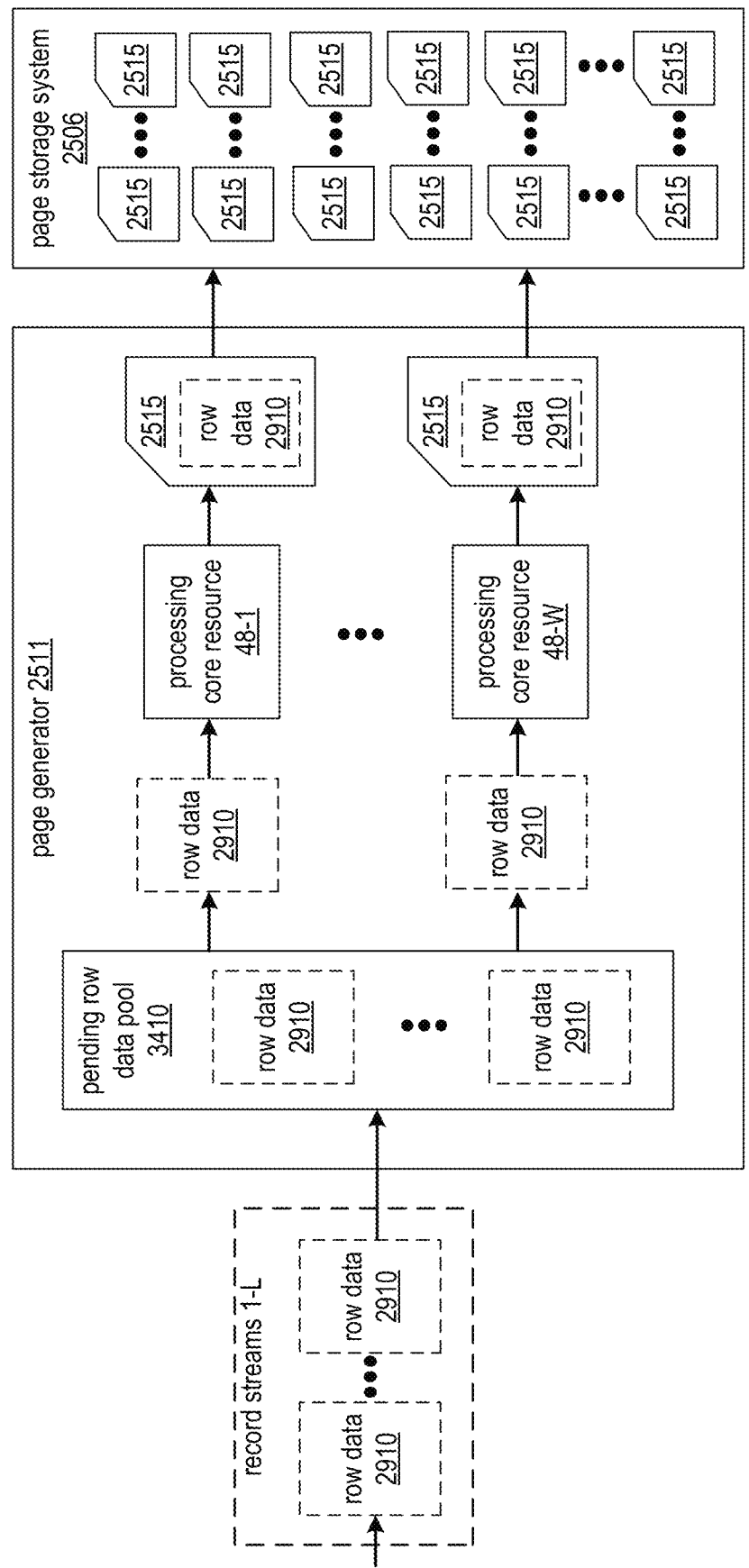
FIG. 25C is a is a schematic block diagrams of an embodiment of a page generator in accordance with various embodiments of the present invention.

FIG. 25C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24C:
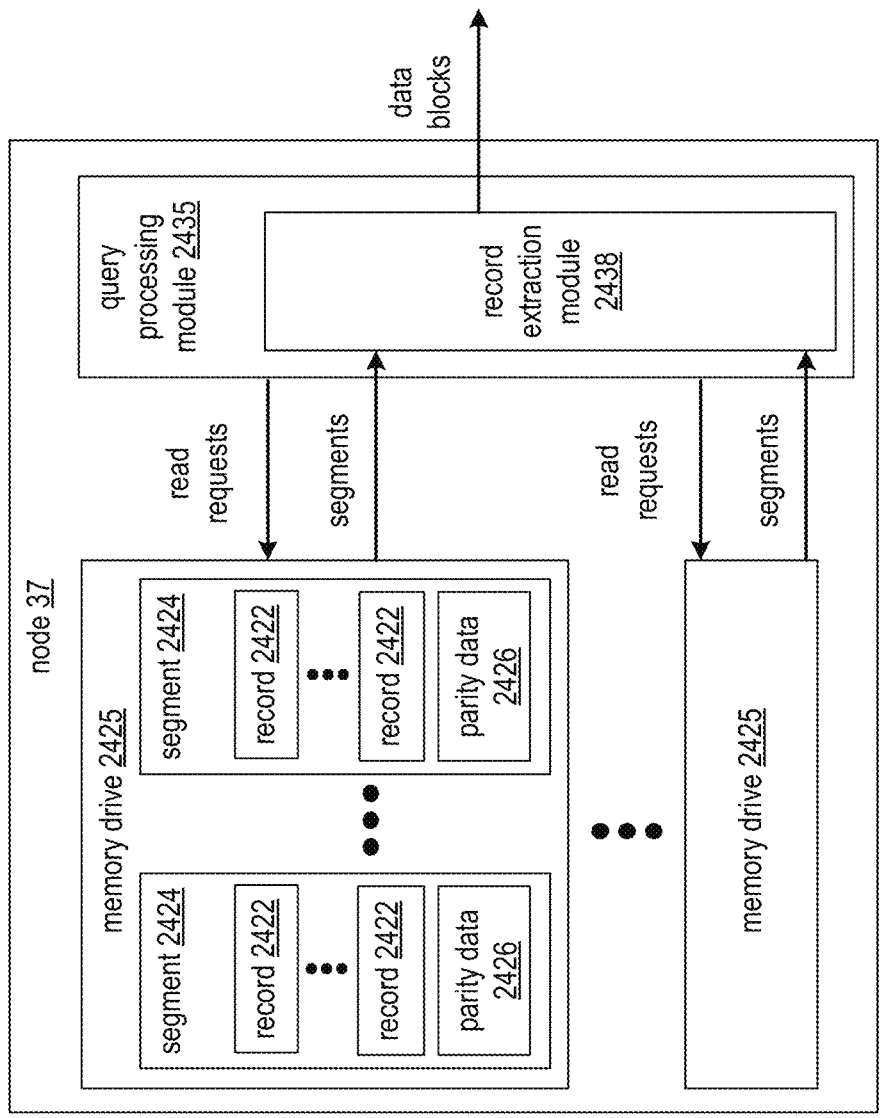
Figure 24D:
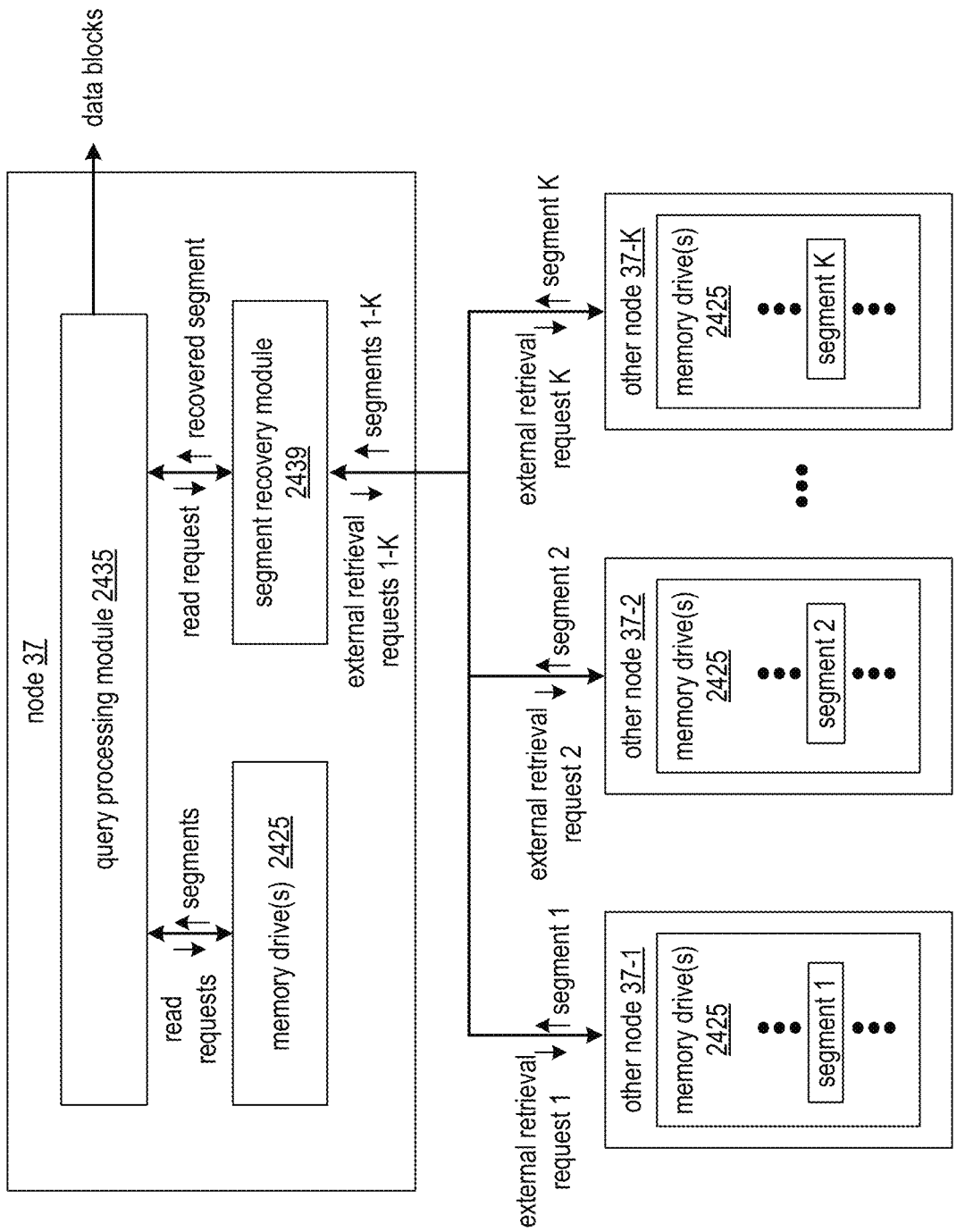

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

FIG. 25A illustrates an embodiment of a database system 10 that implements a record processing and storage system 2505. The record processing and storage system 2505 can be operable to generate and store the segments 2424 discussed previously by utilizing a segment generator 2517 to convert sets of row-formatted records 2422 into column-formatted record data 2565. These row-formatted records 2422 can correspond to rows of a database table with populated column values of the table, for example, where each record 2422 corresponds to a single row as illustrated in FIG. 15. For example, the segment generator 2517 can generate the segments 2424 in accordance with the process discussed in conjunction with FIGS. 15-23. The segments 2424 can be generated to include index data 2518, which can include a plurality of index sections such as the index sections 0-X illustrated in FIG. 23. The segments 2424 can optionally be generated to include other metadata, such as the manifest section and/or statistics section illustrated in FIG. 23.

The generated segments 2424 can be stored in a segment storage system 2508 for access in query executions. For example, the records 2422 can be extracted from generated segments 2424 in various query executions performed by via a query processing system 2502 of the database system 10, for example, as discussed in FIGS. 25A-25D. In particular, the segment storage system 2508 can be implemented by utilizing the memory drives 2425 of a plurality of IO level nodes 37 that are operable to store segments. As discussed previously, nodes 37 at the IO level 2416 can store segments 2424 in their memory drives 2425 as illustrated in FIG. 24C. These nodes can perform IO operations in accordance with query executions by reading rows from these segments 2424 and/or by recovering segments based on receiving segments from other nodes as illustrated in FIG. 24D. The records 2422 can be extracted from the column-formatted record data 2565 for these IO operations of query executions by utilizing the index data 2518 of the corresponding segment 2424.

To enhance the performance of query executions via access to segments 2424 to read records 2422 in this fashion, the sets of rows included in each segment are ideally clustered well. In the ideal case, rows sharing the same cluster key are stored together in the same segment or same group of segments. For example, rows having matching values of key columns(s) of FIG. 18 utilized to sort the rows into groups for conversion into segments are ideally stored in the same segments.

As used herein, a cluster key can be implemented as a single column and/or field, and/or a particular set of multiple columns and/or fields of a corresponding record, such as key columns(s) of FIG. 18, that are utilized to cluster records into segment groups for segment generation. As used herein, a cluster key value can correspond to the set of values in each field and/or column of the cluster key based on corresponding values of a given record. A cluster key value includes multiple values of multiple fields and/or columns when the corresponding cluster key is implemented as these multiple fields and/or columns of records in the corresponding record stream.

As used herein, more favorable levels of clustering correspond to more rows with same or similar cluster key values being stored in the same segments, while less favorable levels of clustering correspond to less rows with same or similar cluster key values being stored in the same segments. More favorable levels of clustering can achieve more efficient query performance. In particular, query filtering parameters of a given query can specify particular sets of records with particular cluster keys be accessed, and if these records are stored together, fewer segments, memory drives, and/or nodes need to be accessed and/or utilized for the given query.

These favorable levels of clustering can be hard to achieve when relying upon the incoming ordering of records in record streams 1-L from a set of data sources 2501-1-2501-L. No assumptions can necessarily be made about the clustering, with respect to the cluster key, of rows presented by external sources as they are received in the data stream. For example, the cluster key value of a given row received at a first time $t_1$ gives no information about the cluster key value of a row received at a second time $t_2$ after $t_1$. It would therefore be unideal to frequently generate segments by performing a clustering process to group the most recently received records by cluster key. In particular, because records received within a given time frame from a particular data source may not be related and have many different cluster key values, the resulting record groups utilized to generate segments would render unfavorable levels of clustering.

To achieve more favorable levels of clustering, the record processing and storage system 2505 implements a page generator 2511 and a page storage system 2506 to store a plurality of pages 2515. The page generator 2511 is operable to generate pages 2515 from incoming records 2422 of record streams 1-L, for example, as is discussed in further detail in conjunction with FIG. 25C. Each page 2515 generated by the page generator 2511 can include a set of records, for example, in their original row format and/or in a data format as received from data sources 2501-1-2501-L. Once generated, the pages 2515 can be stored in a page storage system 2506, which can be implemented via memory drives and/or cache memory of one or more computing devices 18, such as some or all of the same or different nodes 37 storing segments 2424 as part of the segment storage system 2508.

This generation and storage of pages 2515 stored by can serve as temporary storage of the incoming records as they await conversion into segments 2424. Pages 2515 can be generated and stored over lengthy periods of time, such as hours or days. During this length time frame, pages 2515 can continue to be accumulated as one or more record streams of incoming records 1-L continue to supply additional records for storage by the database system.

The plurality of pages generated and stored over this period of time can be converted into segments, for example once a sufficient amount of records have been received and stored as pages, and/or once the page storage system 2506 runs out of memory resources to store any additional pages. It can be advantageous to accumulate and store as many records as possible in pages 2515 prior to conversion to achieve more favorable levels of clustering. In particular, performing a clustering process upon a greater numbers of records, such as the greatest number of records possible can achieve more favorable levels of clustering, For example, greater numbers of records with common cluster key values are expected to be included in the total set of pages 2515 of the page storage system 2506 when the page storage system 2506 accumulates pages over longer periods of time to include a greater number of pages. In other words. delaying the grouping of rows into segments as long as possible increases the chances of having sufficient numbers of records with same and/or similar cluster key values to group together in segments. Determining when to generate segments such that the conversion from pages into segments is delayed as long as possible, and/or such that a sufficient amount of records are converted all at once to induce more favorable levels of cluster, is discussed in further detail in conjunction with FIGS. 26A-26D. Alternatively, the conversion of pages into segments can occur at any frequency, for example, where pages are converted into segments more frequently and/or in accordance with any schedule or determination in other embodiments of the record processing and storage system 2505.

This mechanism of improving clustering levels in segment generation by delaying the clustering process required for segment generation as long as possible can be further leveraged to reduce resource utilization of the record processing and storage system 2505. As the record processing and storage system 2505 is responsible for receiving records streams from data sources for storage, for example, in the scale of terabyte per second load rates, this process of generating pages from the record streams should therefore be as efficient as possible. The page generator 2511 can be further implemented to reduce resource consumption of the record processing and storage system 2505 in page generation and storage by minimizing the processing of, movement of, and/or access to records 2422 of pages 2515 once generated as they await conversion into segments.

To reduce the processing induced upon the record processing and storage system 2505 during this data ingress, sets of incoming records 2422 can be included in a corresponding page 2515 without performing any clustering or sorting. For example, as clustering assumptions cannot be made for incoming data, incoming rows can be placed into pages based on the order that they are received and/or based on any order that best conserves resources. In some embodiments, the entire clustering process is performed by the segment generator 2517 upon all stored pages all at once, where the page generator 2511 does not perform any stages of the clustering process.

In some embodiments, to further reduce the processing induced upon the record processing and storage system 2505 during this data ingress, incoming record data of data streams 1-L undergo minimal reformatting by the page generator 2511 in generating pages 2515. In some cases, the incoming data of record streams 1-L is not reformatted and is simply "placed" into a corresponding page 2515. For example, a set of records are included in given page in accordance with formatted row data received from data sources.

While delaying segment generation in this fashion improves clustering and further improves ingress efficiency, it can be unideal to wait for records to be processed into segments before they appear in query results, particularly because the most recent data may be of the most interest to end users requesting queries. The record processing and storage system 2505 can resolve this problem by being further operable to facilitate page reads in addition to segment reads in facilitating query executions.

As illustrated in FIG. 25A, a query processing system 2502 can implement a query execution plan generator module 2503 to generate query execution plan data based on a received query request. The query execution plan data can be relayed to nodes participating in the corresponding query execution plan 2405 indicated by the query execution plan data, for example, as discussed in conjunction with FIG. 24A. A query execution module 2504 can be implemented via a plurality of nodes participating in the query execution plan 2405, for example, where data blocks are propagated upwards from nodes at IO level 2416 to a root node at root level 2412 to generate a query resultant. The nodes at IO level 2416 can perform row reads to read records 2422 from segments 2424 as discussed previously and as illustrated in FIG. 24C. The nodes at IO level 2416 can further perform row reads to read records 2422 from pages 2515. For example, once records 2422 are durably stored by being stored in a page 2515, and/or by being duplicated and stored in multiple pages 2515, the record 2422 can be available to service queries, and will be accessed by nodes 37 at IO level 2416 in executing queries accordingly. This enables the availability of records 2422 for query executions more quickly, where the records need not be processed for storage in their final storage format as segments 2424 to be accessed in query requests. Execution of a given query can include utilizing a set of records stored in a combination of pages 2515 and segments 2424. An embodiment of an IO level node that stores and accesses both segments and pages is illustrated in FIG. 25E.

The record processing and storage system 2505 can be implemented utilizing the parallelized data input sub-system 11 and/or the parallelized ingress sub-system 24 of FIG. 4. The record processing and storage system 2505 can alternatively or additionally be implemented utilizing the parallelized data store, retrieve, and/or process sub-system 12 of FIG. 6. The record processing and storage system 2505 can alternatively or additionally be implemented by utilizing one or more computing devices 18 and/or by utilizing one or more nodes 37.

The record processing and storage system 2505 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the page generator 2511 and/or of the segment generator 2517 discussed herein. In some cases, one or more individual nodes 37 and/or one or more individual processing core resources 48 can be operable to perform some or all of the functionality of the record processing and storage system 2505, such as some or all of the functionality of the page generator 2511 and/or of the segment generator 2517, independently or in tandem by utilizing their own processing resources and/or memory resources.

The query processing system 2502 can be alternatively or additionally implemented utilizing the parallelized query and results sub-system 13 of FIG. 5. The query processing system 2502 can be alternatively or additionally implemented utilizing the parallelized data store, retrieve, and/or process sub-system 12 of FIG. 6. The query processing system 2502 can alternatively or additionally be implemented by utilizing one or more computing devices 18 and/or by utilizing one or more nodes 37.

The query processing system 2502 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the query execution plan generator module 2503 and/or of the query execution module 2504 discussed herein. In some cases, one or more individual nodes 37 and/or one or more individual processing core resources 48 can be operable to perform some or all of the functionality of the query processing system 2502, such as some or all of the functionality of query execution plan generator module 2503 and/or of the query execution module 2504, independently or in tandem by utilizing their own processing resources and/or memory resources.

In some embodiments, one or more nodes 37 of the database system 10 as discussed herein can be operable to perform multiple functionalities of the database system 10 illustrated in FIG. 25A. For example, a single node can be utilized to implement the page generator 2511, the page storage system 2506, the segment generator 2517, the segment storage system 2508, the query execution plan generator module, and/or the query execution module 2504 as a node 37 at one or more levels 2410 of a query execution plan 2405. In particular, the single node can utilize different processing core resources 48 to implement different functionalities in parallel, and/or can utilize the same processing core resources 48 to implement different functionalities at different times.

Some or all data sources 2501 can implemented utilizing at least one processor and at least one memory. Some or all data sources 2501 can be external from database system 10 and/or can be included as part of database system 10. For example, the at least one memory of a data source 2501 can store operational instructions that, when executed by the at least one processor of the data source 2501, cause the data source 2501 to perform some or all of the functionality of data sources 2501 described herein. In some cases, data sources 2501 can receive application data from the database system 10 for download, storage, and/or installation. Execution of the stored application data by processing modules of data sources 2501 can cause the data sources 2501 to execute some or all of the functionality of data sources 2501 discussed herein.

In some embodiments, system communication resources 14, external network(s) 17, local communication resources 25, wide area networks 22, and/or other communication resources of database system 10 can be utilized to facilitate any transfer of data by the record processing and storage system 2505. This can include, for example: transmission of record streams 1-L from data sources 2501 to the record processing and storage system 2505; transfer of pages 2515 to page storage system 2506 once generated by the page generator 2511: access to pages 2515 by the segment generator 2517; transfer of segments 2424 to the segment storage system 2508 once generated by the segment generator 2517: communication of query execution plan data to the query execution module 2504, such as the plurality of nodes 37 of the corresponding query execution plan 2405; reading of records by the query execution module 2504, such as IO level nodes 37, via access to pages 2515 stored page storage system 2506 and/or via access to segments 2424 stored segment storage system 2508; sending of data blocks generated by nodes 37 of the corresponding query execution plan 2405 to other nodes 37 in conjunction with their execution of the query; and/or any other accessing of data, communication of data, and/or transfer of data by record processing and storage system 2505 and/or within the record processing and storage system 2505 as discussed herein.

FIG. 25B illustrates an example embodiment of the record processing and storage system 2505 of FIG. 25A. Some or all of the features illustrated and discussed in conjunction with the record processing and storage system 2505 FIG. 25B can be utilized to implement the record processing and storage system 2505 and/or any other embodiment of the record processing and storage system 2505 described herein.

The record processing and storage system 2505 can include a plurality of stream loader modules 2510-1-2510-N. Each stream loader module 2510 can be implemented via its own processing and/or memory resources. For example, each stream loader module 2510 can be implemented via its own computing device 18, via its own node 37, and/or via its own processing core resource 48. The plurality of stream loader modules 2510-1-2510-N can be implemented to perform some or all of the functionality of the record processing and storage system 2505 in a parallelized fashion.

The record processing and storage system 2505 can include queue reader 2559, a plurality of stateful file readers 2556-1-2556-N, and/or stand-alone file readers 2558-1-2558-N. For example, the queue reader 2559, a plurality of stateful file readers 2556-1-2556-N, and/or stand-alone file readers 2558-1-2558-N are utilized to enable each stream loader modules 2510 to receive one or more of the record streams 1-L received from the data sources 2501-1-2501-L as illustrated in FIG. 25A. For example, each stream loader module 2510 receives a distinct subset of the entire set of records received by the record processing and storage system 2505 at a given time.

Each stream loader module 2510 can receive records 2422 in one or more record streams via its own stateful file reader 2556 and/or stand-alone file reader 2558. Each stream loader module 2510 can optionally receive records 2422 and/or otherwise communicate with a common queue reader 2559. Each stateful file reader 2556 can communicate with a metadata cluster 2552 that includes data supplied by and/or corresponding to a plurality of administrators 2554-1-2554-M. The metadata cluster 2552 can be implemented by utilizing the administrative processing sub-system 15 and/or the configuration sub-system 16. The queue reader 2559, each stateful file reader 2556, and/or each stand-alone file reader 2558 can be implemented utilizing the parallelized ingress sub-system 24 and/or the parallelized data input sub-system 11. The metadata cluster 2552, the queue reader 2559, each stateful file reader 2556, and/or each stand-alone file reader 2558 can be implemented utilizing at least one computing device 18 and/or at least one node 37. In cases where a given stream loader module 2510 is implemented via its own computing device 18 and/or node 37, the same computing device 18 and/or node 37 can optionally be utilized to implement the stateful file reader 2556, and/or each stand-alone file reader 2558 communicating with the given stream loader module 2510.

Each stream loader module 2510 can implement its own page generator 2511, its own index generator 2513, and/or its own segment generator 2517, for example, by utilizing its own processing and/or memory resources such as the processing and/or memory resources of a corresponding computing device 18. For example, the page generator 2511 of FIG. 25A can be implemented as a plurality of page generators 2511 of a corresponding plurality of stream loader modules 2510 as illustrated in FIG. 25B. Each page generator 2511 of FIG. 25B can process its own incoming records 2422 to generate its own corresponding pages 2515.

As pages 2515 are generated by the page generator 2511 of a stream loader module 2510, they can be stored in a page cache 2512. The page cache 2512 can be implemented utilizing memory resources of the stream loader module 2510, such as memory resources of the corresponding computing device 18. For example, the page cache 2512 of each stream loader module 2010-1-2010-N can individually or collectively implement some or all of the page storage system 2506 of FIG. 25A.

The segment generator 2517 of FIG. 25A can similarly be implemented as a plurality of segment generators 2517 of a corresponding plurality of stream loader modules 2510 as illustrated in FIG. 25B. Each segment generator 2517 of FIG. 25B can generate its own set of segments 2424-1-2424-J included in one or more segment groups 2522. The segment group 2522 can be implemented as the segment group of FIG. 23, for example, where J is equal to five or another number of segments configured to be included in a segment group. In particular, J can be based on the redundancy storage encoding scheme utilized to generate the set of segments and/or to generate the corresponding parity data 2426.

The segment generator 2517 of a stream loader module 2510 can access the page cache 2512 of the stream loader module 2510 to convert the pages 2515 previously generated by the page generator 2511 into segments. In some cases, each segment generator 2517 requires access to all pages 2515 generated by the segment generator 2517 since the last conversion process of pages into segments. The page cache 2512 can optionally store all pages generated by the page generator 2511 since the last conversion process, where the segment generator 2517 accesses all of these pages generated since the last conversion process to cluster records into groups and generate segments. For example, the page cache 2512 is implemented as a write-through cache to enable all previously generated pages since the last conversion process to be accessed by the segment generator 2517 once the conversion process commences.

In some cases, each stream loader module 2510 implements its segment generator 2517 upon only the set of pages 2515 that were generated by its own page generator 2511, accessible via its own page cache 2512. In such cases, the record grouping via clustering key to create segments with the same or similar cluster key values are separately performed by each segment generator 2517 independently without coordination, where this record grouping via clustering key is performed on N distinct sets of records stored in the N distinct sets of pages generated by the N distinct page generators 2511 of the N distinct stream loader modules 2510. In such cases, despite records never being shared between stream loader modules 2510 to further improve clustering, the level of clustering of the resulting segments generated independently by each stream loader module 2510 on its own data is sufficient, for example, due to the number of records in each stream loader module's 2510 set of pages 2515 for conversion being sufficiently large to attain favorable levels of clustering.

In such embodiments, each stream loader modules 2510 can independently initiate its own conversion process of pages 2515 into segments 2424 by waiting as long as possible based on its own resource utilization, such as memory availability of its page cache 2512. Different segment generators 2517 of the different stream loader modules 2510 can thus perform their own conversion of the corresponding set of pages 2515 into segments 2424 at different times, based on when each stream loader modules 2510 independently determines to initiate the conversion process, for example, based on each independently making the determination to generate segments as discussed in conjunction with FIG. 26A. Thus, as discussed herein, the conversion process of pages into segments can correspond to a single stream loader module 2510 converting all of its pages 2515 generated by its own page generator 2511 since its own last the conversion process into segments 2424, where different stream loader modules 2510 can initiate and execute this conversion process at different times and/or with different frequency.

In other cases, it is ideal for even more favorable levels of clustering to be attained via sharing of all pages for conversion across all stream loader modules 2510. In such cases, a collective decision to initiate the conversion process can be made across some or all stream loader modules 2510, for example, based on resource utilization across all stream loader modules 2510. The conversion process can include sharing of and/or access to all pages 2515 generated via the process, where each segment generator 2517 accesses records in some or all pages 2515 generated by and/or stored by some or all other stream loader modules 2510 to perform the record grouping by cluster key. As the full set of records is utilized for this clustering instead of N distinct sets of records, the levels of clustering in resulting segments can be further improved in such embodiments. This improved level of clustering can offset the increased page movement and coordination required to facilitate page access across multiple stream loader modules 2510. As discussed herein, the conversion process of pages into segments can optionally correspond to multiple stream loader modules 2510 converting all of their collectively generated pages 2515 since their last conversion process into segments 2424 via sharing of their generated pages 2515.

An index generator 2513 can optionally be implemented by some or all stream loader modules 2510 to generate index data 2516 for some or all pages 2515 prior to their conversion into segments. The index data 2516 generated for a given page 2515 can be appended to the given page, can be stored as metadata of the given page 2515, and/or can otherwise be mapped to the given page 2515. The index data 2516 for a given page 2515 correspond to page metadata, for example, indexing records included in the corresponding page. As a particular example, the index data 2516 can include some or all of the data of index data 2518 generated for segments 2424 as discussed previously, such as index sections 0-*x* of FIG. 23. As another example, the index data 2516 can include indexing information utilized to determine the memory location of particular records and/or particular columns within the corresponding page 2515.

In some cases, the index data 2516 can be generated to enable corresponding pages 2515 to be processed by query IO operators utilized to read rows from pages, for example, in a same or similar fashion as index data 2518 is utilized to read rows from segments. In some cases, index probing operations can be utilized by and/or integrated within query IO operators to filter the set of rows returned in reading a page 2515 based on its index data 2516 and/or to filter the set of rows returned in reading a segment 2424 based on its index data 2518.

In some cases, index data 2516 is generated by index generator 2513 for all pages 2515, for example, as each page 2515 is generated, or at some point after each page 2515 is generated. In other cases, index data 2516 is only generated for some pages 2515, for example, where some pages do not have index data 2516 as illustrated in FIG. 25B. For example, some pages 2515 may never have corresponding index data 2516 generated prior to their conversion into segments. In some cases, index data 2516 is generated for a given page 2515 with its records are to be read in execution of a query by the query processing system 2502. For example, a node 37 at IO level 2416 can be implemented as a stream loader module 2510 and can utilize its index generator 2513 to generate index data 2516 for a particular page 2515 in response to having query execution plan data indicating that records 2422 be read the particular page from the page cache 2512 of the stream loader module in conjunction with execution of a query. The index data 2516 can be optionally stored temporarily for the life of the given query to facilitate reading of rows from the corresponding page for the given query only. The index data 2516 alternatively be stored as metadata of the page 2515 once generated, as illustrated in FIG. 25B. This enables the previously generated index data 2516 of a given page to be utilized in subsequent queries requiring reads from the given page.

As illustrated in FIG. 25B, each stream loader modules 2510 can generate and send pages 2515, corresponding index data 2516, and/or segments 2424 to long term storage 2540-1-2540-J of a particular storage cluster 2535. For example, system communication resources 14 can be utilized to facilitate sending of data from stream loader modules 2510 to storage cluster 2535 and/or to facilitate sending of data from storage cluster 2535 to stream loader modules 2510.

The storage cluster 2535 can be implemented by utilizing a storage cluster 35 of FIG. 6, where each long term storage 2540-1-2540-J is implemented by a corresponding computing device 18-1-18-J and/or by a corresponding node 37-1-37-J. In some cases, each storage cluster **35-1-35-*z* of FIG. 6 can receive pages 2515, corresponding index data 2516, and/or segments 2424 from its own set of stream loader modules 2510-1-2510-N, where the record processing and storage system 2505 of FIG. 25B can include z sets of stream loader modules 2510-1-2510-N that each generate pages 2515, segments 2424, and/or index data 2516 for storage in its own corresponding storage cluster 35**.

The processing and/or memory resources utilized to implement each long term storage 2540 can be distinct from the processing and/or memory resources utilized to implement the stream loader modules 2510. Alternatively, some stream loader modules can optionally share processing and/or memory resources long term storage 2540, for example, where a same computing device 18 and/or a same node 37 implements a particular long term storage 2540 and also implements a particular stream loader modules 2510.

Each stream loader module 2510 can generate and send the segments 2424 to long term storage 2540-1-2540-J in a set of persistence batches 2532-1-2532-J sent to the set of long term storage 2540-1-2540-J as illustrated in FIG. 25B. For example, upon generating a segment group 2522 of J segments 2424, a stream loader module 2510 can send each of the J segments in the same segment group to a different one of the set of long term storage 2540-1-2540-J in the storage cluster 2535. For example, a particular long term storage 2540 can generate recovered segments as necessary for processing queries and/or for rebuilding missing segments due to drive failure as illustrated in FIG. 24D, where the value K of FIG. 24D is less than the value J and wherein the nodes 37 of FIG. 24D are utilized to implement the long term storage 2540-1-2540-J.

As illustrated in FIG. 25B, each persistence batch 2532-1-2532-J can optionally or additionally include pages 2515 and/or their corresponding index data 2516 generated via index generator 2513. Some or all pages 2515 that are generated via a stream loader module 2510's page generator 2511 can be sent to one or more long term storage 2540-1-2540-J. For example, a particular page 2515 can be included in some or all persistence batches 2532-1-2532-J sent to multiple ones of the set of long term storage 2540-1-2540-J for redundancy storage as replicated pages stored in multiple locations for the purpose of fault tolerance. Some or all pages 2515 can be sent to storage cluster 2535 for storage prior to being converted into segments 2424 via segment generator 2517. Some or all pages 2515 can be stored by storage cluster 2535 until corresponding segments 2424 are generated, where storage cluster 2535 facilitates deletion of these pages from storage in one or more long term storage 2540-1-2540-J once these pages are converted and/or have their records 2422 successfully stored by storage cluster 2535 in segments 2424.

In some cases, a stream loader module 2510 maintains storage of pages 2515 via page cache 2512, even if they are sent to storage cluster 2535 in persistence batches 2532. This can enable the segment generator 2517 to efficiently read pages 2515 during the conversion process via reads from this local page cache 2512. This can be ideal in minimizing page movement, as pages do not need to be retrieved from long term storage 2540 for conversion into segments by stream loader modules 2510 and can instead be locally accessed via maintained storage in page cache 2512. Alternatively, a stream loader module 2510 removes pages 2515 from storage via page cache 2512 once they are determined to be successfully stored in long term storage 2540. This can be ideal in reducing the memory resources required by stream loader module 2510 to store pages, as only pages that are not yet durably stored in long term storage 2540 need be stored in page cache 2512.

Each long term storage 2540 can include its own page storage 2546 that stores received pages 2515 generated by and received from one or more stream loader modules 2010-1-2010-N, implemented utilizing memory resources of the long term storage 2540. For example, the page storage 2546 of each long term storage 2540-1-2540-J can individually or collectively implement some or all of the page storage system 2506 of FIG. 25A. The page storage 2546 can optionally store index data 2516 mapped to and/or included as metadata of its pages 2515. Each long term storage 2540 can alternatively or additionally include its own segment storage 2548 that stores segments generated by and received from one or more stream loader modules 2010-1-2010-N. For example, the segment storage 2548 of each long term storage 2540-1-2540-J can individually or collectively implement some or all of the segment storage system 2508 of FIG. 25A.

The pages 2515 stored in page storage 2546 of long term storage 2540 and/or the segments 2424 stored in segment storage 2548 of long term storage 2540 can be accessed to facilitate execution of queries. As illustrated in FIG. 25B, each long term storage 2540-1-2540-J can perform IO operators 2542 to facilitate reads of records in pages 2515 stored in their page storage 2546 and/or to facilitate reads of records in segments 2424 stored in their segment storage 2548. For example, some or all long term storage 2540-1-2540-J can be implemented as nodes 37 at the IO level 2416 of one or more query execution plans 2405. In particular, the some or all long term storage 2540-1-2540-J can be utilized to implement the query processing system 2502 by facilitating reads to stored records via IO operators 2542 in conjunction with query executions.

Note that at a given time, a given page 2515 may be stored in the page cache 2512 of the stream loader module 2510 that generated the given page 2515, and may alternatively or additionally be stored in one or more long term storage 2540 of the storage cluster 2535 based on being sent to the in one or more long term storage 2540. Furthermore, at a given time, a given record may be stored in a particular page 2515 in a page cache 2512 of a stream loader module 2510, may be stored the particular page 2515 in page storage 2546 of one or more long term storage 2540, and/or may be stored in exactly one particular segment 2424 in segment storage 2548 of one long term storage 2540.

Because records can be stored in multiple locations of storage cluster 2535, the long term storage 2540 of storage cluster 2535 can be operable to collectively store page and segment ownership consensus 2544. This can be useful in dictating which long term storage 2540 is responsible for accessing each given record stored by the storage cluster 2535 via IO operators 2542 in conjunction with query execution. In particular, as a query resultant is only guaranteed to be correct if each required record is accessed exactly once, records reads to a particular record stored in multiple locations could render a query resultant as incorrect. The page and segment ownership consensus 2544 can include one or more versions of ownership data, for example, that is generated via execution of a consensus protocol mediated via the set of long term storage 2540-1-2540-J. The page and segment ownership consensus 2544 can dictate that every record is owned by exactly one long term storage 2540 via access to either a page 2515 storing the record or a segment 2424 storing the record, but not both. The page and segment ownership consensus 2544 can indicate, for each long term storage 2540 in the storage cluster 2535, whether some or all of its pages 2515 or some or all of its segments 2424 are to be accessed in query executions, where each long term storage 2540 only accesses the pages 2515 and segments 2424 indicated in page and segment ownership consensus 2544.

In such cases, all record access for query executions performed by query execution module 2504 via nodes 37 at IO level 2416 can optionally be performed via IO operators 2542 accessing page storage 2546 and/or segment storage 2548 of long term storage 2540, as this access can guarantee reading of records exactly once via the page and segment ownership consensus 2544. For example, the long term storage 2540 can be solely responsible for durably storing the records utilized in query executions. In such embodiments, the cached and/or temporary storage of pages and/or segments of stream loader modules 2510, such as pages 2515 in page caches 2512, are not read for query executions via accesses to storage resources of stream loader modules 2510.

FIG. 25C illustrates an example embodiment of a page generator 2511. The page generator 2511 of FIG. 25C can be utilized to implement the page generator 2511 of FIG. 25A, can be utilized to implement each page generator 2511 of each stream loader module 2510 of FIG. 25B, and/or can be utilized to implement any embodiments of page generator 2511 described herein.

A single incoming record stream, or multiple incoming record streams 1-L, can include the incoming records 2422 as a stream of row data 2910. Each row data 2910 can be transmitted as an individual packet and/or a set of packets by the corresponding data source 2501 to include a single record 2422, such as a single row of a database table. Alternatively each row data 2910 can transmitted by the corresponding data source 2501 as an individual packet and/or a set of packets to include a batched set of multiple records 2422, such as multiple rows of a database table. Row data 2910 received from the same or different data source over time can each include a same number of rows or a different number of rows, and can be sent in accordance with a particular format. Row data 2910 received from the same or different data source over time can include records with the same or different numbers of columns, with the same or different types and/or sizes of data populating its columns, and/or with the same or different row schemas. In some cases, row data 2910 is received in a stream over time for processing by a stream loader module 2510 via a stateful file reader 2556 and/or via a stand-alone file reader 2558.

Incoming rows can be stored in a pending row data pool 3410 while they await conversion into pages 2515. The pending row data pool 3410 can be implemented as an ordered queue or an unordered set. The pending row data pool 3410 can be implemented by utilizing storage resources of the record processing and storage system. For example, each stream loader module 2510 can have its own pending row data pool 3410. Alternatively, multiple stream loader modules 2510 can access the same pending row data pool 3410 that stores all incoming row data 2910, for example, by utilizing queue reader 2559.

The page generator 2511 can facilitate parallelized page generation via a plurality of processing core resources 48-1-48-W. For example, each stream loader module 2510 has its own plurality of processing core resources 48-1-48-W, where the processing core resources 48-1-48-W of a given stream loader module 2510 is implemented via the set of processing core resources 48 of one or more nodes 37 utilized to implement the given stream loader module 2510. As another example, the plurality of processing core resources 48-1-48-W are each implemented by a corresponding one of the set of each stream loader module 2510-1-2510-N, for example, where each stream loader module 2510-1-2510-N is implemented via its own processing core resources 48-1-48-W.

Over time, each processing core resource 48 can retrieve and/or can be assigned pending row data 2910 in the pending row data pool 3410. For example, when a given processing core resource 48 has finished another job, such as completed processing of another row data 2910, the processing core resource 48 can fetch a new row data 2910 for processing into a page 2515. For example, the processing core resource 48 retrieves a first ordered row data 2910 from a queue of the pending row data pool 3410, retrieves a highest priority row data 2910 from the pending row data pool 3410, retrieves an oldest row data 2910 from the pending row data pool 3410, and/or retrieves a random row data 2910 from the pending row data pool 3410. Once one processing core resource 48 retrieves and/or otherwise utilizes a particular row data 2910 for processing into a page, the particular row data 2910 is removed from the pending row data pool 3410 and/or is otherwise not available for processing by other processing core resources 48.

Each processing core resource 48 can generate pages 2515 from the row data received over time. As illustrated in FIG. 25C, the pages 2515 are depicted to include only one row data, such as a single row or multiple rows batched together in the row data 2910. For example, each page is generated directly from corresponding row data 2910. Alternatively, a page 2515 can include multiple row data 2910, for example, in sequence and/or concatenated in the page 2515. The page can include multiple row data 2910 from a single data source 2501 and/or can include multiple row data 2910 from multiple different data sources 2501. For example, the processing core resource 48 can retrieve one row data 2910 from the pending row data pool 3410 at a time, and can append each row data 2910 to a given page until the page 2515 is complete, where the processing core resource 48 appends subsequently retrieved row data 2910 to a new page. Alternatively, the processing core resource 48 can retrieve multiple row data 2910 at once, and can generate a corresponding page 2515 to include this set of multiple row data 2910.

Once a page 2515 is complete, the corresponding processing core resource 48 can facilitate storage of the page in page storage system 2506. This can include adding the page 2515 to the page cache 2512 of the corresponding stream loader module 2510. This can include facilitating sending of the page 2515 to one or more long term storage 2540 for storage in corresponding page storage 2546. Different processing core resources 48 can each facilitate storage of the page via common resources, or via designated resources specific to each processing core resources 48, of the page storage system 2506.

Figure 25D:
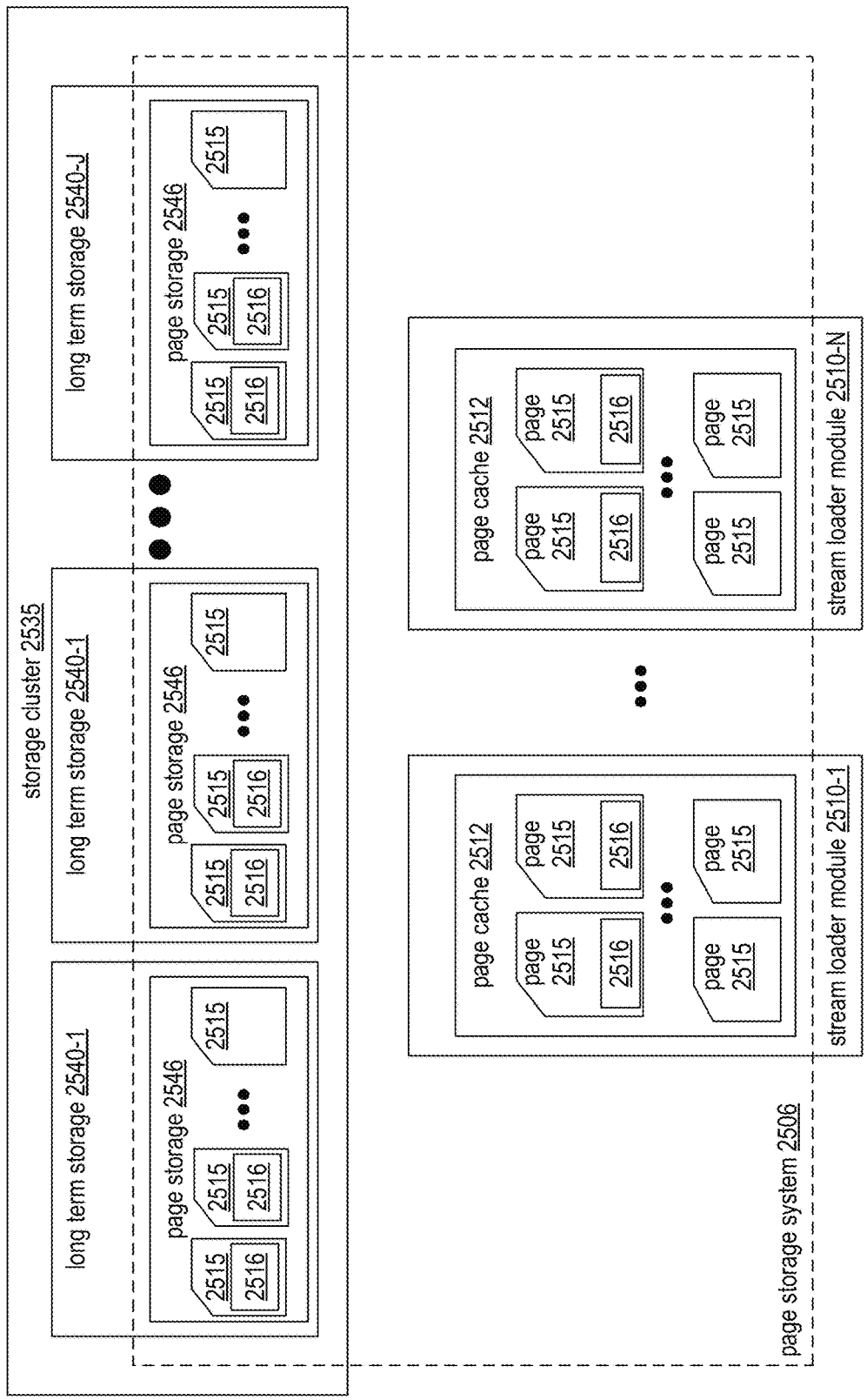
FIG. 25D is a schematic block diagrams of an embodiment of a page storage system of a record processing and storage system in accordance with various embodiments of the present invention.
Figure 25E:
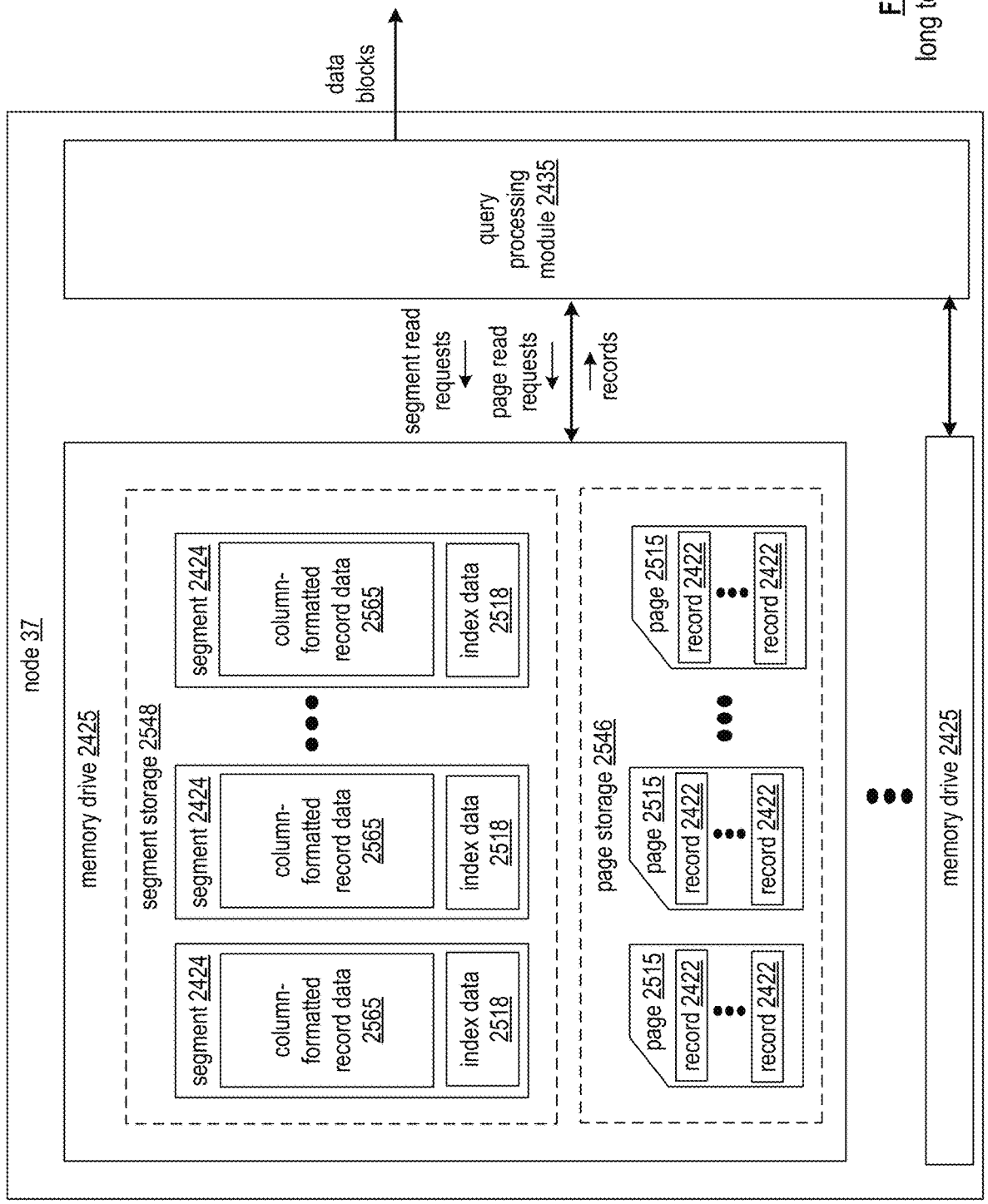
FIG. 25E is a schematic block diagrams of a node that implements a query processing module that reads records from segment storage and page storage in accordance with various embodiments of the present invention.

FIG. 25D illustrates an example embodiment of the page storage system 2506. As used herein, the page storage system 2506 can include page cache 2512 of a single stream loader module 2510: can include page caches 2512 of some or all stream loader module 2510-1-2510-N: can include page storage 2546 of a single long term storage 2540 of a storage cluster 2535: can include page storage 2546 of some or all long term storage 2540-1-2540-J of a single storage cluster 2535; can include page storage 2546 of some or all long term storage 2540-1-2540-J of multiple different storage clusters, such as some or all storage clusters 35-1-35-z: and/or can include any other memory resources of database system 10 that are utilized to temporarily and/or durably store pages.

FIG. 25E illustrates an example embodiment of a node 37 utilized to implement a given long term storage 2540 of FIG. 25B. The node 37 of FIG. 25E can be utilized to implement the node 37 of FIG. 25B, FIG. 25C, 25D, some or all nodes 37 at the IO level 2416 of a query execution plan 2405 of FIG. 24A, and/or any other embodiments of node 37 described herein. As illustrated a given node 37 can have its own segment storage 2548 and/or its own page storage 2546 by utilizing one or more of its own memory drives 2425. Note that while the segment storage 2548 and page storage 2546 are segregated in the depiction of a memory drives 2425, any resources of a given memory drive or set of memory drives can be allocated for and/or otherwise utilized to store either pages 2515 or segments 2424. Optionally, some particular memory drives 2425 and/or particular memory locations within a particular memory drive can be designated for storage of pages 2515, while other particular memory drives 2425 and/or other particular memory locations within a particular memory drive can be designated for storage of segments 2424.

The node 37 can utilize its query processing module 2435 to access pages and/or records in conjunction with its role in a query execution plan 2405, for example, at the IO level 2416. For example, the query processing module 2435 generates and sends segment read requests to access records stored in segments of segment storage 2548, and/or generates and sends page read requests to access records stored in pages 2515 of page storage 2546. In some cases, in executing a given query, the node 37 reads some records from segments 2424 and reads other records from pages 2515, for example, based on assignment data indicated in the page and segment ownership consensus 2544. The query processing module 2435 can generate its data blocks to include the raw row data of the read records and/or can perform other query operators to generate its output data blocks as discussed previously. The data blocks can be sent to another node 37 in the query execution plan 2405 for processing as discussed previously, such as a parent node and/or a node in a shuffle node set within the same level 2410.

Figure 26A:
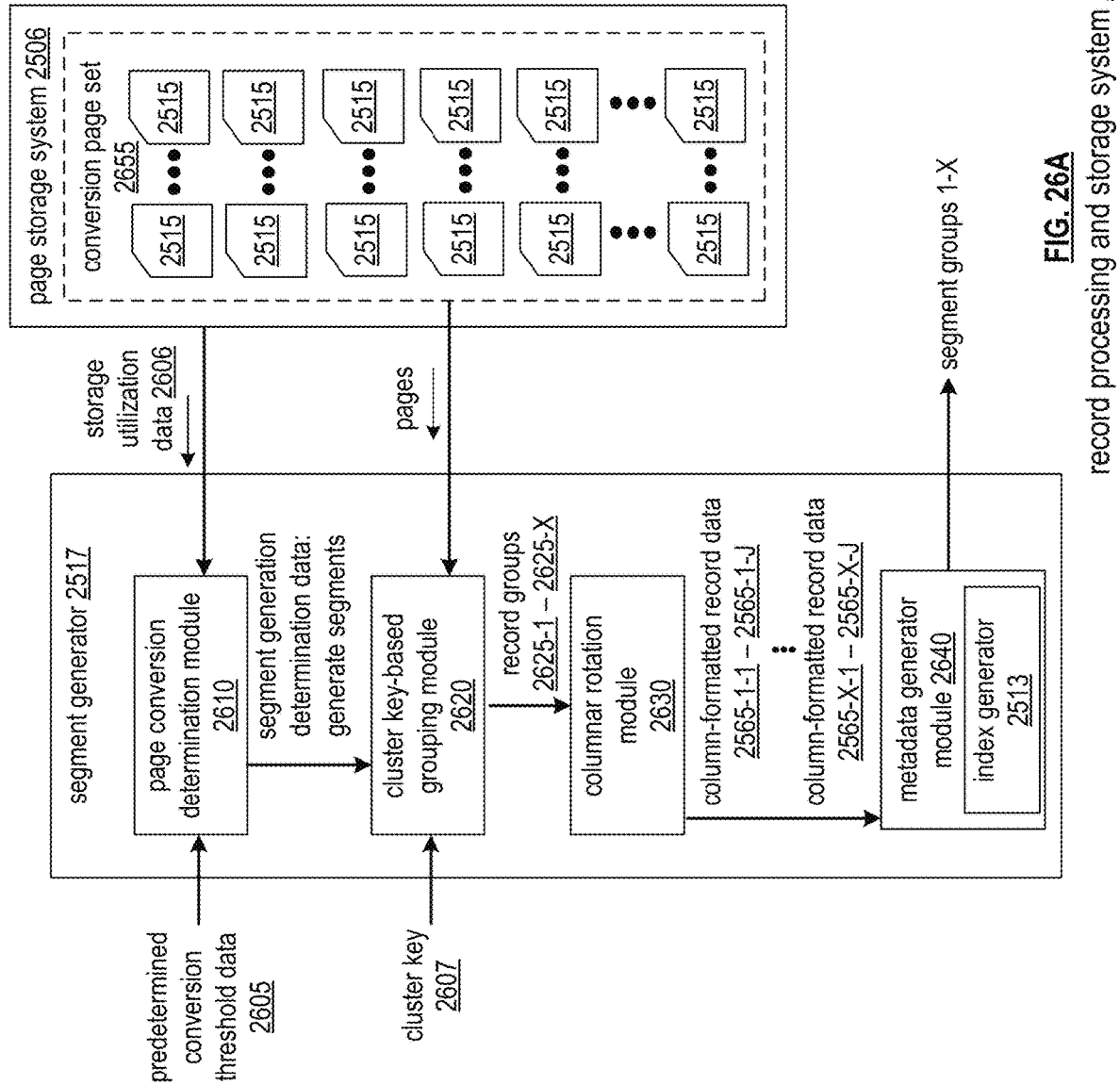
FIG. 26A is a schematic block diagram of a segment generator of a record processing and storage system in accordance with various embodiments of the present invention.

FIG. 26A illustrates an example embodiment of a segment generator 2517. The segment generator 2517 of FIG. 26A can be utilized to implement the segment generator 2517 of FIG. 25A, can be utilized to implement each segment generator 2517 of each stream loader module 2510 of FIG. 25B, and/or can be utilized to implement any embodiments of segment generator 2517 described herein.

As discussed previously, the record processing and storage system 2505 can be operable to delay the conversion of pages into segments. Rather than frequently clustering rows and converting rows into column format, movement and/or processing of rows can be minimized by delaying the clustering and conversion process required to generate segments 2424, for example, as long as possible. This delaying of the conversion process "as long as possible" can be bounded by resource availability, such as disk and/or memory capacity of the record processing and storage system 2505. In particular, the conversion process can be delayed to accumulate as many pages in the page storage system 2506 that page storage system 2506 is capable of storing.

Maximizing the delay until pages are processed as enabled by storage resources of the record processing and storage system 2505 improves the technology of database systems by improving query efficiency. In particular, delaying the decision of which rows to group together into segments as long as possible increased the chances of having many records with common cluster key values to group together, as cluster key-based groups are formed from a largest possible set of records. These more favorable levels of clustering enable queries to be performed more efficiently as discussed previously. For example, rows that need be accessed in a given query as dictated by filtering parameters of the query are more likely to be stored together, and fewer segments and/or memory locations need to be accessed.

Maximizing the delay until pages are processed as enabled by storage resources of the record processing and storage system 2505 improves the technology of database systems by improving data ingress efficiency. By placing rows directly into pages without regard for clustering as they are received, this delayed approach minimizes the number of times a row "moves" through the system, such as from disk, to memory, and/or through the processor. In particular, by delaying all clustering until segment generation for the received rows all at once, the rows are moved exactly once, to their final resting place as a segment 2424. This conserves resources of the record processing and storage system 2505, enabling higher rates of records to be received and processed for storage via data sources 2501 and thus enabling a richer, denser database to be generated over time. For example, this can enable the record processing and storage system 2505 to effectively process incoming records at a scale of terabits per second.

This delay can be accomplished via a page conversion determination module 2610 implemented by the segment generator 2517 and/or implemented via other processing resources of the record processing and storage system 2505. The page conversion determination module 2610 can be utilized to generate segment generation determination data indicating whether the conversion process of pages into segments should be commenced at a given time. For example, the page conversion determination module 2610 generates an interrupt or notification that includes the generate segment generation determination data indicating it is time to generate segments based on determining to generate segments at the given time. The page conversion determination module 2610 can otherwise trigger the commencement of converting pages into segments once it deems the conversion process appropriate, for example, based on delaying as long as possible. The segment generator 2517 can commence the conversion process accordingly in response to the segment generation determination data indicating it is time to generate segments, for example, via a cluster key-based grouping module 2620, a columnar rotation module 2630, and/or a metadata generator module 2640. The delay of converting pages into segments via the page conversion determination module 2610 and the repeating of this process over time is discussed in further detail in conjunction with the example timeline of FIG. 26B.

In some cases, the page conversion determination module 2610 optionally generates some segment generation determination data indicating it is not yet time to generate segments. In some embodiments, this information may not be communicated if it is determined that is not yet time to generate segments, where only notifications instructing the conversion process be commenced is communicated to initiate the process via cluster key-based grouping module 2620, a columnar rotation module 2630, and/or a metadata generator module 2640.

The page conversion determination module 2610 can generate segment generation determination data: in predetermined intervals: in accordance with a schedule; in response to determining a new page has been generated and stored in page storage system 2506; in response determining at least a threshold number of new pages have been generated and stored in page storage system 2506; in response to determining the storage space and/or memory utilization of page storage system 2506 has changed: in response to determining the total storage capacity of page storage system 2506 has changed: in response to determining at least one memory drive of the page storage system 2506 has failed or gone offline: in response to receiving storage utilization data from page storage system 2506; based on instruction supplied via user input, for example, via administration sub-system 15 and/or configuration sub-system 16; based on receiving a request; and/or based on another determination.

The page conversion determination module 2610 can generate its segment generation determination data based on comparing storage utilization data 2606 to predetermined conversion threshold data 2605. The storage utilization data can optionally be generated by the page storage system 2506. The record processing and storage system 2505 can indicate and/or be based on one or more storage utilization metrics indicating: an amount and/or percentage of storage resources of the page storage system 2506 that are currently being utilized to store pages 2515: an amount and/or percentage of available resources of the page storage system 2506 that are not currently being utilized to store pages 2515: a number of pages 2515 currently stored by the page storage system 2506; a data size, such as a number of bytes, of the set of pages 2515 currently stored by the page storage system 2506; an expected amount of time until storage resources of the page storage system 2506 are expected to become fully utilized for page storage based on current and/or historical data rates of record streams 1-L; current health data and/or failure data of storage resources of the page storage system 2506: an amount of time since the last conversion process was initiated and/or was completed: and/or other information regarding the storage utilization of the page storage system 2506.

In some cases, the storage utilization data 2606 can relate specifically to storage utilization of a page cache 2512 of a stream loader module 2510 of FIG. 25B, where the segment generator 2517 of FIG. 26A is implemented by the corresponding stream loader module 2510 and where the segment generator 2517 of FIG. 26A is operable to perform the conversion process only upon pages 2515 in the page cache 2512. In some cases, the storage utilization data 2606 can relate specifically to storage utilization across all page caches 2512 of all stream loader modules 2510-1-2510-N, where the page conversion determination module 2610 of FIG. 26A is implemented to dictate whether the conversion process be commenced across all corresponding stream loader modules 2510. In some cases, the storage utilization data 2606 can alternatively or include to storage utilization of page storage 2546 of one or more of the long term storage 2540-1-2540-J of FIG. 25B. The storage utilization data 2606 can relate to any combination of storage resources of page storage system 2506 as discussed in conjunction with FIG. 25D that are utilized to store a particular set of pages to be converted into segments in tandem via the conversion process performed by segment generator 2517.

The storage utilization data 2606 can be sent to and/or requested by the segment generator 2517: in predefined intervals; in accordance with scheduling data: based on the page conversion determination module 2610 determining to generate the segment generation determination data: based on a determination, notification, and/or instruction that the page conversion determination module 2610 should generate the segment generation determination data; and/or based on another determination. In some cases, some or all of the page conversion determination module 2610 is implemented via processing resources and/or memory resources of the page storage system 2506, for example, to enable the page conversion determination module 2610 to monitor and/or measure the storage utilization data 2606 of its own resources included in page storage system 2506.

The predetermined conversion threshold data 2605 can indicate one or more threshold metrics or other threshold conditions that, when met by one or more corresponding metrics of the storage utilization data 2606 at a given time, trigger the commencement of the conversion process. In particular, the page conversion determination module generates the segment generation determination data indicating that segments be generated when the at least one metric of the storage utilization data 2606 meets the threshold metrics and/or conditions of the predetermined conversion threshold data 2605 and/or otherwise compares favorably to a condition for page conversion indicated by the predetermined conversion threshold data 2605. If the none of the metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, the page conversion determination module generates the segment generation determination data indicating that segments be generated only when at least a predetermined threshold number of metrics of the storage utilization data 2606 compare favorably to the corresponding threshold metrics of the predetermined conversion threshold data 2605. In such cases, if less than the predetermined threshold number of metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, there is only one metric in the storage utilization data 2606 that is compared to a corresponding metric of the predetermined conversion threshold data 2605, and the page conversion determination module generates the segment generation determination data when the metric in the storage utilization data 2606 meets or otherwise compares favorably to the corresponding metric of the predetermined conversion threshold data 2605.

As used herein, the storage utilization data 2606 compares favorably to the predetermined conversion threshold data 2605 when the conditions indicated in the predetermined conversion threshold data 2605 that dictate the conversion process be initiated are met by corresponding metrics of the storage utilization data 2606. As used herein, the storage utilization data 2606 compares unfavorably to the predetermined conversion threshold data 2605 when the conditions indicated in the predetermined conversion threshold data 2605 that dictate the conversion process be initiated are not met by corresponding metrics of the storage utilization data 2606. In some embodiments, the page conversion determination module 2610 generates the segment generation determination data indicating that segments be generated and/or otherwise indicating that the conversion process be initiated only when the storage utilization data 2606 compares favorably to the predetermined conversion threshold data 2605.

The predetermined conversion threshold data 2605 can indicate one or more conditions that trigger the conversion process such as: a total memory capacity of page storage system 2506: a threshold maximum amount and/or percentage of storage resources of the page storage system 2506 that can be utilized to store pages 2515: a threshold minimum amount and/or percentage of resources page storage system that must remain available: a threshold minimum number of pages 2515 that must be included in the set of pages for conversion: a threshold maximum number of pages 2515 that can be converted in a single conversion process: a threshold maximum and/or threshold a data size of the set of pages that can be converted in a single conversion process: a threshold minimum amount of time that storage resources of the page storage system can be expected to become fully utilized for page storage based on current and/or historical data rates of record streams 1-L; threshold requirements for health data and/or failure data of storage resources of the page storage system 2506: a threshold minimum and/or threshold maximum amount of time at which a new conversion process must commence since the last conversion process was initiated and/or was completed: and/or other information regarding the requirements and/or conditions for initiation of the conversion process.

The predetermined conversion threshold data 2605 can be received and/or configured based on user input, for example, via administrative sub-system 15 and/or via configuration sub-system 16. The predetermined conversion threshold data 2605 can alternatively or additionally be determined automatically by the record processing and storage system 2505. For example, the predetermined conversion threshold data 2605 can be determined automatically to indicate and/or be based on determining a threshold memory capacity of the page storage system 2506: based on determining a threshold amount of bytes worth of pages 2515 the page storage system 2506 can store: and/or based on determining a threshold expected and/or average amount of time that pages can be generated and stored in the page storage system 2506 by the page generator 2511 until the page storage system 2506 becomes full. Note that these thresholds can be automatically buffered to account for a threshold percentage of drive failures, a historical expected rate of drive failures, a threshold amount of additional pages data that may be stored in communication lag since the storage utilization data 2606 was sent, a threshold amount of additional pages data that may be stored in processing lag to perform some or all of the conversion process, and/or other buffering to ensure that segment generation is completed before page storage system 2506 reaches its capacity.

As another example, the predetermined conversion threshold data 2605 can be determined automatically based on determining a sufficient number of records 2422 and/or a sufficient number of pages 2515 that can achieve sufficiently favorable levels of clustering. For example, this can be based on tracking and/or measuring clustering metrics for records in previous iterations of the conversion process and/or based on analysis of the measuring clustering metrics for records in previous iterations of the process to determine and/or estimate these thresholds. The storage utilization data 2606 can also be measured and/or tracked for each of this plurality of previous conversion processes to determine average and/or estimated storage utilization metrics that rendered conversion processes with favorable levels of clustering based on the corresponding clustering metrics measured for these previous conversion processes.

The clustering metrics can be based on a total or average number and/or proportion of records in each segment that: match cluster key values with at least a threshold proportion of other records in the segment, are within a threshold vector distance and/or other similarity measure from at least a threshold number of other records in the segment. The clustering metrics can alternatively or additionally be based on an average and/or total number of segments whose records have a variance and/or standard deviation of their cluster key values that compare favorably to a threshold. The clustering metrics can alternatively or additionally be determined in accordance with any other similarity metrics and/or clustering algorithms.

Once the page conversion determination module 2610 generates segment generation determination data indicating that segments be generated via the conversion process, the segment generator 2517 can initiate the process of generating stored pages into segments. This can include identifying the pages for conversion in the conversion process. For example, all pages currently stored by the page storage system 2506 and awaiting their conversion into segments 2424 at the time when segment generation determination data is generated to indicating that the conversion process commence are identified for conversion. This set of pages can constitute a conversion page set 2655, where only the set of pages identified for conversion in the conversion page set 2655 are processed by segment generator 2517 for a given conversion process. For example, the record processing and storage system 2505 may continue to receive records from data sources 2501, and rather than buffering all of these records until after this conversion process is completed, additional pages can be generated at this time for storage in page storage system 2506. However, as processing of pages into segments has already commenced, these pages may not be clustered and converted during this conversion process, and can await their conversion in the next iteration of the conversion process. As another example, the page storage system 2506 may still be storing some other pages that were previously converted into segments but were not yet deleted. These pages are similarly not included in the conversion page set 2655 because their records are already included in segments via the prior conversion.

The segment generator can implement a cluster key-based grouping module 2620 to generate a plurality of record groups 2625-1-2625-X from the plurality of records 2422 included in the conversion page set 2655. The cluster key-based grouping module 2620 can receive and/or determine a cluster key 2607, which can be automatically determined by the cluster key-based grouping module 2620, can be stored in memory, can be received from another computing device, and/or can be configured via user input. The cluster key can indicate one or more columns, such as the key column(s) of FIGS. 18-22, by which the records are to be sorted and segregated into the record groups. For example, the plurality of records 2422 included in the conversion page set 2655 are sorted and/or grouped by cluster key, where records 2422 with matching cluster key values and/or similar cluster key values are grouped together in the resulting record groups 2625-1-2625-X. The record groups 2625-1-2625-X can be a fixed size, or can be dynamic in size, for example, based on including only records that have matching and/or similar cluster key values. An example of generating the record groups 2625-1-2625-X via the cluster key-based grouping module 2620 is illustrated in FIG. 26C.

The records 2422 of each record group in the set of record groups 2625-1-2625-X generated by the cluster key-based grouping module 2620 are ultimately included in one segment 2424 of a corresponding segment group in the set of segment groups 1-X generated by the segment generator 1-X. For example, segment group 1 includes a set of segments 2424-1-2424-J that include the records 2422 from record groups 2625-1, segment group 2 includes another set of segments 2424-1-2424-J that include the records 2422 from record groups 2625-2, and so on. The identified record groups 2625-1-2625-X can be converted into segments in a same or similar fashion as discussed in conjunction with FIGS. 18-23.

The record groups are processed into segments via a columnar rotation module 2630 of the segment generator 2517. Once the plurality of record groups 2625-1-2625-X are formed, the columnar rotation module 2630 can be implemented to generate column-formatted record data 2565 for each record group 2625. For example, the records 2422 of each record group are extracted from pages 2515 as row-formatted data. In particular, the records 2422 can be received from data sources 2501 as row-formatted data and/or can be stored in pages 2515 as row-formatted data. All records 2422 in the same record group 2625 are converted into column-formatted record data 2565 in accordance with a column-based format, for example, by performing a columnar rotation of the row-formatted data of the records 2422 in the given record group 2625. The column-formatted record data 2565 generated for a given record group 2625 can be divided into a set of column-formatted record data 2565-1-2565-J, for example, where the column-formatted record data 2565 is redundancy storage error encoded by the segment generator 2517 as discussed previously, and where each column-formatted record data 2565-1-2565-J is included in a corresponding segment of a set of J segments 2424 of a segment group 2522.

The final segments can be formed from the column-formatted record data 2565 to include metadata generated via a metadata generator module 2640. The metadata generator module 2640 can be operable to generate the manifest section, statistics section, and/or the set of index sections 0-$x$ for each segment as illustrated in FIG. 23. The metadata generator module 2640 can generate the index data 2518 for each segment 2424 by utilizing the same or different index generator 2513 of FIG. 25B, where index data 2518 generated for segments 2424 via the metadata generator module 2640 is the same as or similar to the index data 2516 generated for pages as discussed in conjunction with FIG. 25B. The column-formatted record data 2565 and its metadata generated via metadata generator module 2640 can be combined to form a final corresponding segment 2424.

Figure 26B:
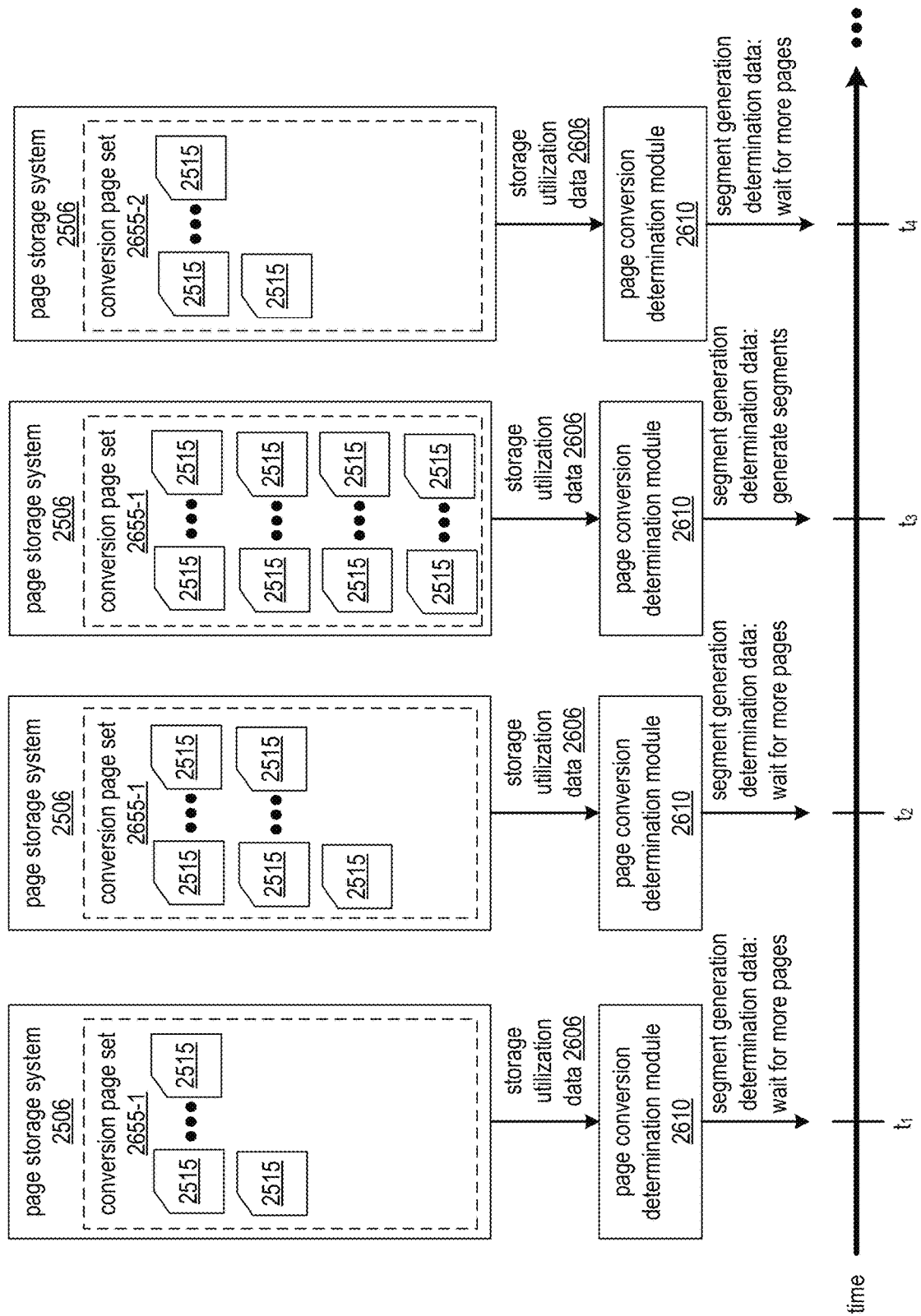
FIG. 26B is a schematic block diagram illustrating operation of a page conversion determination module over time in accordance with various embodiments of the present invention.
Figure 26C:
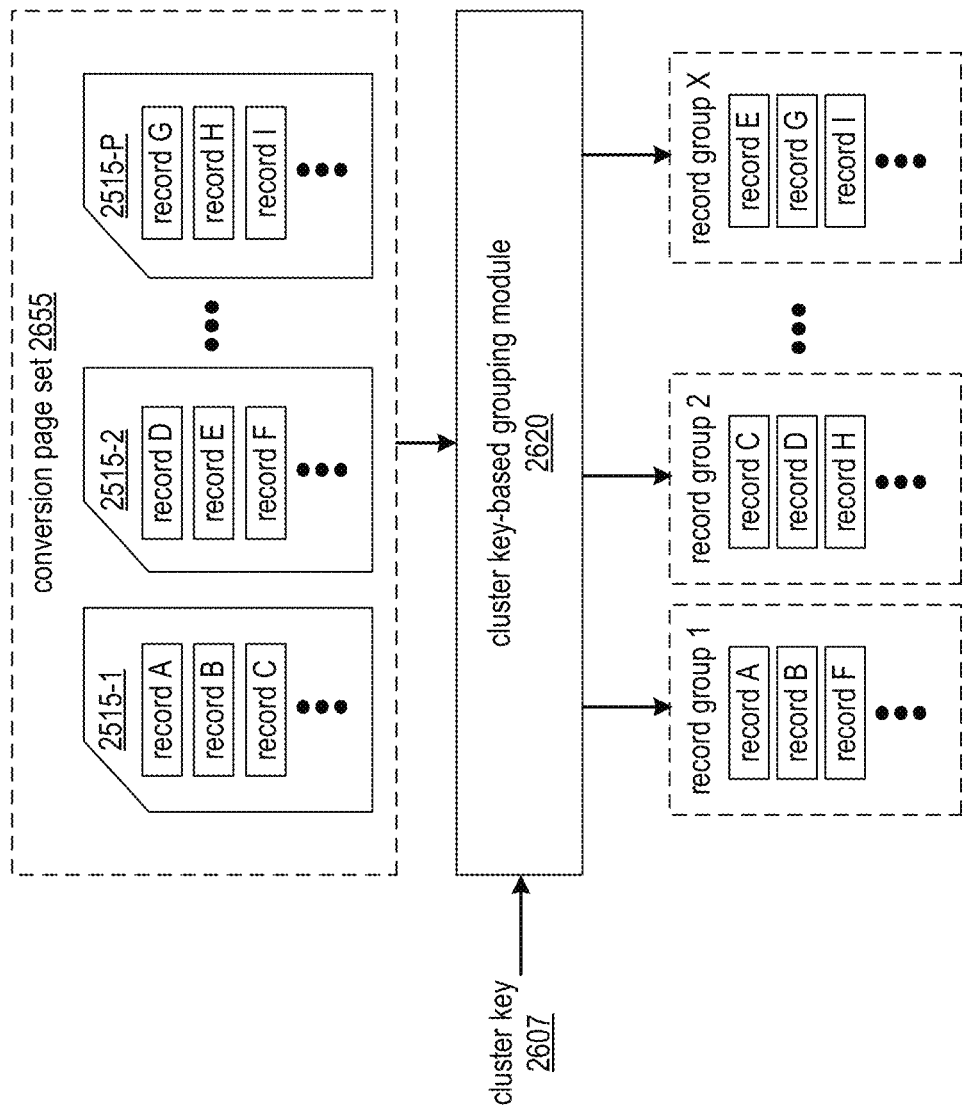
FIG. 26C is a schematic block diagram of a cluster key-based grouping module of a segment generator in accordance with various embodiments of the present invention.

FIG. 26B depicts an example timeline illustrating when the conversion process is determined to be conducted and how this process is iterated over time. The page conversion determination module 2610, and/or the determinations to delay conversion versus initiate conversion over time as illustrated in FIG. 26B, can be utilized to implement the segment generator 2517 of FIG. 26A and/or any other embodiment of the segment generator 2517 discussed herein.

First, a first conversion page set 2655-1 accumulates pages 2515 over time until the page conversion determination module 2610 determines a conversion page set 2655-1 is ready for conversion. At time $t_1$, the conversion page set 2655-1 includes a small number of pages 2515, where the storage resources of page storage system 2506 are not yet fully utilized. This small number of pages relative to the page storage capacity of page storage system 2506 renders the storage utilization data 2606 at time $t_1$ to compare unfavorably to the predetermined conversion threshold data. The segment generation determination data generated by the page conversion determination module 2610 at time $t_1$ therefore delays the conversion process, indicating to wait for more pages 2515 rather than generating segments from the current conversion page set 2655-1 at time $t_1$.

At time $t_2$, more pages 2515 have been accumulated since time $t_1$ based on additional pages having been generated by the page generator 2511 from incoming records of one or more record streams. However, the storage resources of page storage system 2506 are still not yet fully utilized at this time, causing the storage utilization data 2606 at time $t_2$ to again compare unfavorably to the predetermined conversion threshold data. The segment generation determination data generated by the page conversion determination module 2610 at time $t_2$ again delays the conversion process, indicating to wait for more pages 2515 rather than generating segments from the current conversion page set 2655-1 at time $t_2$.

At time $t_3$, even more pages 2515 have been accumulated since time $t_2$, and storage resources of page storage system 2506 are fully utilized and/or sufficiently utilized as dictated by the predetermined conversion threshold data. Thus, enough pages have been accumulated to cause storage utilization data 2606 at time $t_3$ to compare favorably to the predetermined conversion threshold data. The segment generation determination data generated by the page conversion determination module 2610 at time $t_3$ initiates the conversion process by indicating that segments be generated from the current conversion page set 2655-1 at time $t_3$.

After time $t_3$, the pages of the conversion page set 2655-1 can be flushed to other storage and/or can be removed from page storage system 2506. For example, once the segments are successfully generated from conversion page set 2655-1, the pages of conversion page set 2655-1 are deleted from page storage system 2506. The storage utilization data 2606 can indicate that more pages be accumulated for the a next conversion page set 2655-2, for example, due to the storage resources of page storage system 2506 again becoming available for storing new pages once the pages of conversion page set 2655-1 are removed.

At time $t_4$, after some or all of the pages of conversion page set 2655-1 have been removed from storage by page storage system 2506, new pages have been generated and stored in page storage system 2506 for conversion in the next conversion page set 2655-2. For example, the next conversion page set 2655-2 can include some pages that were generated while the conversion process of conversion page set 2655-2 was in progress and/or while the resulting segments were being stored in to segment storage system 2508. At this time, the storage resources of page storage system 2506 are not yet fully utilized at this time, causing the storage utilization data 2606 at time ta to compare unfavorably to the predetermined conversion threshold data.

At some later time after $t_4$ enough pages are accumulated in this next conversion page set 2655-2 to cause the storage utilization data 2606 at time ta to compare favorably to the predetermined conversion threshold data and to initiate another conversion process of converting the conversion page set 2655-2 into segments. This process can continue accumulating and converting subsequent conversion page sets 2655 over time.

Note that the predetermined conversion threshold data can change over time, for example, based on different user configurations, based on changes to storage capacity of the page storage system 2506, based on adding or removal of memory devices of page storage system 2506, based on failures of page storage system 2506, based on trends in clustering levels that can be attained by different numbers of pages at different times, based on changes in amount of different data stored by the resources of the page storage system 2506, based on resource assignment changes in the record processing and storage system 2505, and/or based on other determinations made over time causing the predetermined conversion threshold data to be adjusted accordingly. For example, the predetermined conversion threshold data that triggers initiation of the conversion process for conversion page set 2655-1 at time $t_3$ can be the same as or different from the predetermined conversion threshold data that eventually triggers initiation of the conversion process for conversion page set 2655-2 at some later time after $t_4$.

FIG. 26C illustrates an example embodiment of a cluster key-based grouping module 2620 implemented by segment generator 2517. This example serves to illustrate that the grouping of sets of records in pages does not necessarily correlate with the sets of records in the record groups generated by the cluster key-based grouping module 2620. In particular, in embodiments where the pages can be generated directly from sets of incoming records as they arrive without any initial clustering, the grouping of sets of records in pages may have no bearing on the record groups generated by the cluster key-based grouping module 2620 due to the timestamp and/or receipt time of various records not necessarily having a correlation with cluster key. The embodiment of cluster key-based grouping module 2620 of FIG. 26C can be utilized to implement the segment generator 2517 of FIG. 26A and/or any other embodiment of the segment generator 2517 discussed herein.

In this example, a plurality of P pages 2515-1-2515-P of conversion page set 2655 include records received from one or more sources over time up until the page conversion determination module 2610 dictated that conversion of this conversion page set 2655 commence. The plurality of records in pages 2515-1-2515-P can be considered an unordered set of pages to be clustered into record groups. Regardless of which pages these records may belong to, records are grouped into their record groups in accordance with cluster key. In this example, records of page 2515-1 are dispersed across at least record groups 1 and 2; records of page 2515-2 are dispersed across at least record groups 1, 2, and X, and records of page 2515-P are dispersed across at least record groups 2 and X.

The value of X can be: predetermined prior to clustering, can be the same or different for different conversion page sets 2655; can be determined based on a predetermined minimum and/or maximum number of records that are included per record group: can be determined based on a predetermined minimum and/or maximum data size per record group; can be determined based on each record group having a predetermined level of clustering, for example, in accordance with at least one clustering metric, and/or can be determined based on other information. In some cases, different record groups of the set of record groups 1-X can include different numbers of records, for example, based on maximizing a clustering metric across each record group.

For example, all records with a matching cluster key value, such as having one or more columns corresponding to the cluster key with matching values, can be included in a same record group. As another example, a set of records having similar cluster key values can all be included in a same record group. As another example, if the value of the cluster key can be represented as a continuous variable, numeric variable, or other variable with an inherent ordering with respect to a cluster key domain, the cluster key domain can be subdivided into a plurality of discrete intervals. In such cases, a given record group, or a given set of record groups, can include records with cluster keys having values in the same discrete interval of the cluster key domain. As another example, a record group has cluster key values that are within a predefined distance from, or otherwise compare favorably to, an average cluster key value of cluster keys within the record group. In such cases, a Euclidian distance metric, another vector distance metric, and/or any other similarity and/or distance metric can be utilized to measure distance between cluster key values of the record group. In some cases, a clustering algorithm and/or an unsupervised machine learning model can be utilized to form record groups 1-X.

Note that a given conversion page set 2655 can include records from multiple record streams, where a given page can include a record from multiple record streams. Different record streams can have the same or different cluster key of the same and/or different number of columns, data type, and/or type of information of the corresponding record stream. Each record stream can therefore have its records segregated into record groups and processed into segments separately, for example, via the cluster key grouping module based on their respective cluster key. For example, a given record group can include only records from the same record stream clustered by the cluster key of the corresponding record stream. In some cases, if different record streams include a same type of record with a same cluster key, these records can be grouped and processed into segments in tandem.

FIGS. 27A-27D illustrate embodiments of a segment generator 2517 that performs parallelized segment generation via a plurality of processing core resources 48. Some or all features and/or functionality of embodiments of segment generator 2517 as discussed in conjunction with FIGS. 27A-27D can be utilized to implement the segment generator of FIGS. 25A and/or 26A. Some or all features and/or functionality of embodiments of segment generator 2517 as discussed in conjunction with FIGS. 27A-27D can be utilized to implement some or all segment generators 2517 of some or all stream loader modules 2510 of FIG. 25B. Some or all features and/or functionality of embodiments of segment generator 2517 as discussed in conjunction with FIGS. 27A-27D can be utilized to implement any other embodiment of segment generator 2517 discussed herein.

The plurality of processing core resources 48-1-48-W of segment generator 2517 can be implemented by utilizing some or all processing core resources 48 of one or more nodes 37 and/or of one or more computing devices 18. The plurality of processing core resources 48-1-48-W can be implemented utilizing one or more processing core resources 48 of the node 37 of FIG. 13. In some cases, the plurality of processing core resources 48-1-48-W are each implemented by a single stream loader module 2510. In some cases, each stream loader module 2510 includes and utilizes its own subset of the plurality of processing core resources 48-1-48-W, for example, where each subset of the plurality of processing core resources 48-1-48-W is included in one or more nodes 37 utilized to implement the corresponding stream loader module 2510. Some or all processing core resources 48-1-48-W can be the same or different from the set of processing core resources 48-1-48-W of FIG. 25C. For example, some or all processing core resources 48-1-48-W can perform tasks of the page generator 2511 of FIG. 25C at some times and can perform tasks of the segment generator 2517 of FIG. 27A at other times.

Figure 27A:
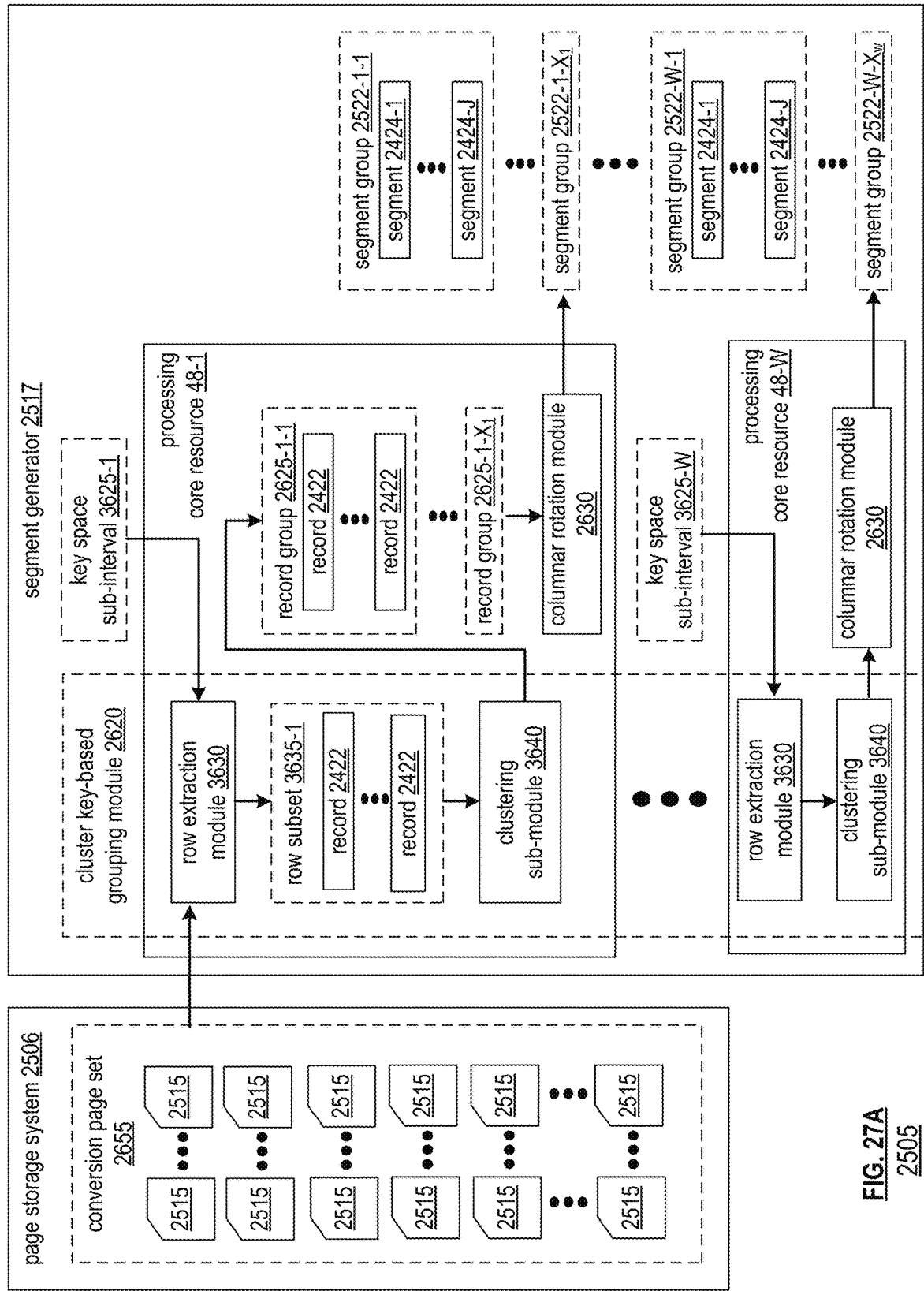
FIGS. 27A-27B are schematic block diagrams of an embodiment of a segment generator of a record processing and storage system that utilizes a plurality of processing core resources implement parallelized segment generation from a plurality of row subsets in accordance with various embodiments of the present invention.

Each of the plurality of processing core resources 48-1-48-W can be operable to independently perform tasks in parallel with other ones of the processing core resources 48-1-48-W, for example, without coordination. Each of the plurality of processing core resources 48-1-48-W can independently implement a row extraction module 3630 and/or a clustering sub-module 3640. As illustrated in FIG. 27A, the parallelized implementation of row extraction modules 3630 and clustering sub-modules 3640 by the plurality of processing core resources 48-1-48-W can collectively implement some or all functionality of the cluster key-based grouping module 2620 of FIG. 26A. Furthermore, each of the plurality of processing core resources 48-1-48-W can independently implement a columnar rotation module 2630 that performs some or all of the functionality of the columnar rotation module 2630 described in FIG. 26A. The parallelized implementation of columnar rotation modules 2630 by the plurality of processing core resources 48-1-48-W can collectively implement some or all functionality of the columnar rotation module 2630 of FIG. 26A. While not depicted, each of the plurality of processing core resources 48-1-48-W can optionally implement their own metadata generator module 2640 to generate segment metadata in generation of segment groups from column-formatted record data as discussed in conjunction with FIG. 26A.

In generating segments, tasks can be distributed across the set of processing core resources 48-1-48-W that generate segments in parallel from the pages of conversion page set 2655. Each processing core resources 48-1-48-W can generate its own subset of the plurality of segments 2424 produced during a page conversion process discussed in conjunction with FIGS. 26A-26C. For example, as depicted in FIG. 27A, processing core resource 48-1 generates a first set of segment groups 2522-1-1-2522-1-$X_1$, while processing core resource 48-W generates a Wth set of segment groups 2522-W-1-2522-W-$X_W$. The number of segment groups $X_i$ generated by a given processing core resource 48-$i$ can be the same or different from some or all other processing core resources 48, where $X_1$ is the same or different from $X_W$. Each segment group can include a same number J of segments 2424, for example, where the number of segments J in each segment group is based on a redundancy error coding scheme as discussed previously. Each segment 2424 can include a same or different number of records 2422, for example, as column-formatted record data 2565 as discussed previously.

Each segment group 2522 is generated from a corresponding record group 2625 by a processing core resource 48 via its own columnar rotation module 2630 and/or via its own metadata generator module 2640, for example, as described in conjunction with FIG. 26A. As illustrated, processing core resource 48-1 generates its first set of segment groups 2522-1-1-2522-1-$X_1$ from a corresponding set of record groups 2625-1-1-2625-1-$X_1$. The sets of record groups utilized by each processing core resource 48 to generate its distinct set of segments can be mutually exclusive and collectively exhaustive with respect to the records 2422 includes in pages 2515 of conversion page set 2655, where each record 2422 in conversion page set 2655 is included in exactly one record group 2625 utilized by exactly one processing core resource 48 to generate a corresponding segment group 2522.

As discussed previously, segments are ideally generated with favorable levels of clustering. In embodiments where distinct subsets of records of conversion page set 2655 are processed into segments independently and/or in parallel via processing core resources 48-1-48-W as illustrated in FIG. 27A, the subset of segments generated from each distinct subset of record ideally have favorable levels of clustering. However, in the embodiments discussed previously, generation of pages from incoming records by page generator 2511 occurs without any clustering, and instead pages are generated based on an ordering in which records are received. Therefore, segregating records into subsets for processing by the processing core resources 48-1-48-W by assigning distinct sets of pages to each processing core resources 48-1-48-W is unideal. In particular, because the pages themselves have no clustering, a particular cluster key value may be included in many different pages, which would be assigned for processing by different cores, and would thus appear in different segments rather than being grouped together in a same segment. This mechanism would therefore result in segments with unfavorable levels of clustering.

Figure 27B:
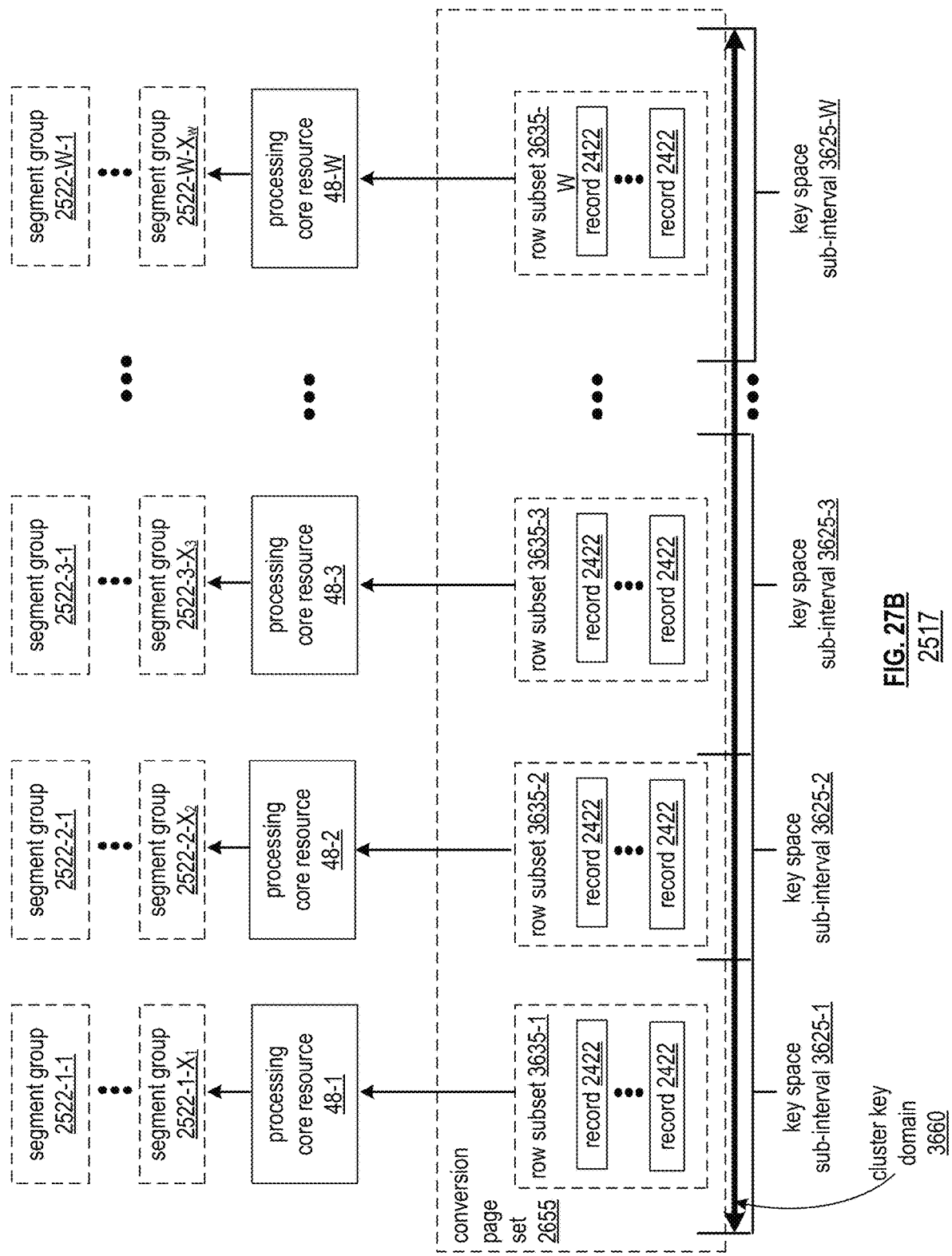
Figure 27C:
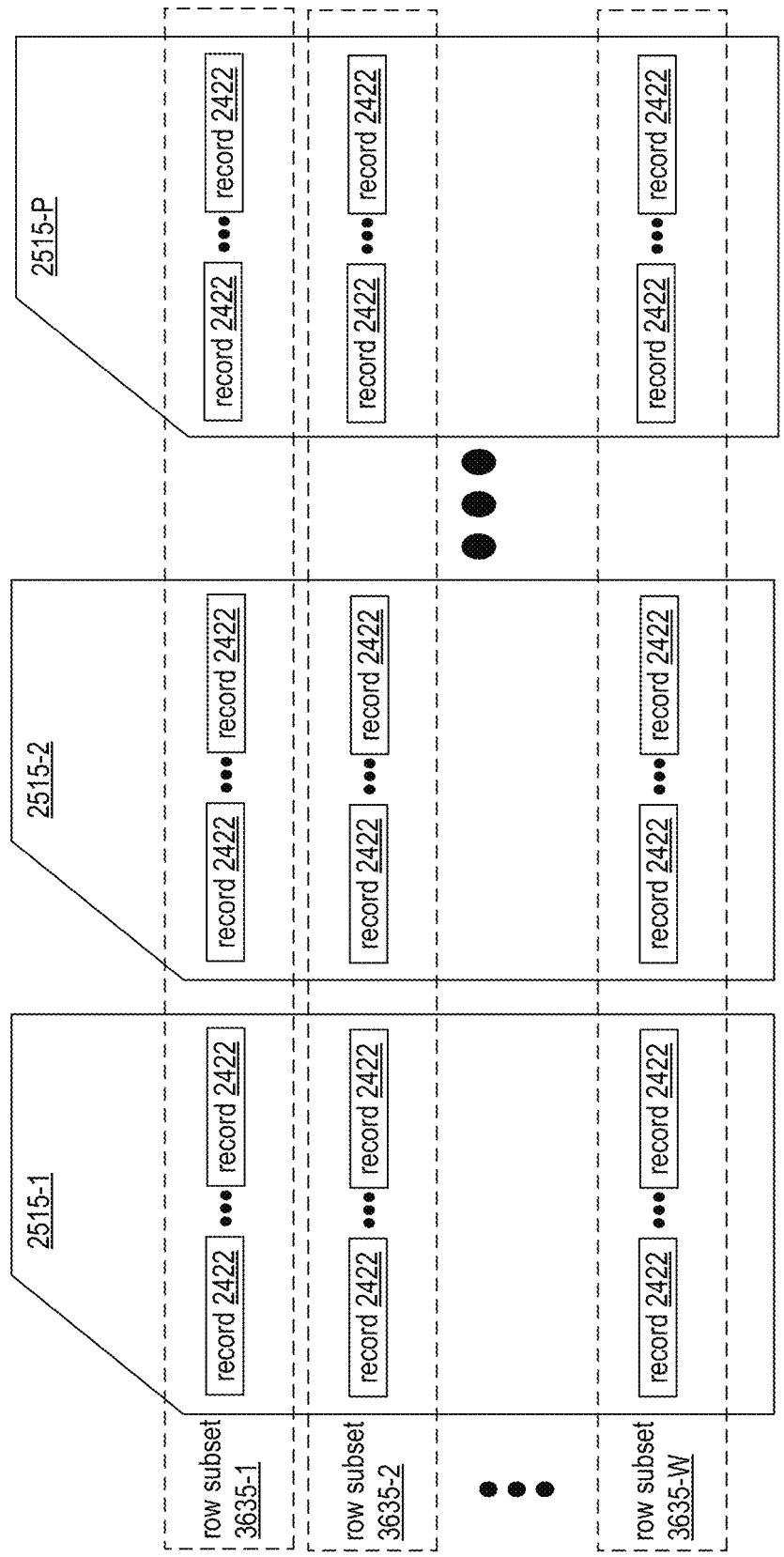
FIG. 27C is an example illustration of a plurality of row subsets in a plurality of pages in accordance with various embodiments of the present invention.

FIGS. 27A-27C present embodiments where processing core resources each process all pages and subdivide work based on a set of key space sub-intervals 3625-1-3625-W. Each of the processing core resources 48-1-48-W can is assigned their own corresponding key space sub-interval 3625. Identifying subsets of records for processing in parallel based on subsets of pages because ensuring same and/or similar cluster key values across all pages are included in a same sub-interval and thus have their corresponding records processed and clustered into record groups by a same processing core resource 48 to achieve more favorable clustering of segments.

This improves the technology of database systems by achieving favorable levels of clustering in segments, which improves efficiency of query execution by database systems as discussed previously. This further improves the technology of database systems by enabling these favorable levels of clustering via independent, parallel processing of disjoint sets of information via a plurality of parallelized processing core resources to improve the efficiency of generating segments from pages. This increased efficiency of segment generation enables greater numbers of pages to be converted into segments via a same page conversion process to further improve the technology of database systems by enabling increased levels of clustering as discussed previously.

As used herein, a key space sub-interval 3625 can indicate a distinct set of cluster keys of the entire domain of cluster keys. For example, each key space sub-interval 3625-1-3625-W includes a particular set and/or range of values for one or more fields and/or columns of incoming records identified as the cluster key for the corresponding record stream. The W sets of cluster keys of the cluster key domain included in corresponding key space sub-intervals 3625-1-3625-W can be mutually exclusive and/or collectively exhaustive with respect to the cluster key domain. The cluster key domain can correspond to the domain of all possible values for the cluster key, such as all possible values for a cluster key implemented as a single column and/or all combinations of possible values for a cluster key implemented as a set of multiple columns. Alternatively, the cluster key domain can correspond to a subset of all possible values, such as a bounded range of values for the one or more columns of the cluster key, where this subset and/or bounded range is based on the span of cluster key values included in the given page conversion set 2655. In such cases, different conversion page sets 2655 can have different cluster key domains based on the records in their corresponding pages spanning a different range of possible cluster key values.

Furthermore, each key space sub-intervals 3625-1-3625-W can include a sequential set of values of cluster key and/or continuous range of values of cluster key, such as a sequential set of values and/or continuous range of values for a cluster key implemented as a single column, and/or a sequential set of values and/or continuous range of values of each column in the set of columns of the cluster key. The sequential set of values and/or continuous range of values can be in accordance with an ordering of the cluster key value, which can be based on a known, predefined, and/or configured ordering scheme of the corresponding data type. For example, a cluster key implemented as a column of the corresponding set of records with a numeric data type is ordered in accordance with a numerical ordering of the numeric values, where each key space sub-intervals 3625-1-3625-W includes an interval of sequential and/or continuous possible numeric values of the cluster key domain. These sequential sets and/or continuous ranges of the key space sub-intervals 3625-1-3625-W can be non-overlapping and/or contiguous intervals with respect to the ordering of cluster key values in the cluster key values. This can be ideal in achieving favorable levels of clustering by ensuring that same and/or similar cluster key values are included within same key space sub-intervals 3625, and will thus be processed by a same processing core resource 48 to ensure all records with these same and/or similar cluster key values can be included in a same set of segments. Such embodiments of key space sub-intervals 3625-1-3625-W implemented as sequential sets and/or continuous ranges of the cluster key domain are illustrated and discussed in further detail in conjunction with FIG. 27B.

The embodiments of implementing the cluster key-based grouping module 2620 based on assignment of each key space sub-interval 3625-1-3625-W to a corresponding processing core resource 48-1-48-W illustrated and discussed within can be with respect to a single record stream from a single data source 2501, where all key space sub-intervals 3625-1-3625-W correspond to an interval of the cluster key domain of the single record stream. The embodiments of implementing the cluster key-based grouping module 2620 based on assignment of each key space sub-interval 3625-1-3625-W to a corresponding processing core resource 48-1-48-W illustrated and discussed within can alternatively be with respect to a multiple record streams from multiple data sources 2501, where some ones of the key space sub-intervals 3625-1-3625-W correspond to intervals of a cluster key domain of a first record stream, and where other ones of the key space sub-intervals 3625-1-3625-W correspond to intervals of a cluster key domain of a second record stream. In such cases, records from different record streams can be included in a same page 2515 of the conversion page set 2655 as discussed previously. In such cases, the key space sub-intervals 3625-1-3625-W can be mutually exclusive and collectively exhaustive with respect to all cluster key values included across a set of multiple cluster key domains corresponding to the multiple record streams.

Alternatively, in embodiments with multiple record streams from multiple data sources 2501 included in the conversion page set 2655, each record stream's cluster key domain can be determined and similarly segmented into its own set of key space sub-intervals 3625 that includes the same or different number of sub-intervals. For example, a separate, additional set of processing core resources 48 are implemented for each additional record stream included in the conversion page set 2655, where each additional set of processing core resources 48 can include the same or different number of processing core resources, and where the processing core resources in each additional set of processing core resources 48 are assigned to one key space sub-interval 3625 of the set of set of key space sub-intervals 3625 for the cluster key of the corresponding record stream.

The key space sub-interval 3625 assigned to each processing core resource 48 can be received, configured via user input, retrieved from memory, and/or automatically determined by the record processing and storage system 2505. The key space sub-interval 3625 assigned to each processing core resource 48 can be the same or different for different conversion processes, for example, where the key space sub-intervals 3625-1-3625-W are determined for a given conversion process based on a corresponding page conversion set. In some cases, the key space sub-intervals 3625-1-3625-W are determined based on having an equal and/or similar number or records with cluster keys included in each key space sub-interval. A same, target number of records can be determined, where the key space sub-intervals 3625-1-3625-W are determined based on including exactly this target number of records including a number of records that is within a threshold difference from this target number of records. For example, the target number of records is determined based on dividing a total number of records in conversion page set 2655 by the value of W, which can be determined to be equal to and/or based on a number of processing core resources 48 included in segment generator 2517 and/or a number of processing core resources 48 allocated for converting pages into segments in the conversion process. An embodiment of automatically determining the set of key space sub-intervals 3625-1-3625-W is discussed in further detail in conjunction with FIGS. 28A-28C.

Each processing core resource 48 can utilize its row extraction module 3630 to identify a row subset 3635 that includes a subset of records 2422 included in conversion page set 2655 based on the key space sub-intervals 3625 assigned to the given processing core resource 48. Identifying the row subset 3635 can include accessing the corresponding records 2422 in the conversion page set 2655 and/or extracting the corresponding records 2422 from the conversion page set 2655. The row subset 3635 of each given processing core resource 48 can include all records 2422 across all pages 2515 in conversion page set 2655 with cluster key values that fall within and/or otherwise compare favorably to the key space sub-intervals 3625 assigned to the given processing core resource 48. The row subset 3635 of each given processing core resource 48 can further include only records with cluster key values that fall within and/or otherwise compare favorably to the key space sub-intervals 3625 assigned to the given processing core resource 48. When the key space sub-intervals 3625-1-3625-W are mutually exclusive and collectively exhaustive with respect to the cluster key domain, each record 2422's cluster key value can fall within or otherwise compare favorably to exactly one of the key space sub-intervals 3625-1-3625-W. Thus, the identified row subsets 3635-1-3625-W can thus be mutually exclusive and collectively exhaustive with respect to the entire plurality of records included in the conversion page set.

Because pages are not clustered as they are generated, records with a cluster key value included in a given key space sub-intervals 3625 could possibly be included in any pages 2515 of the conversion page set 2655. This notion is illustrated and discussed in further detail in conjunction with FIG. 27C. Thus, a given processing core resource must access all pages 2515 to ensure all records with cluster key values comparing favorably to its assigned key space sub-intervals 3625 are identified in its row subset 3635. Identifying the row subset 3635 by a given processing core resource 48 can therefore include accessing all pages 2515 of the conversion page set 2655 to identify any records in each page 2515 that have cluster key values that compare favorably to the key space sub-intervals 3625 of the given processing core resource 48. Thus, all processing core resource 48 implement their row extraction module 3630 during the page conversion process by each processing all pages 2515 of the conversion page set 2655 in parallel.

The clustering sub-module 3640 can be implemented by each processing core resource 48 to cluster the records 2422 identified in its row subset 3635 into a plurality of record groups 2625. This can be achieved in a same or similar fashion as embodiments of the clustering by cluster key-based grouping module 2620 to generate record groups from records of conversion page set 2655 as discussed in conjunction with FIG. 26C, where only the records within the given processing core resource 48's row subset 3625 are segregated into the given processing core resource 48's set of record groups 2625-1 2625-X.

In some embodiments, a data structure such as a priority queue and/or a min-heap can be maintained by each processing core resource 48 to extract records 2422 of its row subset 3635 in order by cluster key value across all pages 2515 via row extraction module 3630. For example, each processing core resource 48 can determine a cursor value for each page 2515 in the conversion page set 2655, initially at the first entry of a record 2422 included within its key space sub-intervals 3625 for each given page. Each cursor value can correspond to a bit offset, pointer, and/or other memory location information denoting the location of the corresponding record in the corresponding page. This set of initial cursor values for all pages 2515 can be placed into the data structure. Cursor values for all other entries of subsequent records 2422 included in the key space sub-intervals 3625 for each given page can also be determined and included in the data structure initially, prior to in-order extraction of records. Alternatively, cursor values for other entries of subsequent records 2422 included in the key space sub-intervals 3625 for each given page are instead determined and included in the data structure after prior cursor values of the given page have their records extracted based on being popped from the data structure. This can be ideal if records within a given page are optionally already ordered in the page, where each page are generated by page generator 2511 to include their set of records in order by cluster key within the given page, even if clustering is not utilized to determine the set of records included within the given page.

This data structure can be organized and/or ordered in accordance with the cluster key values of the corresponding record indicated by a cursor value in the data structure. For example, for a data structure implemented as a min-heap, the processing core resource 48 can proceed to pop iterative cluster key values across all pages, such that, across all pages, the cluster key values of the corresponding key space sub-interval 3625 are popped in order. For example, cursor values are popped and/or extracted from the data structure in an ordering dictated by the ordering of their corresponding cluster key values, and records are extracted from a corresponding page by utilizing their popped cursor values in response to their cursor values data being popped from the data structure. The extraction of records as their cursor values are popped in an ordering dictated by corresponding cluster key value can result in records of each row subset 3635 being extracted in order by cluster key, regardless of the page they were extracted from.

This extraction of all records identified in the processing core resource 48's row subset 3635 in order by cluster key can be leveraged to simplify the process of further clustering the row subset into record groups 2625. In particular, the clustering sub-module 3640 of each processing core resource 48 can be implemented to form its record groups 2565-1-2565-X based on an order that the records 2422 of row subset 3635 are extracted. For example, this ordered extraction of the records 2422 in by cluster key enables the row subset 3635 to ordered by cluster key as it is formed. This automatic ordering of row subset 3635 can implement the clustering sub-module 3640, where the ordered row subset 3635 is simply segmented into record groups, each containing contiguous sets of sequentially ordered records from the ordered row subset 3635. This can further improve the technology of database systems by enabling favorable levels of clustering to be achieved efficiently by reducing computational complexity of the clustering process.

In particular, this can enable each record group 2625 to be formed and processed into a corresponding segment group 2522 by each processing core resource 48 one at a time. For example, a first set of records are extracted first by a given processing core resource 48 based on having the first ordered cluster keys within the key space sub-intervals 3625 popped from the data structure, and this first set of records can be included in a first record group 2625 based on their cluster keys being ordered together. This first record group 2625 can then be processed by the given processing core resource 48 into a segment group 2522 via columnar rotation module 2630 and/or metadata generator module 2640 of the given processing core resource 48. Once this first record group 2625 is processed into segment group 2522, a second set of records are extracted second by the given processing core resource 48 based on having the next ordered cluster keys within the key space sub-intervals 3625 popped from the data structure based on being ordered after all cluster keys of the first set of records. This second set of records can be then included in a second record group 2625 based on their cluster keys being ordered together, which can be processed into a segment group 2522 via columnar rotation module 2630 and/or metadata generator module 2640 of the given processing core resource 48. This process of extracting sets of records for each record group based on the cluster key ordering across all pages can continue until a final set of records are extracted last based on having the last ordered cluster keys within the key space sub-intervals 3625 popped from the data structure based on being ordered after all cluster keys of all previous sets of records. This can be ideal as only the inexpensive data types of cursor values across all records in row subset 3635 need be stored at a given time, while more expensive data types of full records 2422 of row subset 3635 are only extracted and stored for single record groups at a given time. This can further improve the technology of database systems by enabling favorable levels of clustering to be achieved efficiently by reducing memory resources required to generate segments.

FIG. 27B illustrates how records in conversion page set 2655 are segregated by key space sub-intervals 3625-1-3625-W into row subsets 3635-1-3635-W for processing into a corresponding set of segment groups. FIG. 27B can serve as an illustration of the key space sub-intervals 3625-1-3625-W and corresponding row subsets 3635-1-3635-W of FIG. 27B with respect to a cluster key domain 3660 of all cluster keys values included in the given page conversion set 2655 and/or of all possible cluster key values for the corresponding record stream. Some or all features in the depiction of segment generator 2517 of FIG. 27B can implement the segment generator 2517 of FIG. 27A and/or any other embodiment of segment generator 2517 described herein.

Note that each key space sub-interval 3625 includes a contiguous set of cluster key values in accordance with ordering of cluster key values, and that each key space sub-interval 3625 is contiguous and non-overlapping with other key space sub-intervals 3625. Thus, as illustrated, the full range of the cluster key domain 3660 is segregated into key space sub-intervals 3625, where any cluster key value in cluster key domain 3660 in included in exactly one key space sub-intervals 3625. Note that a given set of records of a given row subset 3635 can have multiple different cluster key values that all fall within the corresponding key space sub-interval 3625 based on the corresponding key space sub-interval 3625 spanning a portion of cluster key domain 3660 that includes these multiple cluster keys.

Each key space sub-interval 3625 can optionally be simply denoted by a maximum cluster key value and/or minimum cluster key value. The records in a given row subset 3635 can identified based on having cluster key values are less than and/or equal to the maximum cluster key value of the corresponding key space sub-interval 3625 and/or based on having cluster key values are greater than and/or equal to the minimum cluster key value of the corresponding key space sub-interval 3625. This simple comparison can be ideal in simplifying the record extraction process by each processing core resource 48. Note that the maximum cluster key values can be open interval endpoint while the minimum cluster key values can be closed interval endpoints, or vice versa. The key space sub-intervals 3625-1-3625-W can otherwise be bounded to ensure that all records can be included in exactly one key space sub-interval 3625.

FIG. 27C illustrates how some or all pages 2515 in conversion page set 2655 can include records 2422 included in some or all row subsets 3635-1-3635-W extracted and/or processed by corresponding ones of the processing core resources 48-1-48-W based on corresponding ones of the key space sub-intervals 3625-1-3625-W. FIG. 27C can serve as an illustration of the relationship between the row subsets 3635-1-3635-W of FIG. 27A and pages 2515 of the conversion page set 2655 of FIG. 27A. Some or all features in the depiction of conversion page set 2655 of FIG. 27C can implement the conversion page set 2655 of FIG. 27A and/or any other embodiment of conversion page set 2655 described herein.

Sets of pages 2515 in conversion page set 2655 that include records with cluster key values within different ones of the key space sub-intervals 3625 can be overlapping sets of pages. Thus, as illustrated in FIG. 27C, a given page 2515 may include records included in some or all different row subsets 3635-1-3635-W based on having records with cluster keys values that compare favorably to many and/or all different key space sub-intervals 3625-1-3625-W. Furthermore, as illustrated in FIG. 27C, a given row subsets 3635 can include records stored in many different pages 2515 and/or all pages 2515 of the conversion page set 2655. For example, this can be due to pages having been generated without any clustering, where cluster keys are not correlated with the time that records are included in record streams and/or received by the record processing and storage system 2505 as discussed previously.

Note that FIG. 27C illustrates placement of records 2422 of each row subsets 3635 in a similar position within pages 2515 for purposes of illustration. However, records 2422 of a given page 2515 can be included in the given pages 2515 in any ordering, such as an ordering in which they were generated by and/or received in row data 2910 from one or more data sources 2501, where records included in a same row subsets 3635 are not necessarily grouped together in the given page 2515.

In various embodiments, a record processing and storage system includes at least one processor and memory. The memory stores operational instructions that, when executed by the at least one processor, cause the record processing and storage system to assign each of a plurality of key space sub-intervals of a cluster key domain to a corresponding one of a plurality of processing core resources, and to generate a plurality of segments from the set of records via the plurality of processing core resources. Each processing core resource in the plurality of processing core resources generates a subset of the plurality of segments by identifying a proper subset of the set of records based on having cluster key values included in a corresponding one of the plurality of key space sub-intervals, and by generating its subset of the plurality of segments to include the proper subset of the set of records.

Figure 27D:
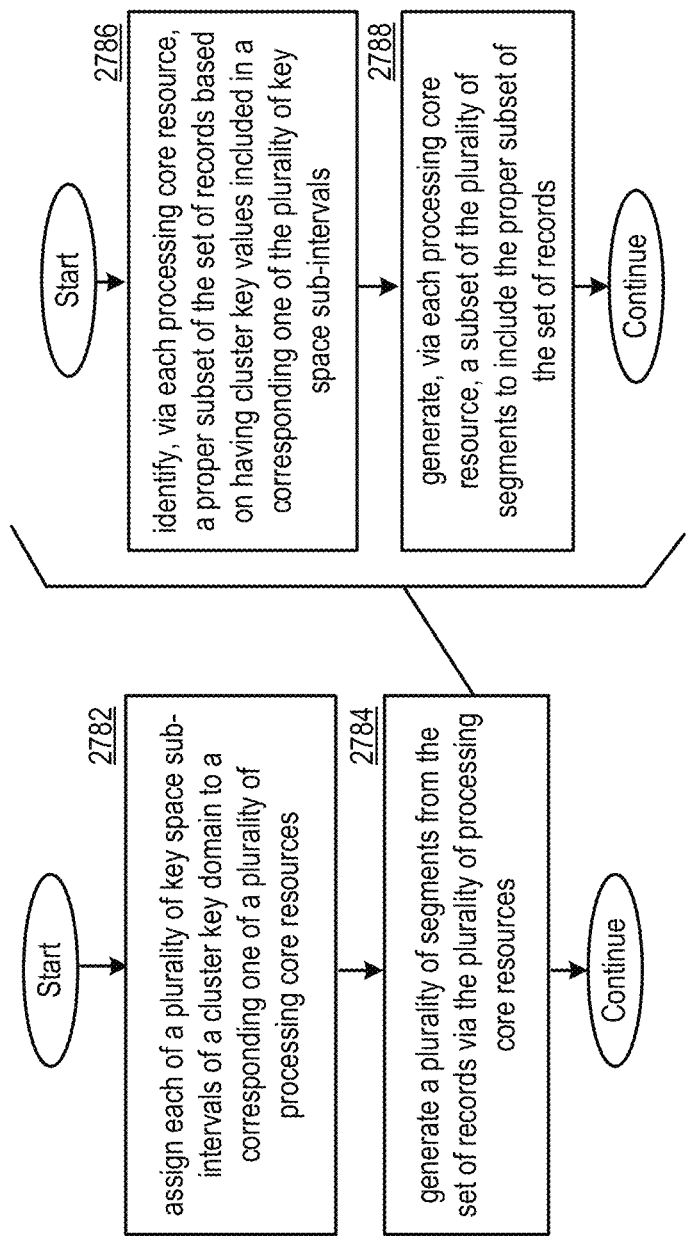
FIG. 27D is a logic diagram illustrating a method of parallelized segment generation from pages in accordance with various embodiments of the present invention.

FIG. 27D illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27D. As another example, one or more nodes 37 can each utilize a plurality of processing core resources 48, where each of the plurality of processing core resources 48 of a given node 37 can independently perform some or all of the steps of FIG. 27D in parallel, without coordination with other ones of the plurality of processing core resources 48. Some or all of the method of FIG. 27D can be performed by the segment generator 2517 of FIG. 25A. Some or all of the method of FIG. 27D can be performed by one or more stream loader modules 2510 of FIG. 25B, independently or in conjunction. Some or all of the method of FIG. 27D can be performed by the segment generator of 2517 of FIGS. 27A-27C, for example, by utilizing the plurality of processing core resources 48-1-48W. For example, some or all of the method of FIG. 27D can be performed by implementing the row extraction module 3630 of one or more processing core resources 48 of FIG. 27A: by implementing the clustering sub-module 3640 of one or more processing core resources 48 of FIG. 27A: and/or by implementing the columnar rotation module 2630 of one or more processing core resources 48 of FIG. 27A. Some or all of the steps of FIG. 27D can optionally be performed by any other processing module of the database system 10. Some or all of the steps of FIG. 27D can be performed to implement some or all of the functionality of the record processing and storage system 2505 of FIG. 25A and/or FIG. 25B. Some or all of the steps of FIG. 27D can be performed to implement some or all of the functionality of the segment generator 2517 of FIGS. 27A-27C. Some or all steps of FIG. 27D can be performed by database system 10 in accordance with other embodiments of the database system 10 and/or nodes 37 discussed herein.

Step 2782 includes assigning each of a plurality of key space sub-intervals of a cluster key domain to a corresponding one of a plurality of processing core resources. For example, the cluster key domain is spanned by a plurality of cluster key values of cluster keys of a set of records. Step 2784 includes generating a plurality of segments from the set of records via the plurality of processing core resources. In various embodiments, each processing core resource in the plurality of processing core resources generates a subset of the plurality of segments independently from and in parallel with generating of other subsets of the plurality of segments via other ones of the plurality of processing core resources.

Performing step 2784 can include performing step 2786 and/or step 2788. Step 2786 includes identifying, via each processing core resource of the plurality of processing core resources, a proper subset of the set of records based on having cluster key values included in a corresponding one of the plurality of key space sub-intervals. Step 2788 includes generating, via each processing core resource, a subset of the plurality of segments to include the proper subset of the set of records identified by the corresponding processing core resource in step 2786.

In various embodiments, the method includes segregating the cluster key domain into the plurality of key space sub-intervals. In various embodiments, the method includes determining a selected number of key space sub-intervals to be generated based on a number of processing core resources in the plurality of processing core resources, where the cluster key domain is segregated into the selected number of key space sub-intervals. In various embodiments, the method includes determining a target number of records to be included in each proper subset of the set of records. This target number of records can be determined based on a total number of records in the set of records and/or a selected number of key space sub-intervals to be generated. The cluster key domain can be segregated into the selected number of key space sub-intervals based on the target number of records.

In various embodiments, each the plurality of key space sub-intervals includes a corresponding one of a plurality of proper subsets of a plurality of cluster key values of the cluster key domain. Each of the plurality of proper subsets of the plurality of cluster key values can be mutually exclusive and collectively exhaustive with respect to the plurality of cluster key values. Each of the plurality of proper subsets of the plurality of cluster keys can include sequential ones of the plurality of cluster key values in accordance with an ordering of the plurality of cluster key values. Each of the plurality of proper subsets of the plurality of cluster keys can alternatively or additionally include continuous ranges of ones of the plurality of cluster key values in accordance with an ordering of the plurality of cluster key values. The plurality of proper subsets of the plurality of cluster keys can be contiguous intervals of the cluster key domain. In various embodiments a first proper subset of the plurality of proper subsets includes a first number of cluster key values, and a second proper subset of the plurality of proper subsets includes a second number of cluster key values that is different from the first number of cluster key values.

In various embodiments, generating the plurality of segments from the set of records via the plurality of processing core resources can further include accessing, via each processing core resource, the proper subset of the set of records from storage in a row-based format. The subset of the plurality of segments can be generated to include the proper subset of the set of records in a column-based format. In various embodiments, generating the plurality of segments from the set of records via the plurality of processing core resources further includes generating a plurality of record groups from the proper subset of the set of records based on cluster key values of the proper subset of the set of records: generating a set of column-formatted record data for each of the plurality of record groups: and/or generating a set of segments from each set of column-formatted record data. For example, the subset of subset of the plurality of segments generated by a given processing core resource can include a plurality of sets of segments, such as a plurality of segment groups, from a plurality of sets of column-formatted record data. In various embodiments, generating the set of segments from each set of column-formatted record data includes generating segment metadata for each set of segments. In various embodiments, generating the set of segments from each set of column-formatted record data includes applying a redundancy storage error coding scheme to each set of column-formatted record data to generate a corresponding set of segments.

In various embodiments, the set of records are included in a plurality of pages stored by a page storage system. Each page of the plurality of pages can include a distinct plurality of records in the set of records. In various embodiments, the method further includes generating the plurality of pages and/or determining to convert the plurality of pages into the plurality of records based on storage utilization data. In various embodiments, identifying the proper subset of the set of records via each processing core resource includes accessing, via each processing core resource, each of the plurality of pages and/or extracting, via each processing core resource, ones of the plurality of records in each of the plurality of pages having cluster key values included in the corresponding one of the plurality of key space sub-intervals.

In various embodiments, identifying the proper subset of the set of records via each processing core resource further includes populating a data structure with location data, such as cursor values, for the ones of the plurality of records in corresponding ones of the plurality of pages. The data structure can be organized based on an ordering of cluster key values of the ones of the plurality of records. Identifying the proper subset of the set of records via each processing core resource can further include extracting records from the plurality of pages in accordance with the ordering of cluster key values by utilizing the data structure. For example, the data structure is implemented a min-heap organized by cluster key values. Alternatively or in addition, location data is popped and/or extracted from the data structure one at a time, in an ordering dictated by the ordering of their corresponding cluster key values, and records are extracted from pages one at a time in response their location data being popped from the data structure. Alternatively or in addition the records of the proper subset of the set of records are extracted in an order dictated by their cluster key values based on utilizing the data structure.

In various embodiments, one plurality of records of one page of the plurality of pages includes a first record having a first cluster key value included in a first one of the plurality of key space sub-intervals, and a second record having a second cluster key value included in a second one of the plurality of key space sub-intervals. Another plurality of records of another page of the plurality of pages can include a third record having a third cluster key value included in the first one of the plurality of key space sub-intervals, and a fourth record having a fourth cluster key value included in the second one of the plurality of key space sub-intervals. In various embodiments, generating the plurality of segments from the set of records via the plurality of processing core resources includes accessing, via a first processing core resource, the one page and the another page, and identifying, via the first processing core resource, a corresponding first proper subset of the set of records to include the first record and the third record, and to not include the second record and the fourth record, by identifying cluster key values included in the first one of the plurality of key space sub-intervals based on the first one of the plurality of key space sub-intervals being assigned to the first processing core resource. Generating the plurality of segments from the set of records via the plurality of processing core resources can further include accessing, via a second processing core resource, the one page and the another page, and identifying, via the second processing core resource, a corresponding second proper subset of the set of records to include the second record and the fourth record, and to not include the first record and the third record, by identifying cluster key values included in the second one of the plurality of key space sub-intervals based on the second one of the plurality of key space sub-intervals being assigned to the second processing core resource.

In various embodiments, a non-transitory computer readable storage medium includes at least one memory section that stores operational instructions that, when executed by a processing module that includes a processor and a memory, cause the processing module to assign each of a plurality of key space sub-intervals of a cluster key domain spanned by a plurality of cluster key values of a set of records to a corresponding one of a plurality of processing core resources, and to generate a plurality of segments from the set of records via the plurality of processing core resources. Each processing core resource in the plurality of processing core resources generates a subset of the plurality of segments by identifying a proper subset of the set of records based on having cluster key values included in a corresponding one of the plurality of key space sub-intervals and by generating the subset of the plurality of segments to include the proper subset of the set of records.

Figure 28A:
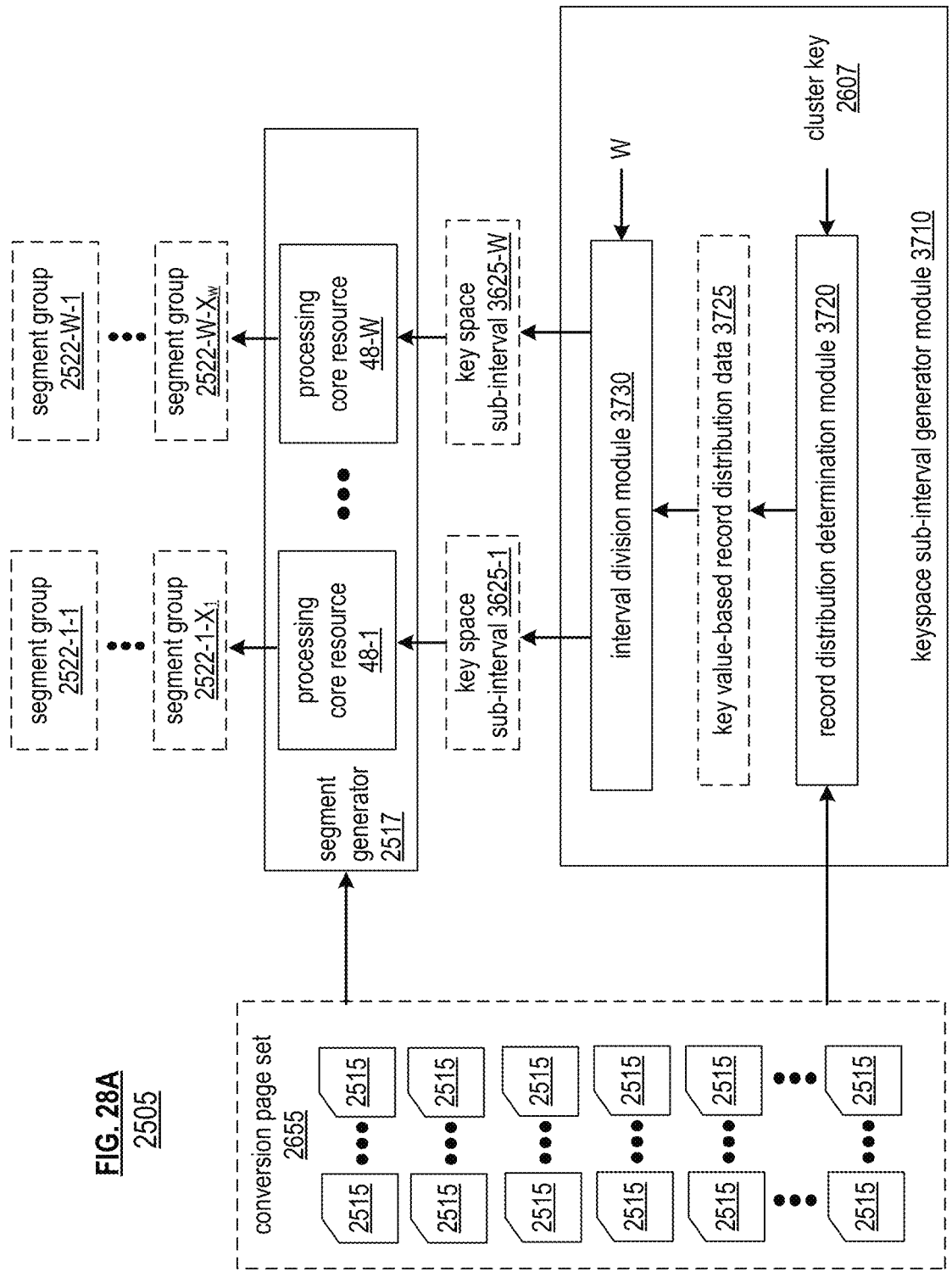
FIG. 28A is a schematic block diagram of an embodiment of a record processing and storage system that implements a key space sub-interval generator module to determine key space sub-intervals for parallelized segment generation in accordance with various embodiments of the present invention.
Figure 28B:
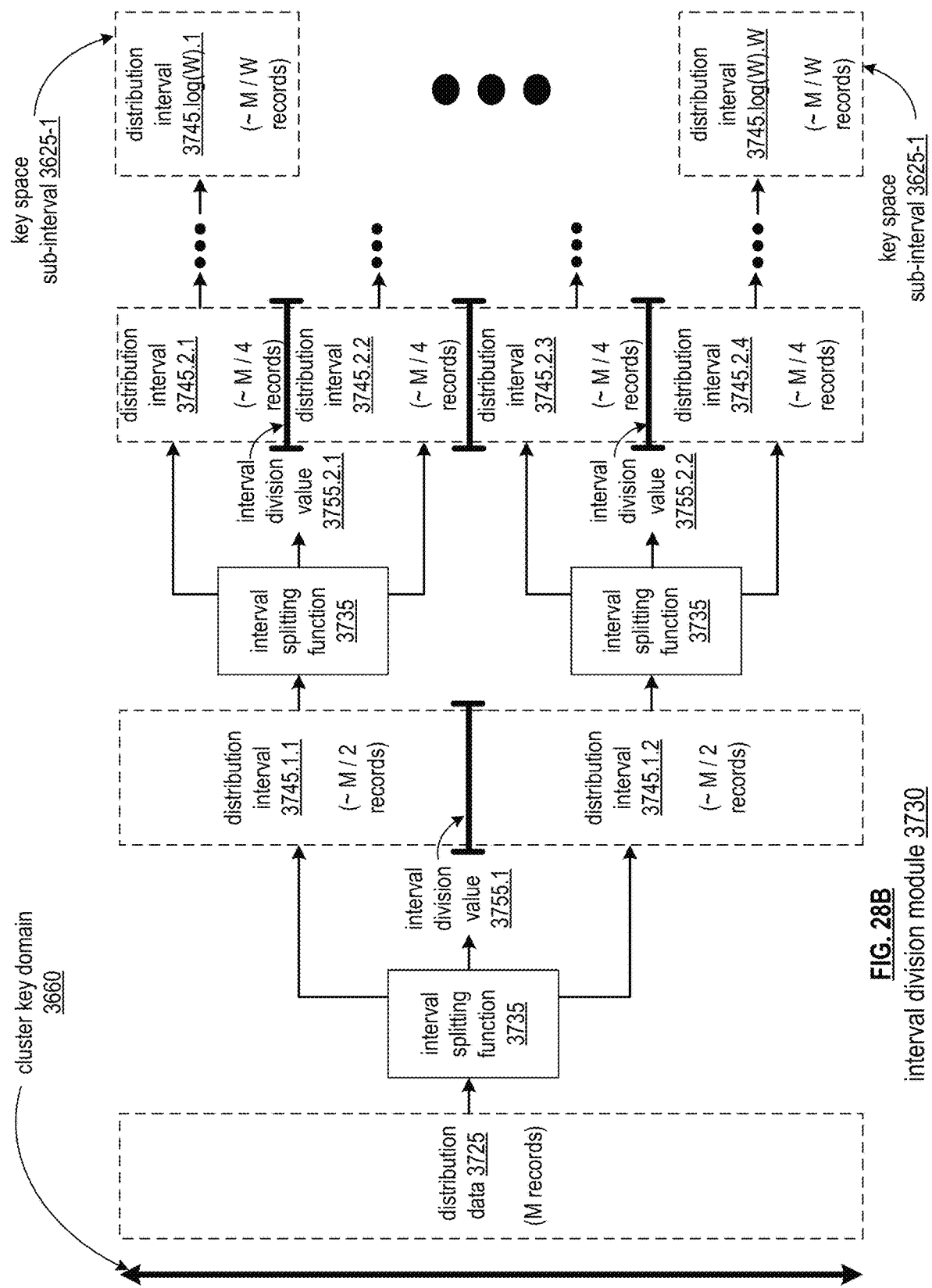
FIG. 28B is a schematic block diagram of an embodiment of an interval division module of a key space sub-interval generator module that determines a plurality of interval divisions in accordance with various embodiments of the present invention.

FIGS. 28A-28C illustrate embodiments of a record processing and storage system 2505 that generates segments in parallel based on a plurality of key space sub-intervals determined via a key space sub-interval generator module 3710. Some or all features and/or functionality of the record processing and storage system 2505 of FIGS. 28A-28C can be utilized to implement the record processing and storage system 2505 of FIG. 25A and/or of any other embodiments of the record processing and storage system 2505 discussed herein.

When generating segments in parallel in accordance with key space sub-intervals, for example, as described in conjunction with FIGS. 27A-27D, utilizing key space sub-intervals with equal numbers of cluster key values can be unideal, as the distribution of rows across key values is not necessarily uniform and most likely has spikes, such as high percentage of cluster key values with NULL values or other common values. Some intervals of the cluster key domain can otherwise have more rows than others in cases where rows per cluster key has a high variance. To mitigate the effect of this possibility, the key space spanned by each disjoint sub-interval can be adjusted to represent approximately the same amount of work. The cluster key domain can be segregated such that the number of records and/or number of bytes within each key space sub-interval across all pages in the conversion page set 2655 is equal and/or approximately equal. This can result in more balanced workload across the processing core resources 48-1-48-W, as they will each be processing roughly the same amount of data to generate their respective segments. This improves the technology of database systems by improving the efficiency of generating segments from pages to enable long term storage of records.

As illustrated in FIG. 28A, the key space sub-intervals 3625-1-3625-W assigned to each processing core resource 48-1-48-W of segment generator 2517 can be dictated via a key space sub-interval generator module 3710. For example, the segment generator 2517 of FIG. 28A can be implemented as the segment generator 2517 of FIG. 27A. In particular, the key space sub-intervals 3625-1-3625-W outputted by the key space sub-interval generator module 3710 can be implemented as the key space sub-intervals 3625-1-3625-W of FIG. 27A utilized by the processing core resources 48-1-48-W to determine their respective row subsets 3635-1-3635-W as discussed in conjunction with FIGS. 27A-27C. The key space sub-interval generator module 3710 can divide the cluster key domain 3660 into the plurality of key space sub-intervals 3625-1-3625-W by implementing a record distribution determination module 3720 and/or an interval division module 3730.

The record distribution determination module 3720 can determine key value-based record distribution data 3725 to be utilized by interval division module 3730 to determine the plurality of key space sub-intervals 3625-1-3625-W. The key value-based record distribution data 3725 can be received by the record distribution determination module 3720, stored in memory accessible by the record distribution determination module 3720, and/or otherwise determined by the record distribution determination module 3720. In some cases, the key value-based record distribution data 3725 can be automatically generated the record distribution determination module 3720 based on the conversion page set 2655 and/or based on one or more previous conversion page sets 2655.

In such cases, the record distribution determination module 3720 can generate key value-based record distribution data 3725 from the records included in pages of the given conversion page set 2655. The key value-based record distribution data 3725 can indicate histogram data and/or empirical distribution data reflecting the actual and/or an approximate distribution of records by cluster key, such as the cluster key 2607 utilized to cluster records into record groups 2625 as described previously.

For example, for each given cluster key value of the cluster key domain 3660, such as each possible key value and/or each cluster key value included in at least one record of the conversion page set 2655, a number of records included in pages of the conversion page set 2655 with the given cluster key value can be counted, approximated, and/or otherwise determined. In such cases, the key value-based record distribution data 3725 indicates the number of records for each cluster key value in the cluster key domain 3660.

As a particular example, the empirical cluster key distribution for each page 2515 of the conversion page set 2655 can be generated based on sampling across all records 2422 in the given page 2515 and/or utilizing a statistical approach to sample a fraction of records 2422 in the given page 2515. The empirical cluster key distribution across all pages can be determined as the key value-based record distribution data 3725 by combining empirical cluster key distributions for each page. In such cases, the empirical cluster key distribution is generated for each given page 2515 in the conversion page set 2655 when the given page is generated, for example, by page generator 2511. In particular, the page generator 2511 can be utilized to implement the record distribution determination module by generating the empirical cluster key distribution for each page 2515 in conjunction with generating each page. This empirical cluster key distribution can be stored in page metadata of corresponding given page by the page generator 2511. When the conversion process is initiated, for example, by the page conversion determination module 2610 as discussed previously, the empirical cluster key distribution in page metadata of all pages 2515 in the conversion page set can be extracted and processed by the key space sub-interval generator module 3710.

Different conversion page sets 2655 can have different key value-based record distribution data 3725 based on the records in its pages having varying cluster key values. The key space sub-interval generator module 3710 can be applied to every conversion page set 2655 in conjunction with performance of each conversion process, where different key space sub-intervals 3625-1-3625-W are generated for different conversion page sets. In some cases, key value-based record distribution data 3725 for various conversion page sets 2655 can be tracked over time by the record processing and storage system 2505 to generate aggregated key value-based record distribution data that can be applied to some or all future conversion page sets 2655, for example, where a same set of key space sub-intervals 3625-1-3625-W are utilized for multiple conversion page sets 2655 based on being generated from this aggregated key value-based record distribution data. In such cases, the aggregated key value-based record distribution data can be processed via interval division module 3730 to render the key space sub-intervals 3625-1-3625-W in a same or similar fashion as the processing of the key value-based record distribution data 3725 of a given conversion page set 2655 as described in conjunction with FIGS. 28A-28C.

The interval division module 3730 can utilize the key value-based record distribution data 3725 to divide the cluster key domain 3660 into the key space sub-intervals 3625-1-3625-W based on the key value-based record distribution data 3725. In particular, the key space sub-intervals 3625-1-3625-W can be configured by the interval division module 3730 to include continuous and/or sequential portions of the cluster key domain 3660 with equivalent numbers of records 2422 as indicated by the key value-based record distribution data 3725, roughly equal numbers of records 2422 as indicated by the key value-based record distribution data 3725, and/or otherwise similar numbers of records 2422 as indicated by the key value-based record distribution data 3725. For example, each key space sub-intervals 3625-1-3625-W can be generated to include as close to a target number of records as possible, where the target number of records is equal to and/or based on the total number of records included in the conversion page set 2655 divided by the number W of processing core resources utilized by the segment generator 2517. The key space sub-intervals 3625-1-3625-W can be configured by the interval division module 3730 to include as similar of numbers of records as possible, as indicated by the key value-based record distribution data 3725. For example, exactly equal numbers of records may not be possible based on the empirical distribution, based on including each cluster key value in exactly one key space sub-interval 3625, and/or based on including sequential and/or continuous ranges of cluster key values in each key space sub-interval 3625 as discussed previously.

In such cases, the resulting row subsets 3635-1-3635-W can include equivalent numbers of records 2422 from the conversion page set 2655, roughly equal numbers of records 2422 from the conversion page set 2655, and/or otherwise similar numbers of records 2422 from the conversion page set 2655 based on the key space sub-intervals 3625-1-3625-W being dictated by the key value-based record distribution data 3725 in this fashion. This results in each corresponding processing core resource 48 having relatively balanced loads by having similar numbers of records 2422 to process into segments, for example, via their row extraction module 3630, via their clustering sub-module 3640, and/or via their columnar rotation module 2630 as illustrated and discussed in conjunction with FIG. 27A.

The embodiments of the interval division module 3730 discussed herein segregate the cluster key domain 3660 into key space sub-intervals 3625-1-3625-W based on rendering row subsets 3635-1-3635-W with equivalent, roughly equal, and/or similar numbers of records 2422, in other embodiments. In other embodiments, the cluster key domain 3660 is alternatively segregated into key space sub-intervals 3625-1-3625-W by the interval division module 3730 based on having equivalent, roughly equal, and/or similar amounts of bytes in the corresponding set of row subsets 3635-1-3635-W, even if this dictates that the row subsets 3635-1-3635-W have unequal numbers and/or more dissimilar numbers of records 2422. This results in each corresponding processing core resource 48 having relatively balanced loads by having similar amounts of data to retrieve, store, and/or process into segments. This can be ideal in cases where records include varying data sizes, and can be further ideal when these varying record sizes are correlated with cluster key.

The number W of key space sub-intervals can be based on and/or equal to the number of processing core resources 48-1-48-W utilized by the segment generator 2517, can be predetermined, can be retrieved from memory, can be configured via user input, can be received, and/or can otherwise be determined. The number W can optionally be strictly equal to a power of two, for example, in embodiments where the interval division module 3730 recursively splits distribution data into two distribution data. In such cases, the set of processing core resources 48-1-48-W utilized by the segment generator 2517 can be allocated by the record processing and storage system 2505 to include this number W of processing core resources that is strictly equal to a power of two.

FIG. 28B illustrates an example embodiment of an interval division module 3730 that recursively divides distribution data in this fashion. The interval division module 3730 of FIG. 28B can be utilized to implement the interval division module 3730 of FIG. 28A.

Dividing the cluster key domain 3660 into a plurality of key space sub-intervals 3625-1-3625-W to rendering row subsets 3635-1-3635-W with equivalent, roughly equal, and/or similar numbers of records 2422 can include recursively applying an interval splitting function 3735 upon the full key value-based record distribution data 3725 determined by the record distribution determination module 3720 that includes a number of records M, for example, based on the total number of records in conversion page set being equal to M and/or based on a number of sampled records to render the key value-based record distribution data 3725 being equal to M. A resulting set of W final distribution intervals 3745 can be generated from the full key value-based record distribution data 3725 via this recursive process, where each final distribution intervals 3745 encompass a corresponding one of a set of W contiguous spans of the key value-based record distribution data 3725 that each ideally include as close to M/W records as possible from the full key value-based record distribution data 3725. The cluster key values in each of these W final distribution intervals 3745 dictate the corresponding key space sub-intervals 3625-1-3625-W.

This problem can be considered in terms of integrals of a distribution function, f(k), corresponding to a number of rows or number of bytes for each given cluster key value k of the cluster key domain. This distribution function f(k) can be implemented as and/or indicated by the key value-based record distribution data 3725.

The cluster key domain can sub-divided such that the two sides of the region have equivalent numbers of records and/or bytes, based on the distribution function f(k). As a particular example of interval splitting function 3735, a first interval division value 3755.1 can be selected by utilizing a statistical method to solve for b in the following relation to produce two regions of equivalent work: s $$\int_{a_0}^{b} f(k) = \int_{b}^{\infty} f(k)$$

In this relation, f(k) can correspond to the distribution of number of records 2422 and/or number of bytes by cluster key value, such as an empirical distribution of cluster key values in the conversion page set 2655 as indicated in the key value-based record distribution data 3725. The value $a_0$ can correspond to a lowest and/or first cluster key value in the cluster key domain 3660. The value of b that renders equivalence, approximate equivalence, and/or as close to equivalence as possible can correspond to a cluster key value selected as the interval division value 3755.1.

Additional sub-sub regions can be recursively computed via solving for b in similar relations, where the integrals instead span only within the given distribution interval being subdivided rather than the entire key space domain. Each sub-division via performance of interval splitting function 3735 upon a given distribution interval 3745 to compute an interval division value 3755 can include solving for b over only the portion of f(k) spanned by the given distribution interval 3745. This recursive sub-division can continue until enough disjoint sub-regions to distribute over all processing core resources are created to render key space sub-intervals 3625-1-3625-W.

Various numerical methods are available to solve the above root-finding problem. Rather than computing the integrals analytically in each performance of interval splitting function 3735 upon a given distribution interval 3745, a statistical method can optionally be applied. Performance of interval splitting function 3735 upon a given distribution interval 3745 can include producing a sampling of the integral over the range of the cluster key domain 3660 denoted by the given distribution interval 3745. The resolution of this sampling directly can affect the quality of the root finding in solving for b. The resolution of the sampling can be selected based on user configuration, based on being received, based on being retrieved from memory, based on being calculated, and/or based on otherwise being determined.

In some cases, determining f(k) is not tractable. To account for this, a statistical approach can be utilized by the record distribution determination module 3720 to sample f(k) per page 2515 at page generation time for storage with each given page 2515 as discussed previously, for example, in conjunction with the page generator 2511. These f(k) sampled across pages 2515 in the conversion page set 2655 can then be combined by the record distribution determination in generating the key value-based record distribution data 3725 to render a sampled f(k) for the entire conversion page set 2655. This sampled f(k) reflecting the empirical distribution determined via record distribution determination module 3720 for the entire conversion page set 2655 can be utilized in rather than a probability distribution f(k) in solving for b in the relation above.

In performing the first interval splitting function 3735 upon the full key value-based record distribution data 3725, the interval division value 3755.1 can be computed and/or otherwise selected via performance of interval splitting function 3735 such that the two distribution intervals 3745.1.1 and 3745.1.2 include a number of records that is as close to M/2 records as possible and/or such that the distribution intervals 3745.1.1 includes a first number of records with a smallest difference from a second number of records included in the distribution intervals 3745.1.2 as possible.

Applying the interval splitting function 3735 interval upon the full key value-based record distribution data 3725 can render two distribution intervals 3745.1.1 and 3745.1.2 that include approximately M/2 records. These two distribution intervals 3745.1.1 and 3745.1.2 are designated by an interval division value 3755.1. In this example, distribution interval 3745.1.1 includes cluster key values ordered before the cluster key values of distribution interval 3745.1.2. In such cases, the interval division value 3755 can be designated as a final cluster key value in the sequential set and/or continuous range of cluster key values of distribution intervals 3745.1.1, and/or a first cluster key value in the sequential set and/or continuous range of cluster key values of distribution intervals 3745.1.2. For example, the interval division value 3755 can correspond to and/or be based on the value of b in the integral relation discussed above. The two distribution intervals 3745.1.1 and 3745.1.2 can each include mutually exclusive and/or collectively exhaustive portions of the full key value-based record distribution data 3725 dictated by mutually exclusive and/or collectively exhaustive spans of cluster key values of the cluster key domain 3660.

Note that equivalence of number of bytes and/or number of records included in the two distribution intervals 3745.1.1 and 3745.1.2 may not be possible. For example, due to the sampled f(k) including row and/or byte counts for discrete cluster key values of the cluster key domain 3660, solving for b may not have a possible one of the discrete cluster key values that renders equivalence of the integral relation described previously. In some cases, the interval division value 3755.1 can be selected as a highest possible cluster key value that renders the number of records included in distribution intervals 3745.1.1 as less than or equal to the number of records included in distribution intervals 3745.1.2. As another example, the interval division value 3755.1 can be selected as a lowest possible cluster key value that renders the number of records included in distribution intervals 3745.1.1 as greater than or equal to the number of records included in distribution intervals 3745.1.2.

As another example, a first interval division value candidate is selected as a highest possible cluster key value that renders the number of records included in distribution intervals 3745.1.1 as less than or equal to the number of records included in distribution intervals 3745.1.2. A first difference in number of records in the distribution intervals 3745.1.1 and 3745.1.2 resulting from this first interval division value candidate is computed. A second interval division value candidate is selected as a lowest possible cluster key value that renders the number of records included in distribution intervals 3745.1.1 as greater than or equal to the number of records included in distribution intervals 3745.1.2. A second difference in number of records in the distribution intervals 3745.1.1 and 3745.1.2 resulting from this second interval division value candidate is computed. The first interval division value candidate is selected as the interval division value 3755.1 when the first difference is less than the second difference. The second interval division value candidate is selected as the interval division value 3755.1 when the second difference is less than the first difference. Either interval division value candidate can be selected when the first difference is equal to the second difference.

The resulting distribution intervals 3745.1.1 and 3745.1.2 undergo the interval splitting function 3735 themselves to each be divided into their own two distribution intervals. This renders four distribution intervals that ideally include approximately M/4 records, where distribution intervals 3745.2.1 and 3745.2.2 correspond to two subintervals of distribution interval 3745.1.1 as dictated by interval division value 3755.2.1, and where distribution intervals 3745.2.3 and 3745.2.4 correspond to two subintervals of distribution interval 3745.1.2 as dictated by interval division value 3755.2.2. The distribution intervals 3745.2.1, 3745.2.2, 3745.2.3, and 3745.2.4, can correspond to mutually exclusive and collectively exhaustive portions of the key value-based record distribution data 3725.

Interval splitting function 3735 can be applied to distribution interval 3745.1.1 independently from and/or in parallel with applying interval splitting function 3735 to distribution interval 3745.1.2. Interval division value 3755.2.1 can be selected for distribution intervals 3745.1.1 by applying the interval splitting function 3735 to distribution intervals 3745.1.1 in a same or similar fashion as discussed in conjunction with applying interval splitting function 3735 to key value-based record distribution data 3725, and/or interval division value 3755.2.2 can be selected for distribution intervals 3745.1.2 by applying the interval splitting function 3735 to distribution intervals 3745.1.2 in a same or similar fashion as discussed in conjunction with applying interval splitting function 3735.

This process can continue, for example, in accordance with recursively applying the same or similar interval splitting functions 3735 to each given distribution interval 3745 to render its own two distribution intervals 3745 as mutually exclusive and collectively exhaustive subintervals of the given distribution interval 3745 that each span sequential sets and/or continuous ranges of the cluster key values included in the given distribution interval 3745. The two distribution intervals 3745 generated from a given distribution intervals 3745 can be selected to each include approximately half of the number of records included in the given distribution intervals 3745 and/or to include the most similar possible numbers of records if equal numbers of records are not possible. In the process illustrated in FIG. 28B, for an integer value of i, a step of subdividing a set of (i×2) previously generated distribution intervals 3745.$i$.1-3745.$i$.(i×2) renders a set of distribution intervals denoted as 3745.$i$+1.1-3745.$i$+1.((i+1)×2).

While the embodiment of FIG. 28B illustrates a recursive splitting process in accordance with a factor of two based on splitting intervals into exactly two subintervals in each step, in other embodiments, another splitting factor X can be applied based on based on splitting intervals into exactly X subintervals via the interval splitting function 3735, where X can be equal to any integer value that is greater than or equal to two. In such cases, the X subintervals can be similarly generated from a given interval to include equal, roughly and/or otherwise similar numbers of records.

This process can continue until a final set of W distribution intervals 3745 are produced. As illustrated in FIG. 28B, this process continues until i is equal to $\log_2(W)$ based on W being a power of two. The final set of W distribution intervals 3745.$log_2$(W).1-3745.$log_2$(W). W can be dictated by W−1 interval division values segregating these W distribution intervals. The final set of W distribution intervals 3745.$log_2$(W).1-3745.$log_2$(W). W each ideally include approximately M/W records, and/or as close to M/W as possible in undergoing this recursive splitting process.

FIG. 28C illustrates an example embodiment of key value-based record distribution data 3725 that is subdivided into four distribution intervals 3745 via the process illustrated in FIG. 28B. Note that the of key value-based record distribution data 3725 includes a small number of cluster key values in the cluster key domain 3660 for the purposes of illustration. Other embodiments of key value-based record distribution data 3725 can include much larger numbers of cluster key values in the cluster key domain 3660. In other embodiment, the key value-based record distribution data 3725 can be subdivided into a much larger number W of distribution intervals 3745 for processing by a corresponding number of processing core resources 48-1-48-W.

In this example, the internal division value 3755.1 was determined via applying interval splitting function 3735 to the full key value-based record distribution data 3725 based on including numbers of records in the resulting distribution intervals 3745.1.1 and 3745.1.2 that are as close to equal as possible. The internal division value 3755.1.1 was determined via applying interval splitting function 3735 to the distribution interval 3745.1.1, corresponding to the portion of key value-based record distribution data 3725 left of the internal division value 3755.1, based on including numbers of records in the resulting distribution intervals 3745.2.1 and 3745.2.2 that are as close to equal as possible. The internal division value 3755.1.2 was determined via applying interval splitting function 3735 to the distribution interval 3745.1.2, corresponding to the portion of key value-based record distribution data 3725 right of the internal division value 3755.1, based on including numbers of records in the resulting distribution intervals 3745.2.3 and 3745.2.4 that are as close to equal as possible.

Note that the distribution interval 3745.2.3 includes eight possible cluster key values in this example, where only six of the possible cluster key values had non-zero record counts in the key value-based record distribution data 3725. Meanwhile, the distribution interval 3745.2.4 includes only two cluster key values. However, the distribution interval 3745.2.3 and the distribution interval 3745.2.4 include similar numbers of records based on interval division value 3755.2.2 being selected to divide the number of records right of interval division value 3755.1 as equally as possible. In particular, distribution interval 3745.2.3 includes a greater number of cluster key values than the distribution interval 3745.2.4 based on cluster key values in distribution interval 3745.2.3 having a lower average record counts in the key value-based record distribution data 3725 than the cluster key values in distribution interval 3745.2.4. On the other hand, based on cluster key values in distribution interval 3745.2.1 having a similar and/or equal average record counts in the key value-based record distribution data 3725 to the cluster key values in distribution interval 3745.2.2, distribution intervals 3745.2.1 and 3745.2.2 both include exactly three cluster key values as a result of interval division value 3755.2.1 being selected to divide the number of records left of interval division value 3755.1 as equally as possible.

Figure 28D:
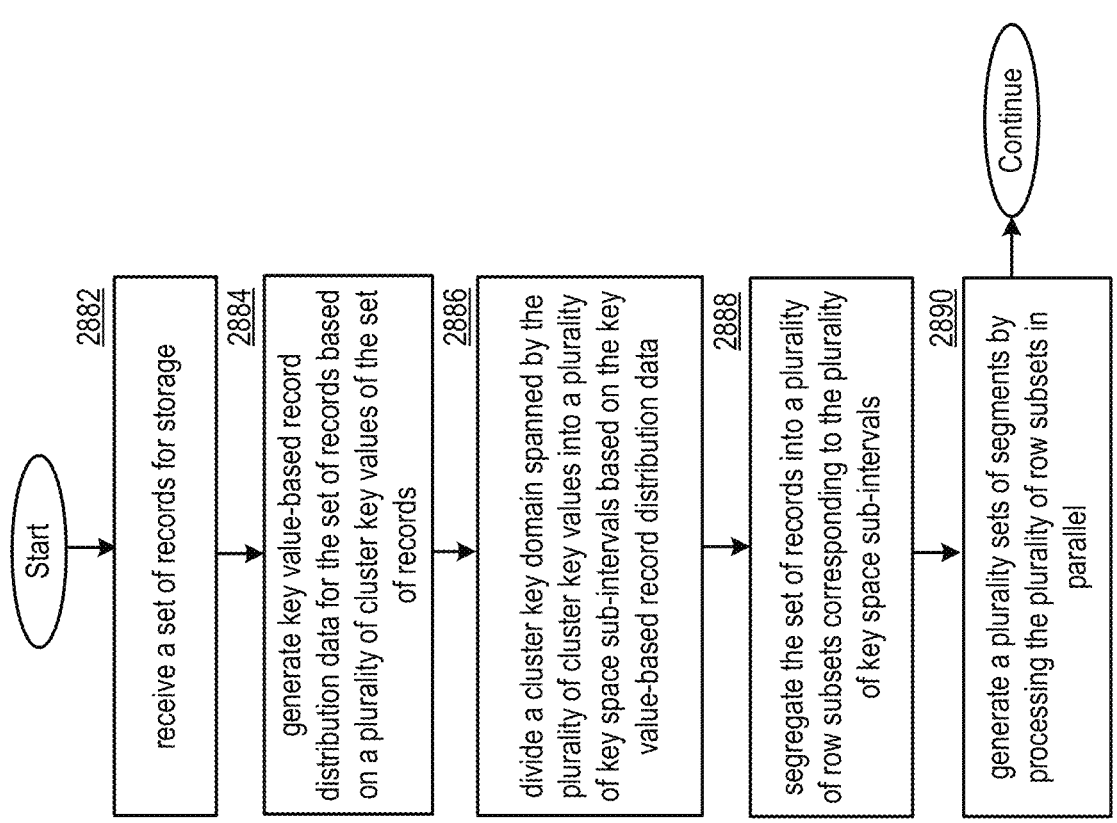
FIG. 28D is a logic diagram illustrating a method of determining a plurality of interval divisions for parallelized segment generation from pages in accordance with various embodiments of the present invention.

FIG. 28D illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28D. As another example, one or more nodes 37 can each utilize a plurality of processing core resources 48, where each of the plurality of processing core resources 48 of a given node 37 can independently perform some or all of the steps of FIG. 28D in parallel, without coordination with other ones of the plurality of processing core resources 48. Some or all of the method of FIG. 28D can be performed by the segment generator 2517 of FIG. 25A. Some or all of the method of FIG. 28D can be performed by one or more stream loader modules 2510 of FIG. 25B, independently or in conjunction. Some or all of the method of FIG. 28D can be performed by the segment generator of 2517 of FIGS. 27A-27C, for example, by utilizing the plurality of processing core resources 48-1-48W. For example, some or all of the method of FIG. 28D can be performed by implementing the row extraction module 3630 of one or more processing core resources 48 of FIG. 27A; by implementing the clustering sub-module 3640 of one or more processing core resources 48 of FIG. 27A; and/or by implementing the columnar rotation module 2630 of one or more processing core resources 48 of FIG. 27A. Some or all of the steps of FIG. 28D can be performed by the key space sub-interval generator module 3710 of FIG. 28A, for example, by utilizing the record distribution determination module 3720 of FIG. 28A and/or the interval division module 3730 of FIG. 28A. In some cases, the interval division module 3730 can be utilized to implement at least one step of FIG. 28D by utilizing the interval splitting function 3735 of FIG. 28B, for example, in accordance with a recursive process. Some or all of the steps of FIG. 28D can optionally be performed by any other processing module of the database system 10. Some or all of the steps of FIG. 28D can be performed to implement some or all of the functionality of the record processing and storage system 2505 of FIG. 25A, FIG. 25B, and/or FIG. 28A. Some or all steps of FIG. 28D can be performed by database system 10 in accordance with other embodiments of the database system 10 and/or nodes 37 discussed herein.

Step 2882 includes receiving a set of records for storage, such as the set of records included in the conversion page set. Step 2884 includes generating key value-based record distribution data for the set of records based on a plurality of cluster key values of the set of records, such as histogram data and/or empirical distribution data indicating a number or records in the set of records having each of the plurality of cluster key values.

Step 2886 includes dividing a cluster key domain spanned by the plurality of cluster key values into a plurality of key space sub-intervals based on the key value-based record distribution data. For example, the cluster key domain is divided into the plurality of key space sub-intervals based on each of the plurality of key space sub-intervals having equal, roughly equal, and/or similar numbers of records with corresponding ones of the plurality of cluster key values as indicated by the key value-based record distribution data. As a particular example, distribution intervals of the key value-based record distribution data are recursively split into two distribution intervals as discussed in conjunction with FIG. 28B. Each division of a distribution interval into two distribution intervals can be performed to render an approximately equal number of records in the two distribution intervals and/or to otherwise render the most similar numbers of records possible in creating the two distribution intervals.

Step 2888 includes segregating the set of records into a plurality of row subsets corresponding to the plurality of key space sub-intervals. For example, records in a given one of the plurality of row subsets all have cluster key values within a corresponding one of the plurality of key space sub-intervals. Step 2890 includes generating a plurality sets of segments by processing the plurality of row subsets in parallel. For example, the plurality of sets of segments are generated via a plurality of processing core resources as illustrated in FIG. 28A and/or as discussed in conjunction with FIGS. 27A-27C. In some cases, performing step 2888 can include performing step 2784 of FIG. 27D and/or can include performing steps 2786 and/or 2788 for each processing core resource.

FIGS. 29A-29D illustrate embodiments of a query processing system 2502 that is operable to separately read records from pages and segments in query execution. The query processing system 2502 of FIGS. 29A-29D can be utilized to implement the query processing system 2502 of FIG. 25A and/or any other embodiments of the query processing system 2502 discussed herein.

As discussed previously, the queries can be processed based on reads to segments that include records in columnar format, and based on reads to pages that include records in row format. Pages may not have all metadata structures, such as indexes and/or statistics, that will eventually be calculated for segments and included in segments when generated via segment generator 2517. However, this information can be required in executing queries, for example, when query expressions are processed by an optimizer and/or when the resulting operator execution flow is executed.

Hybrid page and segment query processing can be achieved via bifurcated IO operators and on the fly synthesis of required metadata structures for pages. This enables query executions to be performed on rows stored in both pages and segments, which can be ideal as rows may be stored in pages awaiting conversion for hours/days. Other nodes utilized to execute queries, such as nodes at inner levels 2414 and/or 2412 of a query execution plan 2405, can remain unaware of whether records were retrieved from pages or segments, as this is not relevant once these records have been read. This improves the technology of database systems by enabling ingested records that have not yet been converted into segments to be utilized in query execution once stored in pages, reducing the delay until these records will be reflected in query resultants. As queries can be serviced via records before they are converted into segments, this further improves the technology of database systems by enabling greater delays in initiating the conversion process for segment generation to increase the levels of clustering to improve database efficiency as discussed previously.

Processing both pages and segments in tandem requires uniform utilization of indexes for processing pages and segments. In particular, it is important to ensure pages are processed as if they were segments to ensure query correctness is achieved. For example, consider the case where an index probe operation is outputted by the optimizer to skip over some rows not needed for query based on whether they match an index predicate. If this index probe is not processed when reading pages, corresponding rows of the pages would not be skipped. As these rows would be presumed to have already been skipped in later operations, they will be incorrectly be included/used as input to further operators in the flow. Therefore, corresponding indexes for row in pages are generated at runtime to ensure uniform IO processing/filtering of rows, regardless of whether they were read from segments or pages. This improves the technology of database systems by guaranteeing query correctness when enabling the use of both pages and segments in query execution.

Figure 29A:
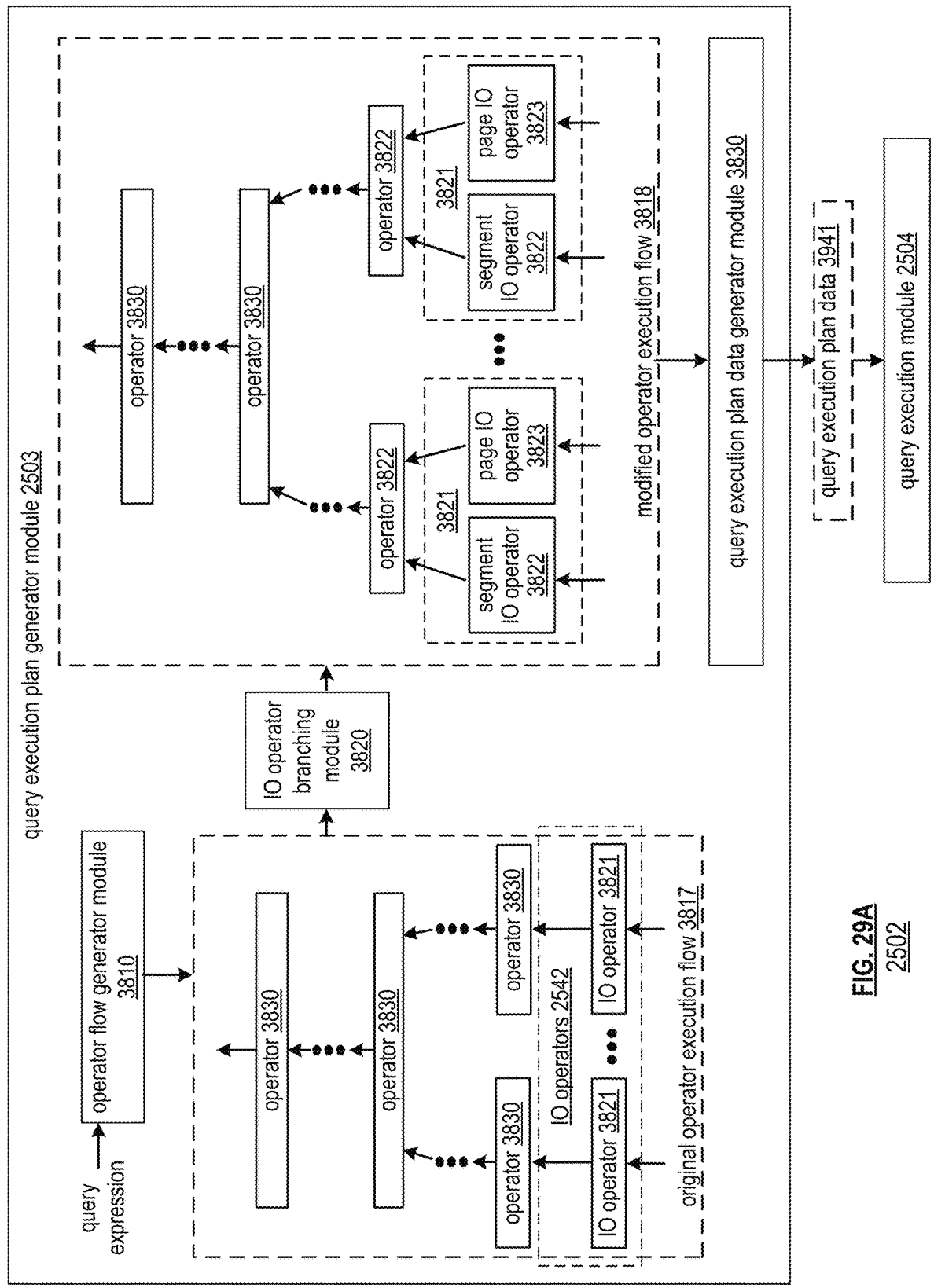
FIG. 29A is a schematic block diagram of an embodiment of a query execution plan generator module of a query processing system that implements an IO branching module in accordance with various embodiments of the present invention.

FIG. 29A illustrates a query execution plan generator module 2503. The query execution plan generator module 2503 of FIG. 29A can be utilized to implement the query execution plan generator module 2503 of FIG. 25A and/or any other embodiments of the query execution plan generator module 2503 discussed herein.

The query execution plan generator module 2503 can include an operator flow generator module 3810 that produces an original operator execution flow 3817 from a given query expression and/or query request, for example, received via user input and/or otherwise determined by the database system 10 for execution. The original operator execution flow 3817 can include a plurality of operators 3830, such as a plurality of structured query language (SQL)

operators and/or other relational operators in a flow, for example, as illustrated in FIG. 29A. The plurality of operators 3830 of the original operator execution flow 3817 can be arranged in a serial flow, and can optionally include multiple parallelized branches within the serialized flow.

The original operator execution flow 3817 can include a set of IO operators 2542, which can include one or more IO operators 3821 at one or more leaves of the original operator execution flow 3817, corresponding to first operators to be performed in execution of the original operator execution flow 3817. For example, the set of IO operators 2542 of FIG. 29A can be utilized to implement the IO operators 2542 of FIG. 25B in execution of the given query. Each IO operators 3821 can correspond to a read of a set of records, for example, from a particular SQL table and/or relational structure. Each IO operators 3821 can optionally include index probe operations and/or filtering instructions based on other operators of the original operator execution flow 3817, such as filtering parameters of one or more SELECT operators of the query identified, for example, by an optimizer of the query execution plan generator module 2503.

These IO operators can correspond to row reads and/or accessing of records 2422 in memory, such as in page storage system 2506 of FIG. 25A and/or segment storage system 2508 of FIG. 25A. Note that in the original operator execution flow 3817, the storage format of the required records, such as whether records are stored in segments or pages and/or whether records are stored in columnar format or row format, is not relevant to the flow of query operators utilized to execute the query. For example, the query execution plan generator module 2503 utilizes an optimizer to generate the original operator execution flow 3817 without consideration for whether the rows will be read from segments or pages.

Once the original operator execution flow 3817, an IO operator branching module 3820 can be applied to generate a modified operator execution flow 3818 from the original operator execution flow 3817. Generating the modified operator execution flow 3818 can include branching a segment IO operator 3822 and a page IO operator 3823 in parallel to implement each IO operator 3821 of the original operator execution flow 3817. The original operator execution flow 3817 can alternatively be generated to automatically include the parallelized segment IO operator 3822 and page IO operator 3823.

The query execution plan data generator module 3810 can generate query execution plan data 3941 from the modified operator execution flow 3818 that is utilized by query execution module 2504 to execute the corresponding query as discussed previously. For example, the query execution plan data 3941 of FIG. 29A can implement the query execution plan data of FIG. 25A. The query execution plan data 3941 can include the modified operator execution flow 3818 and/or can assign portions of the modified operator execution flow 3818 to nodes 37 at different levels of a corresponding query execution plan 2405. In some cases, nodes 37 at IO level 2416 of a query execution plan 2405 are assigned to execute only the set of IO operators 2542, and are thus instructed to execute one or more segment IO operators 3822 and/or one or more page IO operators 3823.

Figure 29B:
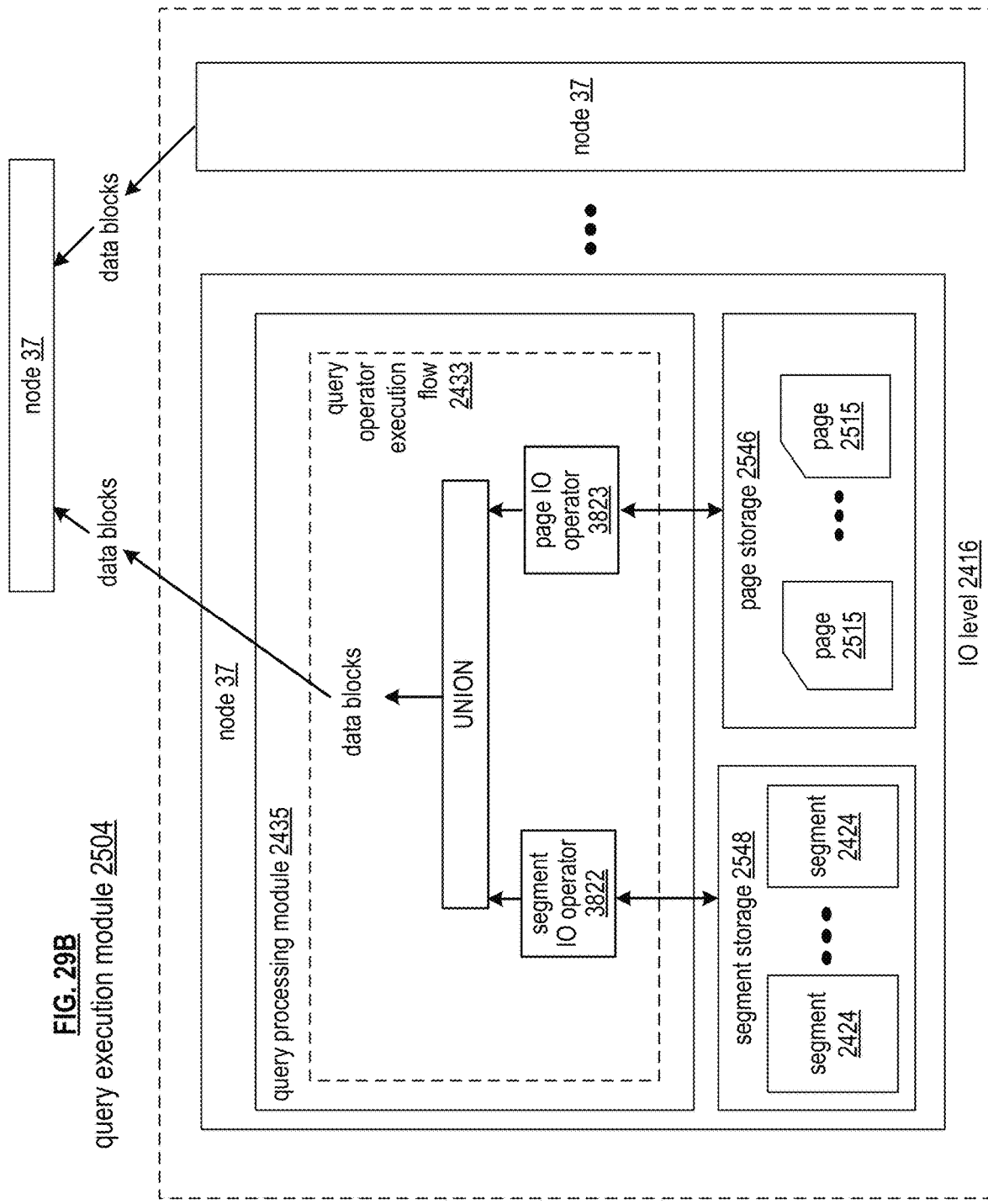
FIG. 29B is a schematic block diagram of an embodiment of a node of a query execution module that facilitates execution of a query via a segment IO operator and a page IO operator in accordance with various embodiments of the present invention.

FIG. 29B illustrates an example embodiment of a query execution module 2504 that facilitates execution of a query, for example, in conjunction with the query execution plan data 3941 of FIG. 29A. The query execution module 2504 can utilize a plurality of nodes 37 of a query execution plan 2405 to execute the query as discussed previously. In particular, FIG. 29B illustrates a subset of nodes 37 at an IO level 2416 of a query execution plan 2405 utilized by the query execution module 2504 to execute a given query in conjunction with the query execution plan data 3941 of FIG. 29A. The subset of nodes 37 at an IO level 2416 of FIG. 29B can be utilized to implement a particular subset of nodes 37 at an IO level 2416 of FIG. 24A that send their outputted data blocks to a same parent node 37 at the bottom-most inner level 2414.H-1. Note that other nodes at IO level 2416 of FIG. 24A can similarly be implemented as illustrated in FIG. 29B to generate and send data blocks to other assigned parent nodes at the bottom-most inner level 2414.H-1.

Each node 37 at an IO level 2416 can utilize its query processing module 2435 to execute a query operator execution flow 2433, which can correspond to its assigned portion of the modified operator execution flow 3818 as indicated in the query execution plan data 3941. For example, the query execution plan data 3941 is propagated downward from a root level node of the query execution plan 2405 and/or otherwise communicated to the IO level nodes. In particular, the nodes 37 at an IO level 2416 are assigned the bottom-most, IO portion of the modified operator execution flow 3818 corresponding to the set of IO operators 2542 of the original operator execution flow 3817 as discussed previously. The resulting records read in via one or more executions of these operators are sent as one or more data blocks to a parent node of the set of nodes 37 as discussed previously.

In particular, each node 37 at an IO level 2416 can execute a query operator execution flow 2433 that includes at least one segment IO operator 3822 and/or at least one page IO operator 3823. For example, each node 37 at the IO level 2416 executes the segment IO operator 3822 and/or the page IO operator 3823 as indicted by the query execution plan data 3941 based on the modified operator execution flow 3818 to each read their own distinct set of records 2422 from segments and/or pages. For example, each of a plurality of distinct sets of records is read by a corresponding one of the plurality of nodes 37 at an IO level 2416, where the union of the plurality of distinct sets of records corresponds to all required records for execution of the query. As illustrated in FIG. 29B, each node 37 at the IO level 2416 reads from their own segment storage 2548 and/or page storage 2546. For example, some or all of the nodes 37 of FIG. 29A can be implemented utilizing the node 37 of FIG. 24C and/or can be implemented utilizing the node 37 of FIG. 25E.

Note that some nodes 37 at the IO level 2416 only read from pages and/or only read from segments despite the query operator execution flow 2433 including the at least one segment IO operator 3822 and the at least one page IO operator 3823. For example, some nodes 37 may store and/or access only segments 2424 and other nodes 37 may store and/or access only pages 2515. At least one node 37 at the IO level 2416 can optionally perform reads upon both segments 2424 and pages 2515. Note that some nodes 37 at the IO level 2416 can read records via recovery of corresponding segments, for example, as discussed in conjunction with FIG. 24D where some or all of the nodes 37 of FIG. 29A are implemented utilizing the node 37 of FIG. 24D.

As illustrated in FIG. 29B a UNION operator can be applied by some or all nodes 37 at the IO level 2416 to combine the set of records reads from segment 2424 via segment IO operator 3822 with the set of records reads from pages 2515 via page IO operator 3823. The set of records reads from segment 2424 via segment IO operator 3822 and the set of records reads from pages 2515 via page IO operator 3823 by a particular node can otherwise be combined and/or can both be sent in outputted data blocks to their parent node in the query execution plan 2405. In some cases, additional operators 3830 can be performed by some or all nodes 37 at the IO level 2416 to further process the read records in generating their output data blocks routed to their respective parent nodes.

Figure 29C:
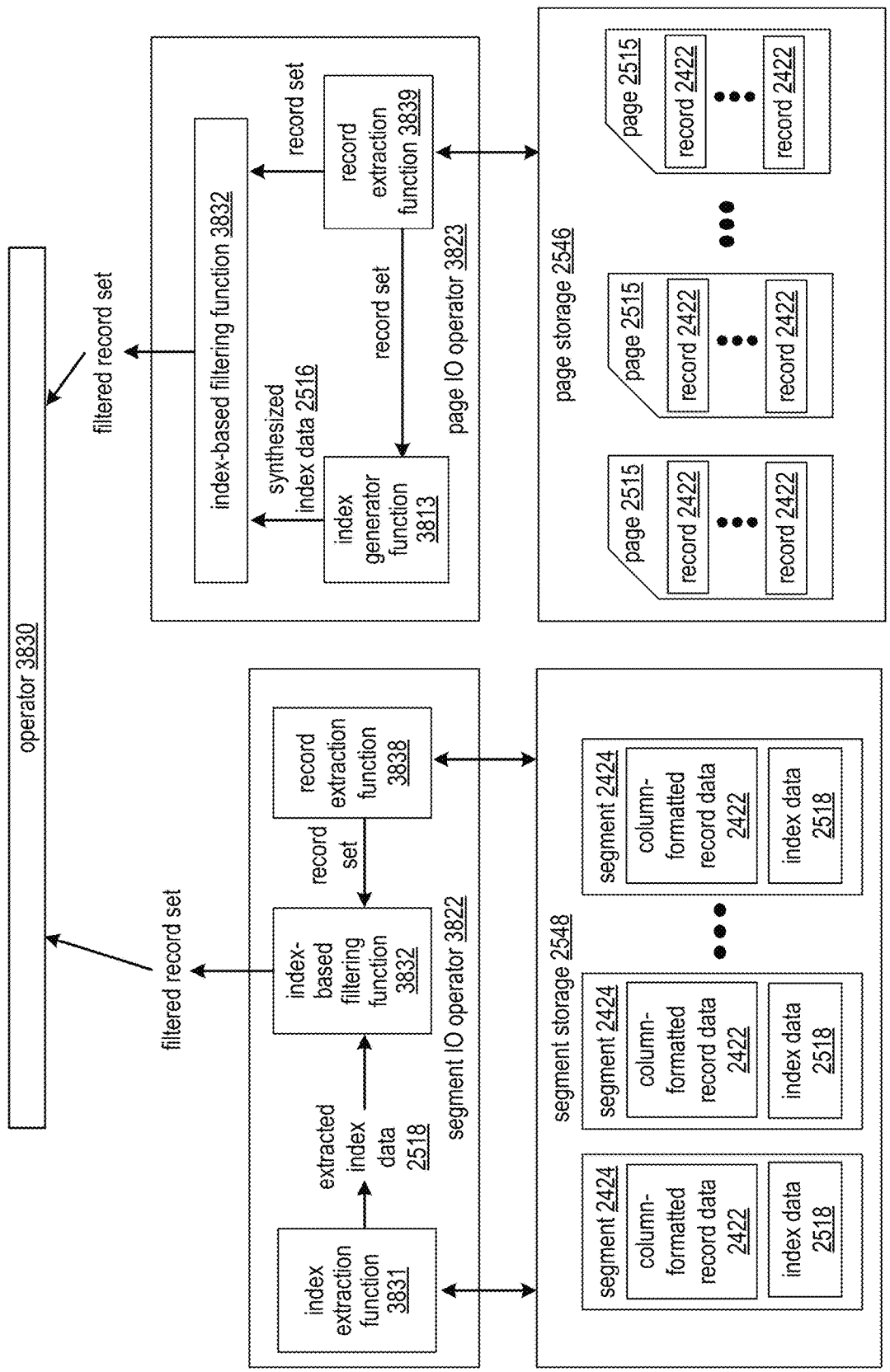
FIG. 29C is a schematic block diagram of an embodiment of a segment IO operator and a page IO implemented by a query execution module in accordance with various embodiments of the present invention.

FIG. 29C illustrates a particular example of a query execution module 2504 that implements a segment IO operator 3822 read records from segments 2424 stored in segment storage 2548 based on extracted index data, and that further implements a page IO operator 3823 read records from pages 2515 stored in page storage 2546 based on synthesized index data. For example, the segment IO operator 3822 and/or the page IO operator 3823 of FIG. 29C can be utilized to implement the segment IO operator 3822 and/or the page IO operator 3823 of FIGS. 29A and/or 29B. A first filtered record set can be outputted via execution of the segment IO operator 3822 and a second filtered record set can be outputted via execution of the page IO operator 3823 for processing via execution of a next operator 3830 in the modified operator execution flow 3818. For example, first filtered record set and the second filtered record set are processed via execution of this next operator 3830 by a query processing module 2435 of a same node 37 and/or by a query processing module 2435 of a parent node 37 that receives the first filtered record set and the second filtered record set as output data blocks generated by an IO level node 37.

As illustrated in FIG. 29C, execution of segment IO operator 3822 and page IO operator 3823 can include performing an index-based filtering function 3832. The index-based filtering function 3832 can be utilized by segment IO operator 3822 and page IO operator 3823 to ensure that the returned set of records are filtered in accordance with an index probing operation and filtering parameters. For example, the index-based filtering function 3832 corresponds to and/or is implemented as an index probing operation and/or filtering parameters identified by an optimizer of the operator flow generator module 3810 and/or indicated in the corresponding IO operator 3821.

Note that a given IO operator 3821 can have particular index-based filtering parameters, where different IO operators 3821 of the same or different queries can each have different index-based filtering parameters in conjunction with the corresponding query. The segment IO operator 3822 and page IO operator 3823 that branch in parallel and correspond to a same particular IO operator 3821 can utilize the particular index-based filtering parameters of this particular IO operator 3821 in applying the index-based filtering function 3832. The segment IO operator 3822 and page IO operator 3823 of a given IO operator 3821 can therefore apply a same index-based filtering function 3832, for example, in conjunction with same index-based filtering parameters of the given IO operator 3821.

Execution of the segment IO operator 3822 can include performing an index extraction function 3831 to return extracted index data 2518, which can correspond to the index data 2518 stored in segments 2424 as illustrated and discussed in conjunction with FIG. 25A. For example, this index data 2518 is included in and therefore extractable from the segments 2424 based on having been generated via the index generator 2513 implemented by index generator module 2640 during a conversion process of conversion page set 2655 into segments as illustrated and discussed in conjunction with FIG. 26A. The extracted index data 2518 can be utilized in conjunction with filtering parameters and/or an index probing operation of the segment IO operator 3822 based on being included in the corresponding IO operator 3821.

Execution of the segment IO operator 3822 can include performing a record extraction function 3838 to read some or all records from segments 2424. For example, the records read from segments 2424 can be determined based on data ownership information indicating a set of records assigned to be read from segments by the given node, as discussed in conjunction with FIGS. 30A-30E. The record extraction function 3838 can be implemented by utilizing the record extraction module 2438 of FIG. 24C. Note that performing the index extraction function 3831 can include reading the index data 2518 from a set of segments 2424 in a same or similar fashion as reading of records from this same set of segments 2424 via record extraction function 3831. In some cases, while the record extraction function 3838 and index extraction function 3831 the records and index data are read via a single read module and/or same set of reads to a set of segments 2424.

The performance of the index-based filtering function 3832 in executing the segment IO operator 3822 results in a first filtered record set outputted via the execution of segment IO operator 3822. In particular, the first filtered record set outputted via the execution of segment IO operator 3822 is filtered in accordance with extracted index data 2518 extracted from corresponding segments 2424 via performance of the index extraction function 3831 in execution of segment IO operator 3822.

This first filtered record set corresponds to only records in segments 2424 read via execution of the segment IO operator 3822 that meet the corresponding index-based filtering parameters based on applying the index-based filtering function 3832. For example, only a subset of a full record set read via the record extraction function 3838 are outputted based on identifying that records in this subset meet the index-based filtering parameters based on extracted index data 2518. Alternatively, the record extraction function 3838 can utilize the index-based filtering parameters to read only records from segments 2424 based on the extracted index data 2518, for example, based on being determining and/or receiving the index-based filtering parameters from the index-based filtering function 3832 and/or based on being determining and/or receiving the index-based filtering parameters from the index extraction function 3831.

Execution of the page IO operator 3823 can include performing a record extraction function 3839 to read some or all records from pages 2515. For example, the records read from pages 2515 can be determined based on data ownership information indicating a set of records assigned to be read from pages by the given node, as discussed in conjunction with FIGS. 30A-30E. In addition to these records being filtered and returned via index-based filtering function 3832, synthesized index data 2516 must first be generated based on this extracted set of records.

Execution of the page IO operator 3823 can include performing an index generator function 3813 to return synthesized index data 2516. The record set extracted via record extraction function 3839 can be utilized by the index generator function 3813 to generate the synthesized index data 2516. For example, the synthesized index data 2516 is generated based on the values of one or more fields in these extracted records such as a cluster key value of these extracted records, and/or is based on their corresponding location and/or structure in a corresponding page 2515.

The index data 2516 synthesized for pages 2515 via index generator function 3813 can be the same as, can be similar to, and/or can include the same index information as index data 2518 extracted from segments 2424 by index extraction function 3831. In some cases, the synthesized index data 2516 corresponds to index data for only a portion of a page and/or a subset of a set of pages, for example, based on only the portion of a page and/or the subset of the set of pages being required to be read in execution of the page IO operator 3823.

The synthesized index data 2516 can be processed in performance of the index filtering function 3832 via execution of the page IO operator 3823 in a same or similar fashion as processing of extracted index data 2518 by the segment IO operator 3822. The synthesized index data 2516 can otherwise render filtering of records read from pages 2515 via the same index-based filtering parameters as filtering of records read from segments 2424 via segment IO operator 3822 to ensure that no further filtering is required by subsequent operators, as such filtering operators may be absent due to an optimizer of the operator flow generator module 3810 including the filtering parameters in the corresponding IO operator 3821. This ensures query correctness by guaranteeing that records are read and filtered from pages in a same fashion as records being records that are read and filtered from segments.

In some cases, the index generator function 3813 can be implemented utilizing some or all of the functionality of index generator 2513 of FIG. 28B to generate the index data 2516 for pages 2515. In particular, the index generator 2513 of FIG. 25B can be implemented by performing index generator function 3813 via execution of page IO operator 3823 by query execution module 2504 as illustrated in FIG. 29C. As a particular example, the index generator 2513 of FIG. 25B can be implemented by performing index generator function 3813 via execution of page IO operator 3823 by a query processing module 2435 of a node 37 as illustrated in FIG. 29B.

In some cases, the index generator function 3813 is only performed for pages 2515 that do not already have index data 2516 that was previously generated and stored in conjunction with the corresponding pages 2515 via the index generator 2513 and/or via an execution of index generator function 3813 via a previous execution of a page IO operator 3823 in conjunction with execution of a previous query. Such embodiments where synthesized index data 2516 is stored for future use to prevent the need to regenerate index data 2516 for pages 2515 is discussed in further detail in conjunction with FIG. 29D.

The performance of the index-based filtering function 3832 in executing the page IO operator 3823 results in a second filtered record set outputted via the execution of page IO operator 3823. In particular, the second filtered record set outputted via the execution of page IO operator 3823 is filtered in accordance with synthesized index data 2516 generated for corresponding pages 2515 via performance of the index generator function 3813 in execution of page IO operator 3823.

This second filtered record set corresponds to only records in pages 2515 read via execution of the page IO operator 3823 that meet the corresponding index-based filtering parameters based on applying the index-based filtering function 3832. For example, only a subset of a full record set read via the record extraction function 3831 are outputted based on identifying that records in this subset meet the index-based filtering parameters based on synthesized index data 2516. Alternatively, the record extraction function 3839 can utilize the index-based filtering parameters to read only records from pages 2515 based on the synthesized index data 2516, for example, based on being determining and/or receiving the index-based filtering parameters from the index-based filtering function 3832 and/or based on being determining and/or receiving the index-based filtering parameters from the index generator function 3813.

Figure 29D:
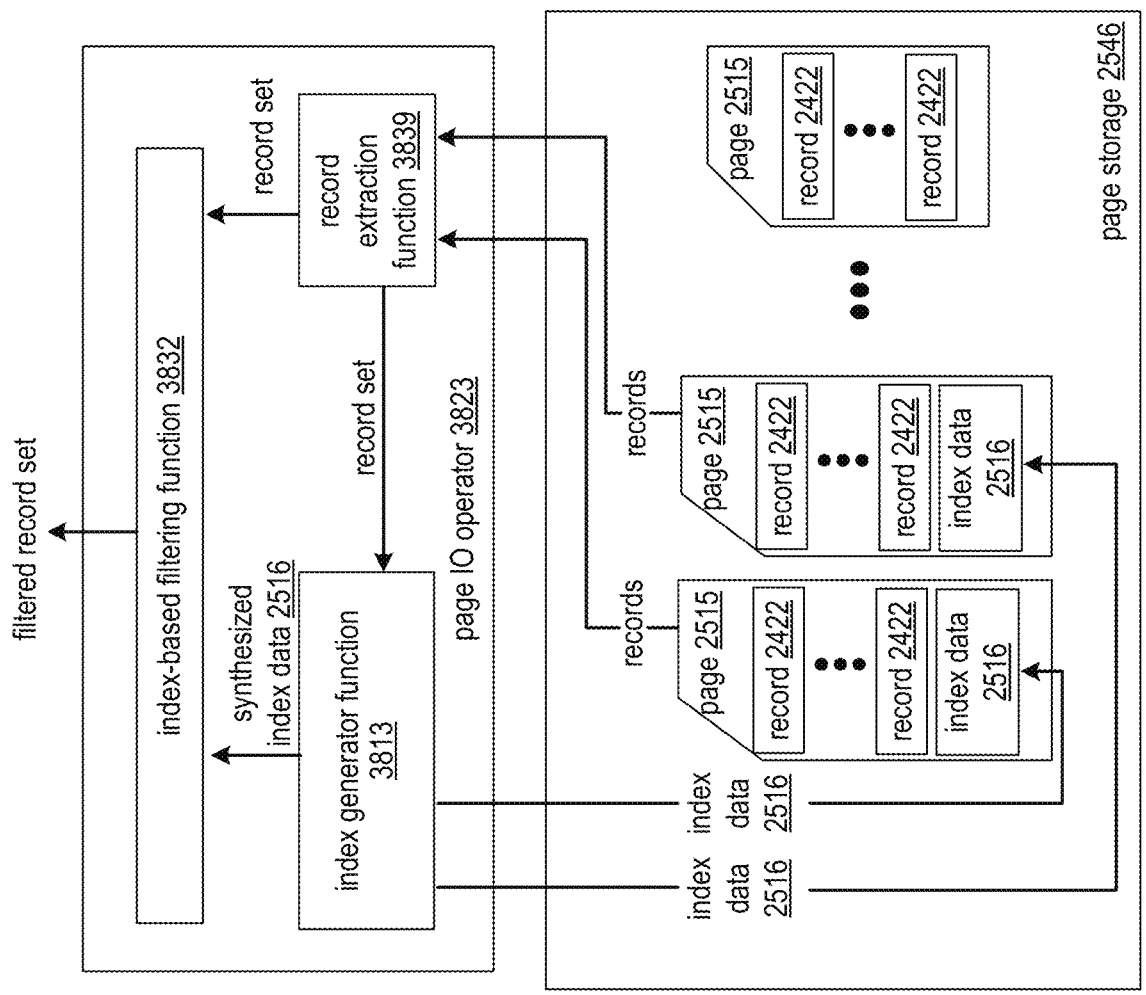
FIG. 29D is a logic diagram illustrating a method of facilitating query execution by implementing a page IO operator and a segment IO operator in accordance with various embodiments of the present invention.

FIG. 29D illustrates an embodiment of a query execution module 2504 where index data 2516 generated via index generator function 3813 in execution of a page IO operator 3823 for a given query can be stored in page storage 2546 for use in subsequent queries. For example, the index data 2516 is included in page metadata stored in and/or mapped to corresponding pages 2515 in page storage 2546. In execution of future queries requiring reads to these pages, this stored index data 2516 can be extracted and/or otherwise read from these pages 2515 rather than being resynthesized. For example, the previously generated index data 2516 can be extracted and/or utilized in a same or similar fashion as extracted index data 2518 by the segment IO operator 3822. The query execution module 2504 of FIG. 29D can be utilized to implement the query execution module 2504 of FIG. 29A, FIG. 29B, FIG. 29C, and/or any other embodiment of the query execution module 2504 discussed herein.

Figure 29E:
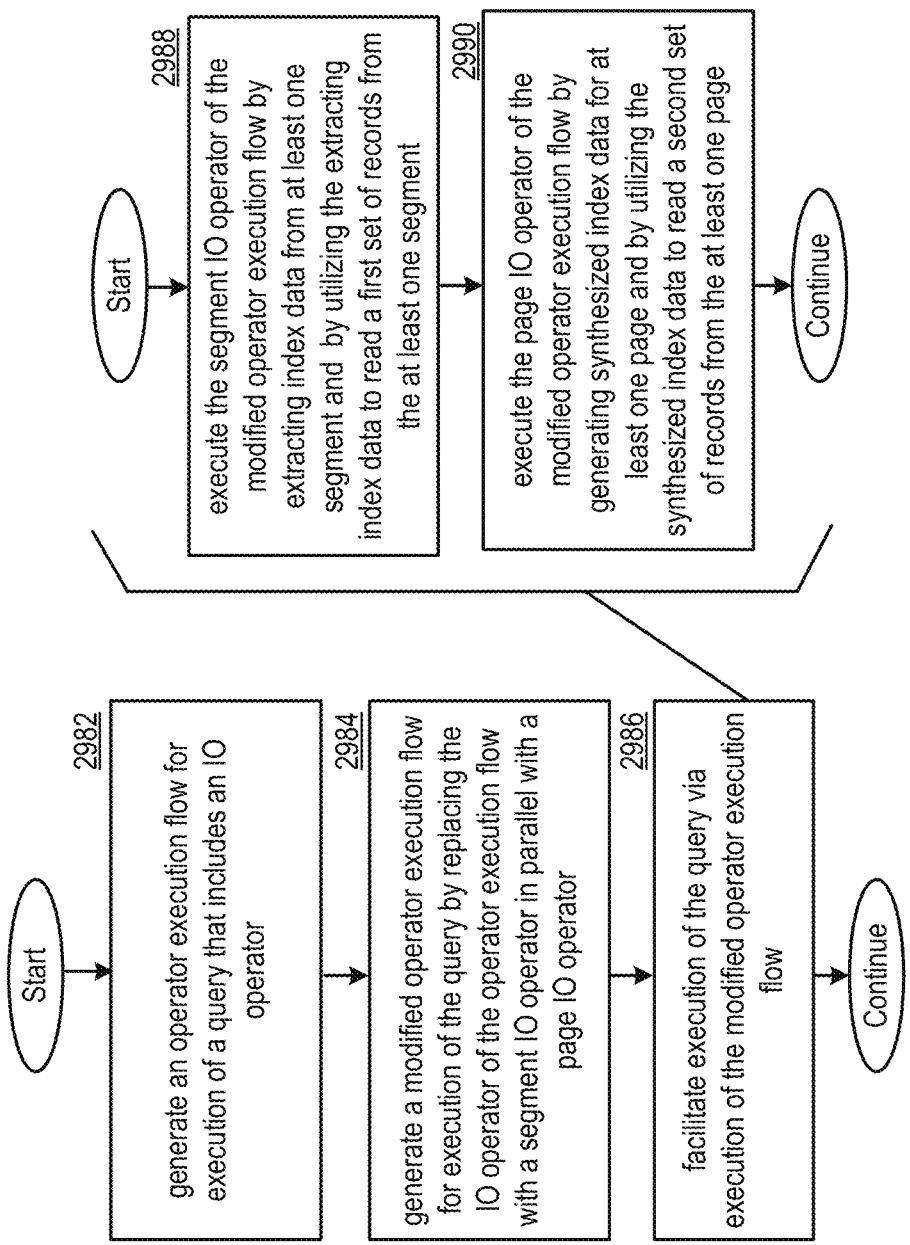
FIG. 29E is a logic diagram illustrating a method of facilitating query execution by implementing a page IO operator and a segment IO operator in accordance with various embodiments of the present invention.

FIG. 29E illustrates a method for execution by a query processing system 2502. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29E Some or all of the method of FIG. 29E can be performed by the query processing system 2502 of FIG. 25A, for example, by utilizing the query execution plan generator module 2503 and/or the query execution module 2504. As a particular example, some or all of the method of FIG. 29E can be performed by one or more nodes 37 participating in a query execution plan 2405 of FIG. 24A executed via the query execution module 2504 of FIG. 25A. Some or all of the method of FIG. 29E can be performed by the query execution plan generator module 2503 of FIG. 29A, for example, by utilizing the operator flow generator module 3810 and/or the IO operator branching module 3820. Some or all of the steps of FIG. 29E can be performed by the query processing module 2435 of one or more nodes 37 participating at IO level 2416 of a query execution plan 2405. Some or all of the steps of FIG. 29E can be performed via execution of the segment IO operator 3822 of FIGS. 29A-29C and/or via execution of the page IO operator 3823 of FIGS. 29A-29D. Some or all of the steps of FIG. 29E can optionally be performed by any other processing module of the database system 10. Some or all of the steps of FIG. 29E can be performed to implement some or all of the functionality of the query processing system 2502 of FIG. 25A. Some or all steps of FIG. 29E can be performed by database system 10 in accordance with other embodiments of the database system 10 and/or nodes 37 discussed herein.

Step 2982 includes generating an operator execution flow for execution of a query that includes an IO operator, for example, by utilizing the operator execution flow generator module 3810. Step 2984 includes generate modified operator execution flow for execution of the query by replacing the IO operator of the operator execution flow with a segment IO operator in parallel with a page IO operator, for example, by utilizing the IO operator branching module 3820. Step 2986 includes facilitating execution of the query via execution of the modified operator execution flow, for example, by utilizing the query execution module 2504.

Performing step 2986 can include performing step 2988 and/or step 2990. For example, steps 2988 and/or 2990 are performed by utilizing query processing modules 2435 of one or more nodes 37 participating at an IO level 2416 of a query execution plan 2405 implemented to execute the query via query execution module 2504. Step 2988 includes executing the segment IO operator of the modified operator execution flow. This can include extracting index data from at least one segment and/or can include utilizing the extracting index data to read a first set of records from the at least one segment. Step 2990 includes executing the page IO operator of the modified operator execution flow. This can include generating synthesized index data for at least one page and/or can include utilizing the synthesized index data to read a second set of records from the at least one page.

FIGS. 30A-30E illustrate embodiments of a database system 10 that utilizes data ownership information to enable atomic page and segment swaps. Some or all features and/or functionality of embodiments of database system 10 illustrated and discussed in conjunction with FIGS. 30A-30E can be utilized to implement the database system 10 of FIG. 25A, of FIG. 25B, and/or any other embodiment of database system 10 discussed herein.

At the period of time after segments are generated from pages and prior to the corresponding pages being removed from storage, record will be stored and available for use in query execution on both a segment and a page as discussed previously. To ensure query correctness, each record required by the query must be read and used exactly once, via access to either the page or to the segment. This can be accomplished via ownership sequence numbers (OSNs) assigned to incoming queries, where each OSN has corresponding data ownership information determined via consensus protocol mediated across a plurality of nodes. The data ownership information for a given OSN can indicate each record stored across the plurality of nodes be accessed from either a page or a segment, but not both, even if the record is included in both a page and a segment stored at a given time. The data ownership information for a given OSN can further indicate exactly one node assigned to access each given record via either page access or segment access, even if the record is accessible via multiple nodes. When a set of segments are generated from a set of pages, a new consensus protocol can be performed to swap the set of pages for the set of segments in updated data ownership information with a new OSN, and this set of segments can be read rather than this set of pages for new queries tagged with a corresponding new OSN. This improves the technology of database systems by guaranteeing query correctness via ensuring that all records are accessed exactly once in query executions, while enabling records to be included in both pages and segments as required in periods of time after segments are generated from pages and prior to deletion of converted pages.

In some cases, the data ownership information and corresponding OSNs tagged to queries can further be utilized to prevent duplicated or missing rows in failure scenarios during query execution to ensure that all records will be read exactly once. For example, the data ownership information can alternatively or additionally indicate whether each given record will be read directly from storage via a page or segment or will be reconstructed from other segments retrieved from other nodes as illustrated and discussed in conjunction with FIG. 24D. As another example, the data ownership information can alternatively or additionally indicate a particular one of a plurality of page replicas, generated and stored via page storage system 2506 for the purposes of redundancy, from which a given record will be read.

Further details regarding generating data ownership information over time via executions of consensus protocol mediated across a plurality of nodes and further details regarding utilizing OSNs tagged to queries to ensure each record is read and utilized in query executions exactly once, including several optional functions and features, are disclosed in pending application Ser. No. 16/778,194, entitled SERVICING CONCURRENT QUERIES VIA VIRTUAL SEGMENT RECOVERY, filed on Jan. 31, 2020, the contents of which are incorporated herein in their entirety by reference thereto.

Figure 30A:
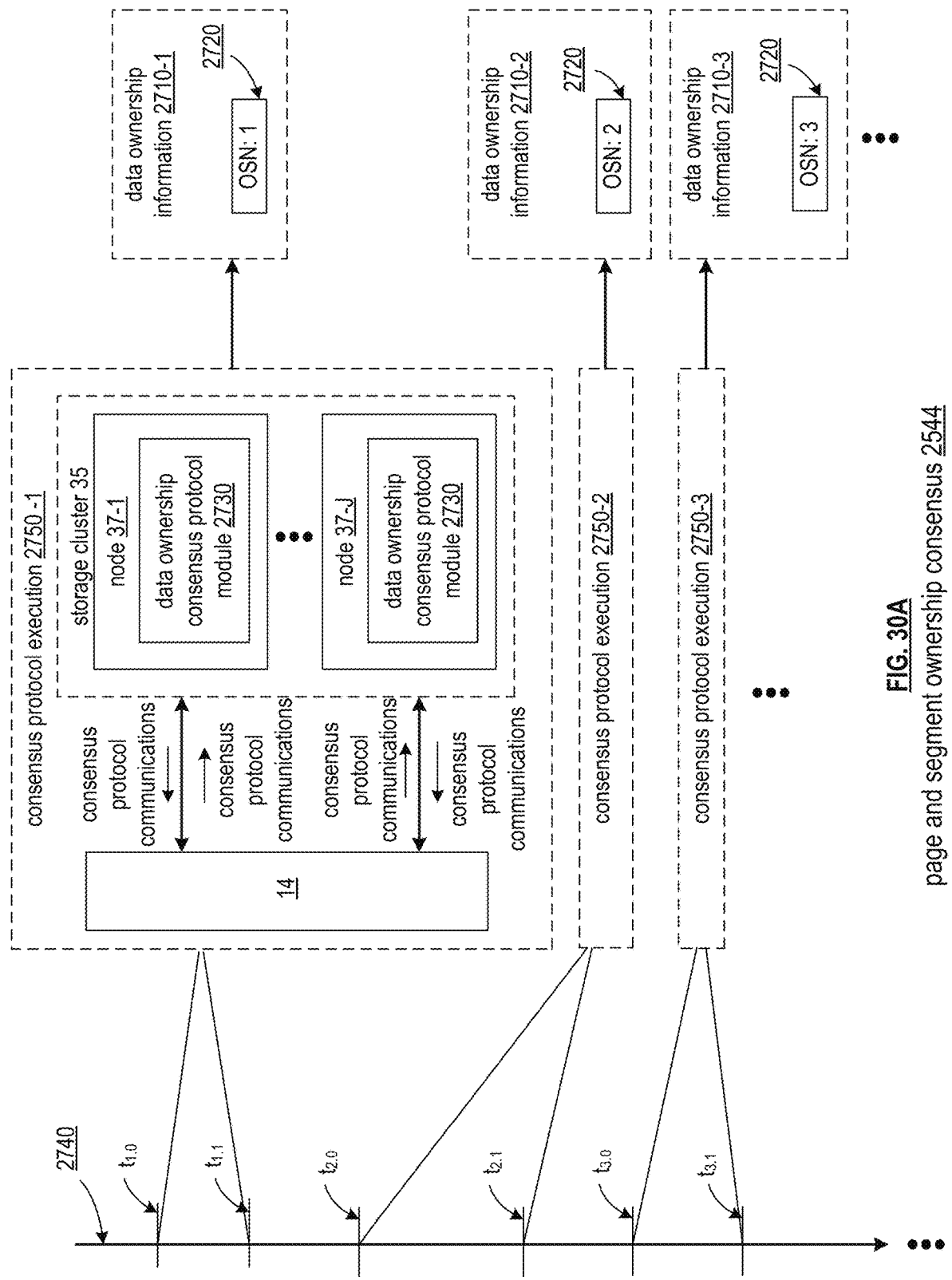
FIG. 30A illustrates an example timeline of consensus protocol executions performed via a page and segment ownership consensus implemented by a record processing and storage system to generate data ownership information in accordance with various embodiments of the present invention.

FIG. 30A illustrates an example page and segment ownership consensus 2544 over time. A plurality of consensus protocol executions 2750 can be performed via a plurality of nodes 37-1-37-J over time to generate a corresponding plurality of versions of data ownership information 2710. Some or all features and/or functionality of the page and segment ownership consensus 2544 of FIG. 30A can be utilized to implement the page and segment ownership consensus 2544 of FIG. 25B.

Rather than necessitating global coordination and/or single entity responsible for assignment and sharing of data ownership information as new versions are generated over time, each new version of the data ownership information of a particular storage cluster 35 can be generated via a consensus protocol, which can be executed by some or all nodes 37 in a storage cluster participating in the consensus protocol, where the shared state mediated via the consensus protocol indicates the most updated ownership information. This mechanism improves database systems by guaranteeing consistency of data ownership information across nodes for usage in queries while not requiring global coordination.

This plurality of nodes 37-1-37-J can correspond to a set of nodes in a same storage cluster 35 as illustrated in FIG. 30A, where different storage clusters 35 can separately mediate their own consensus protocol executions 2750. This plurality of nodes can alternatively or additionally correspond to a set of nodes utilized to implement the long term storage 2540-1-2540-J of FIG. 25B. This plurality of nodes can alternatively or additionally correspond to a set of nodes utilized to implement the stream loader modules 2510-1-2510-N of FIG. 25B. This plurality of nodes can alternatively or additionally correspond to a set of nodes utilized to implement the some or all of page storage system 2506 of FIG. 25A and/or utilized to implement the some or all of segment storage system 2508 of FIG. 25A. This plurality of nodes can alternatively or additionally correspond to a set of nodes utilized to access records in conjunction with query executions, such as some or all nodes 37 at IO level 2416 of a query execution plans 2405 implemented by a query execution module 2504 of query processing system 2502. This plurality of nodes can alternatively or additionally include a set of nodes that to access pages and/or segments from their own segment storage 2548 and/or page storage 2546, for example, as illustrated and discussed in conjunction with FIG. 25E and/or as illustrated and discussed in conjunction with FIGS. 29B-29D.

As illustrated by timeline 2740, a first consensus protocol execution 2750-1 can be mediated across nodes in the storage cluster during timespan $t_{1.0}$-$t_{1.1}$ to generate a corresponding first version of data ownership information 2710-1. For example, the first consensus protocol execution 2750-1 can be initiated at time $t_{1.0}$ by one or more nodes in the storage cluster 35, and the first consensus protocol execution 2750-1 can be completed, for example, where some or all nodes in the storage cluster have determined and/or can access the resulting data ownership information 2710-1, at $t_{1,1}$. At some time after $t_{1,1}$, or perhaps instead at some time before the first the first consensus protocol execution 2750-1 is complete but after the first consensus protocol execution 2750-1 is initiated, a second consensus protocol execution 2750-2 can be mediated across the nodes in the storage cluster 35 to generate to generate a corresponding second version of data ownership information 2710-2 during timespan $t_{2,0}$-$t_{2,1}$. Similarly, a third consensus protocol execution 2750-3 can be mediated across the nodes in the storage cluster 35 to generate to generate a corresponding third version of data ownership information 2710-3 during timespan $t_{3,0}$-$t_{3,1}$, and this process can continue over time where consensus protocol executions 2750 are performed to generate corresponding data ownership information 2710 over time. Data ownership information 2710-1, 2710-2, and 2710-3 are tagged with their respective OSNs 2720 with values of 1, 2, and 3, respectively, or otherwise indicating the ordering of the revision with respect to the other revisions.

As discussed herein, consider the times $t_{1,1}$, $t_{2,1}$, $t_{3,1}, \ldots, t_{i,1}$ of timeline 2740 as the times where the resulting corresponding versions of data ownership information 2710-1, 2710-2, 2710-3, ... 2710-$i$, respectively, are available for utilization by the nodes 37 in the storage cluster for query execution as a result of consensus protocol executions 2750-1, 2750-2, 2750-3, ..., 2750-$i$ being completed across the set of nodes in the storage cluster 35, where i is any ith iteration of executing the consensus protocol to generate a corresponding ith version of the data ownership information 2710. The OSN for any ith version of the data ownership information can be tagged with a respective OSN 2720 indicating that the version is the ith version in the ordering, for example, where the value of the OSN 2720 is equal to or otherwise indicates the value of i.

As illustrated in FIG. 30A, the consensus protocol can be executed via consensus protocol communications generated by nodes 37 and/or received and processed by nodes 37. For example, each node can implement a data ownership consensus module 2730, for example, by utilizing at least one processing module of the node. The data ownership consensus module 2730 can be utilized by each corresponding node 37 to generate consensus protocol communications in accordance with the storage cluster's execution of the current consensus protocol for transmission to one or more other nodes in the storage cluster in accordance with the storage cluster's execution of the current consensus protocol, for example, via system communication resources 14. The data ownership consensus module 2730 can be utilized by each corresponding node 37 to receive and/or process consensus protocol communications, generated by other nodes in the storage cluster 35 in accordance with the storage cluster's execution of the current consensus protocol. The consensus protocol can be a leader-mediated consensus protocol. Execution of the consensus protocol can include election or other determination of a leader by one or more nodes, voting by one or more nodes, and/or ultimately arriving at a consensus based on the voting by the one or more nodes to generate and/or communicate the resulting data ownership information.

One or more nodes can initiate a revision of the data ownership information 2710 by initiating a new execution of the consensus protocol, for example, in response to determining a changed data storage condition such as: a conversion process of converting a conversion page set 2655 into a plurality of segments completing: a segment having been generated from at least one page 2515 and/or having been stored in segment storage system 2508: a page 2515 being generated and stored in page storage system 2506 from records received in at least one record stream: a page 2515 being replicated for storage in multiple locations of page storage system 2506 for purposes of failure tolerance: a page 2515 being deleted from page storage system 2506 based on having been converted into a segment: drive outage: a full rebuild of data being completed: a migration being initiated or completed: current or scheduled upcoming data unavailability: and/or another change. Alternatively or in addition, new executions of the consensus protocol to generate revised data ownership information 2710 can occur at scheduled and/or predetermined times.

Because data ownership information is local only to a particular storage cluster 35, each storage cluster of a small number of nodes can execute the consensus protocol amongst themselves, rather than requiring consensus or other coordination across all nodes in the database system. Each of the storage clusters in the plurality of storage clusters 35-1-35-$z$ can independently generate their own iterative revisions of their own data ownership information over time in their own timeline 2740, where at any given point in time, different storage clusters may have independently generated a different number of revisions of their data ownership information. This improves database systems by ensuring that the execution of the consensus protocol remains scalable, where only local coordination is required to determine data ownership information, while ensuring that all segments across different storage clusters 35 has consistent ownership information.

As revised data ownership information is determined by particular nodes over time, most recent versions of the data ownership information 2710 can be implemented to execute incoming queries. However, if the node were to immediately adopt the most recent data ownership information in executing queries, queries could be processed improperly. In particular, as an individual node executes a query over a span of time, if the node changes its segment set determined for the query based on a more recent versions of the data ownership information 2710 mid-execution, some segments needed for execution of the query across all nodes can be missed and/or duplicated. Furthermore, multiple nodes can be executing the same query within slightly different time spans, for example, in accordance with a corresponding query execution plan 2405. Alternatively or in addition, the most recent data ownership information can be received and/or determined by the different nodes at slightly different times. As global coordination is not utilized and as nodes independently execute queries via the segments they determine to own, a mechanism to ensure all nodes execute each given query with the same data ownership information is required.

FIGS. 30B-30E illustrate an example of an embodiment of the present invention where nodes in a storage cluster utilize OSNs 2720 tagged to and/or determined for each query to determine which corresponding one of a plurality of data ownership information versions generated via the storage cluster's execution of the consensus protocol over time will be utilized to determine the corresponding set of records to be read for each query and/or to further determine whether each record in the set of records is to be read from a page 2515 or from a segment 2424.

Figure 30B:
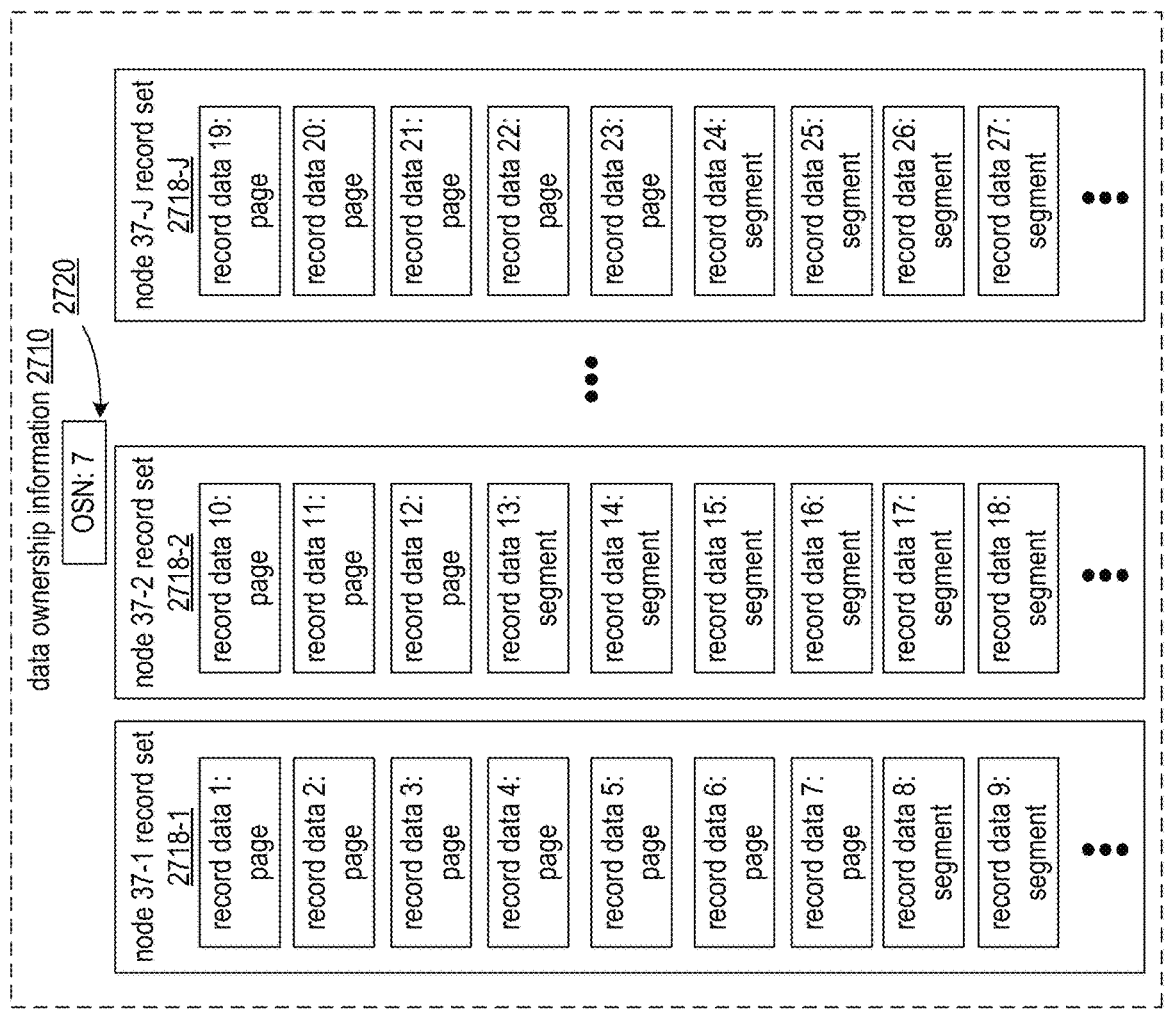
FIG. 30B illustrates an example embodiment of data ownership information in accordance with various embodiments of the present invention.

FIG. 30B presents an example of data ownership information 2710 mediated via the page and segment ownership consensus 2544, for example, as illustrated in FIG. 30A. This data ownership information 2710 is tagged with an OSN 2720 of 7, for example, based on being the seventh version of the data ownership information 2710. The OSN can increment with each corresponding updated version of the data ownership information 2710 over time. Alternatively, the OSN can be any unique identifier that distinguishes the corresponding version of data ownership information 2710 from other versions.

The data ownership information 2710 can indicate record sets 2718 for each of the plurality of nodes 37-1-37-J that mediated the corresponding consensus protocol to generate the corresponding data ownership information 2710. Each record set 2718 can indicate a set of record data assigned for access to the corresponding node in performing query executions, for example, in conjunction with participating in a query execution plan 2405 based on query execution plan data 3941. For example, a node 37 at IO level 2416 will utilize read all of its assigned records as indicated by its record set 2718, will read all of the assigned records as indicated by its record set 2718 in a table of the given query and/or applicable to the given query, and/or will read all assigned records as indicated by its record set 2718 that meet index-based filtering parameters as discussed in conjunction with FIGS. 29A-29D.

Each record set 2718 can further indicate whether each record data be read from a corresponding page or from a corresponding segment. Identifiers of the corresponding pages and/or segments, index information, offset data, memory pointers, and/or other location information can optionally be included to identify where the corresponding record is stored in either a segment or page. Alternatively, a node can read all records from a given page and/or segment in performing an IO operator and can filter out and/or skip over records that are not identified in its record set 2718. In some cases, a node's record set 2718 optionally includes only pages that are accessible from its own page storage 2546 and/or that are accessible from its own segment storage 2548. In some cases, some records in a record set 2718 can be denoted to be recovered by the node, rather than being read directly from a stored page or segment, via retrieval of other segments in the same segment group as illustrated and discussed in conjunction with FIG. 25D.

Each record data in a record set 2718 can correspond to a single record 2422 and/or a set of multiple records. For example, record data can optionally encompass and/or indicate some or all records in a given page 2515 and/or some or all records in a given segment 2424. Each record data can include identifying information distinguishing the corresponding one or more records 2422 and/or indicating their location in a corresponding page 2515 or segment 2424. The record data is numerically identified in FIG. 30B to distinguish different record data in this example for the purposes of illustration.

In this example, node 37-1 has an assigned record set 2718-1 that includes record data 1, 2, 3, 4, 5, 6, 7, 8, and 9. Record data 1, 2, 3, 4, 5, 6, and 7 are denoted to be read by node 37-1 from pages 2515, while record data 8 and 9 is denoted to be read from segments 2424. Node 37-2 has an assigned record set 2718-1 that includes record data 10, 11, 12, 13, 14, 15, 16, 17, and 18. Record data 10, 11, 12 is denoted to be read from pages 2515, while record data 13, 14, 15, 16, and 17 are denoted to be read from segments 2424. Node 37-J has an assigned record set 2718-J that includes an record data 19, 20, 21, 22, 23, 24, 25, 26, and 27. Record data 19, 20, 21, 22, 23 are denoted to be read from pages 2515, while record data 24, 25, 26, and 27 are denoted to be read from segments 2424. Note that some record data in one or more record sets 2718-1-2718-J may have been stored on multiple nodes and/or may have been stored in both a page and a segment when the corresponding data ownership information 2710 was generated. Note that some record data in one or more record sets 2718-1-2718-J may no longer be available for access by the assigned node in the denoted data format at a time after the data ownership information 2710 was generated based on storage changes such as conversion of pages into segments, deletion of converted pages, scheduled outages, memory failures, and/or other changes.

The data ownership information 2710 can indicate, in exactly one node record set 2718, each one of the full set of records stored by the corresponding storage cluster 35, such as the full set of records that are stored by the storage cluster and/or the full set of records the corresponding storage cluster is responsible for. Thus, the plurality of node record sets 2718 of a storage cluster's data ownership information 2710 can be mutually exclusive and collectively exhaustive with regards to the full set of records stored by the corresponding storage cluster 35. In some cases, not all of the storage cluster's full set of records are currently stored by the storage cluster 35, for example, where they are only recoverable via reconstruction of segments due to the corresponding segments being unavailable and/or where they are not recoverable due to other failures.

Figure 30C:
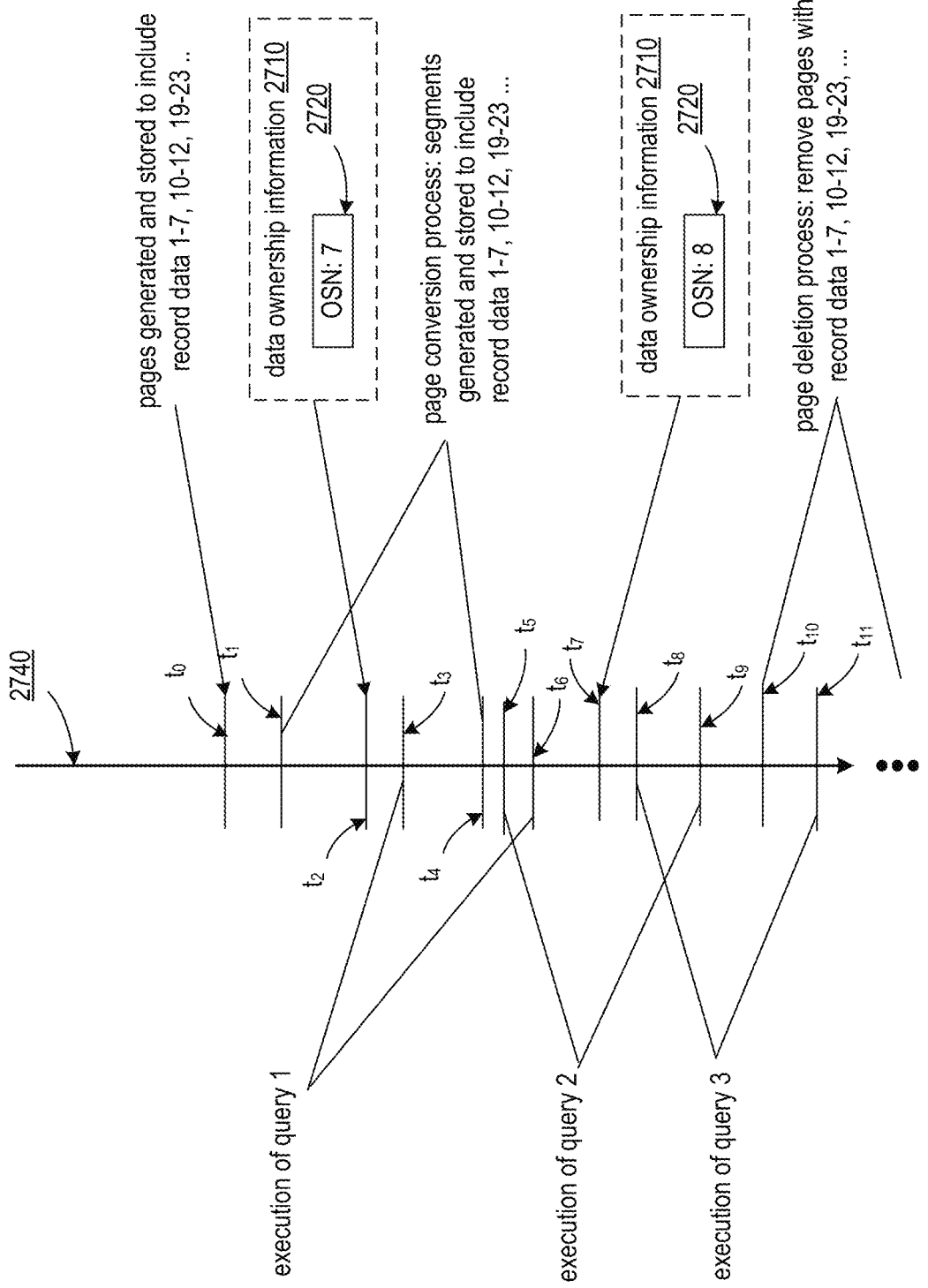
FIG. 30C illustrates an example timeline of generating data ownership information in accordance with various embodiments of the present invention.

FIG. 30C illustrates a particular example of timeline 2740 to illustrate the temporal relation between a series of events occurring at particular points in time and/or time spans $t_0$-$t_{10}$. At a point in time $t_2$, data ownership information 2710 with OSN 7 is generated. For example, the execution of the consensus protocol can be completed at time $t_2$ to render the resulting data ownership information. This data ownership information 2710 with OSN 7 can correspond to the data ownership information 2710 illustrated in FIG. 30B to continue the example presented in FIG. 30B.

This particular version of the data ownership information may have been generated in response to pages being generated and stored to include at least the record data 1-7, 10-12, and 19-23. This particular version of the data ownership information may have otherwise been generated after pages being generated and stored to include at least the record data 1-7, 10-12, and 19-23, for example, where a prior version of data ownership information with OSN 6 does not have this record data assigned to nodes for access in query executions based on not yet being received, stored in pages, and/or durably stored via one or more replicas of the page.

Timeline 2740 of FIG. 27C indicates a span of time in which a page conversion process commences to generate segments from pages 2515 that include at least the record data 1-7, 10-12, and 19-23. For example, this is initiated at time $t_1$, for example, based on determining to initiate the conversion as discussed in conjunction with FIG. 26A. The execution of the consensus protocol for the data ownership information of OSN 7 may have been initiated before or after this page conversion process commenced. However, as the page conversion process commences can be lengthy and/or because the page conversion process was not completed when the initiation of data ownership the consensus protocol for generating the data ownership information of OSN 7 occurred, the data ownership information of OSN 7 reflects that these records are available for access in pages.

Timeline 2740 also illustrates that after this page conversion process is completed, a next version of data ownership information 2710 is generated, tagged to OSN 8. For example, the execution of the consensus protocol for this next version can be completed at time $t_7$ to render the resulting data ownership information. In this example, a node of the storage cluster may have initiated this consensus protocol shortly after time ta in response to determining the page conversion process is completed and/or that the corresponding records are available for access as segments.

Figure 30D:
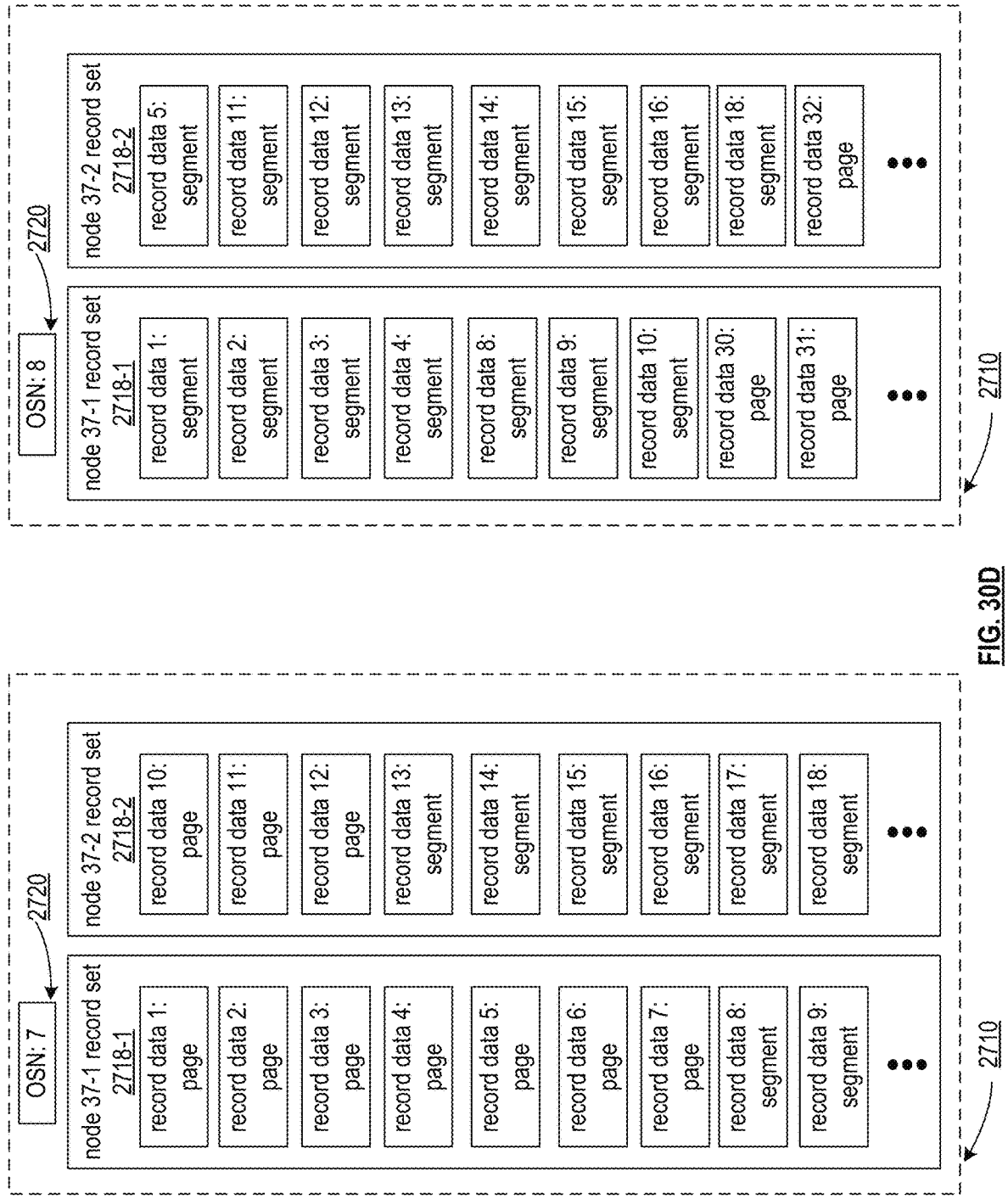
FIG. 30D illustrates an example embodiment of changes in data ownership information over time in accordance with various embodiments of the present invention.

Data ownership information 2710 of OSN 8 reflects the availability of these records in segments as by indicating assignment of some or all of these records for access in segments, changes to the data ownership information 2710 of OSN 7 of FIG. 30B to the data ownership information 2710 of OSN 8 is illustrated in FIG. 30D.

As illustrated in FIG. 30D, the data ownership information 2710 with OSN 8 indicates that record data 1, 2, 3, and 4 have been changed from assignment to node 37-1 by as pages to assignment by node 37-1 as segments based on being included in segments generated in the conversion process and/or based on these segments being stored in segment storage 2548 of node 37-1. Similarly, the data ownership information 2710 with OSN 8 record data 11 and 12 have been changed from assignment to node 37-2 by as pages to assignment by node 37-2 as segments based on being included in segments generated in the conversion process and/or based on these segments being stored in segment storage 2548 of node 37-1.

The data ownership information 2710 with OSN 8 further indicates that record data 10 has been changed from assignment to node 37-2 via a page to assignment by node 37-1 via a segment based on being included in a segment generated in the conversion process and/or based on this segment being stored in segment storage 2548 of node 37-1, for example, despite the corresponding page being stored on 37-2. Similarly, the data ownership information 2710 with OSN 8 further indicates that record data 5 has been changed from assignment to node 37-1 via a page to assignment by node 37-2 via a segment based on being included in a segment generated in the conversion process and/or based on this segment being stored in segment storage 2548 of node 37-2, for example, despite the corresponding page being stored on 37-1.

The data ownership information 2710 with OSN 8 indicates new record data 30 and 31 are assigned to node 37-1 for access via pages and further indicates new record data 32 is assigned to node 37-2 for access via a page. For example, this new data is reflected for access via pages based on these pages having been generated since the data ownership information 2710 with OSN 7 and optionally based on these pages not having been converted into segments in the conversion process prior to OSN 8.

Finally, the data ownership information 2710 with OSN 8 indicates record data 8 and 9 remain assigned to node 37-1 for access as segments, and that well the record data 11, 12, 13, 14, 15, and 16 remain assigned to node 37-2 for access as segments. For example, assignment does not change for this record data based on the location of the corresponding segments not changing and remaining available. Note that other segments may have had assignment changed to other nodes due to migration and/or may have changed to be indicated for access as a reconstructed segment due to being assigned to a node in OSN 7 that experienced an outage prior to generation of the data ownership information 2710 with OSN 8.

This example serves to illustrate how the tagging of OSNs to particular queries can ensure that, despite this timeline of changing data availability circumstances that could lead to confusion regarding which records are to be accessed as pages or segments by each node at particular times and more specifically, for different queries being executed by each node at the same time. This improves database systems by ensuring that, despite different concurrently running queries at a given time by a given node, and despite the concurrent, independent execution of each concurrently running query across multiple nodes in the storage cluster, query accuracy of every query is guaranteed because all nodes will utilize the same data ownership information for any given query, even if different ownership information is utilized at a particular time for different, corresponding concurrently running queries. Thus, different queries with different OSNs can be safely running in parallel by each of a set of multiple nodes.

As illustrated in FIG. 30C, a first query, query 1, can be executed by the storage cluster 35 from time $t_3$-$t_6$. Time $t_3$ can correspond to a time at which query 1 was received and/or at which at least one node initiated a partial execution of query 1. Time $t_6$ can correspond to a time at which execution of query 1 by all nodes in the storage cluster assigned to execute query 1 has completed. While execution spans of different nodes in the storage cluster may be different, for the purposes of this example, assume that the time frame that both particular nodes 37-1 and 37-2 executed query 1 started between $t_2$ and $t_4$ and ended between $t_5$ and $t_7$.

A second and third query can similarly be executed by the storage cluster from times $t_5$-$t_7$ and times $t_8$-$t_{11}$, respectively. Again, for purposes of this example, assume that the time frame that both particular nodes 37-1 and 37-2 executed queries 2 and 3 started and ended substantially close to these times relative to other points illustrated in the timeline 2740 of this example. Also note that as illustrated, the execution of queries 1, 2, and 3 is overlapping, to reflect the concurrent execution of multiple queries implemented by the storage cluster and to further reflect the concurrent execution of multiple queries implemented by each node 37 in the storage cluster.

Figure 30E:
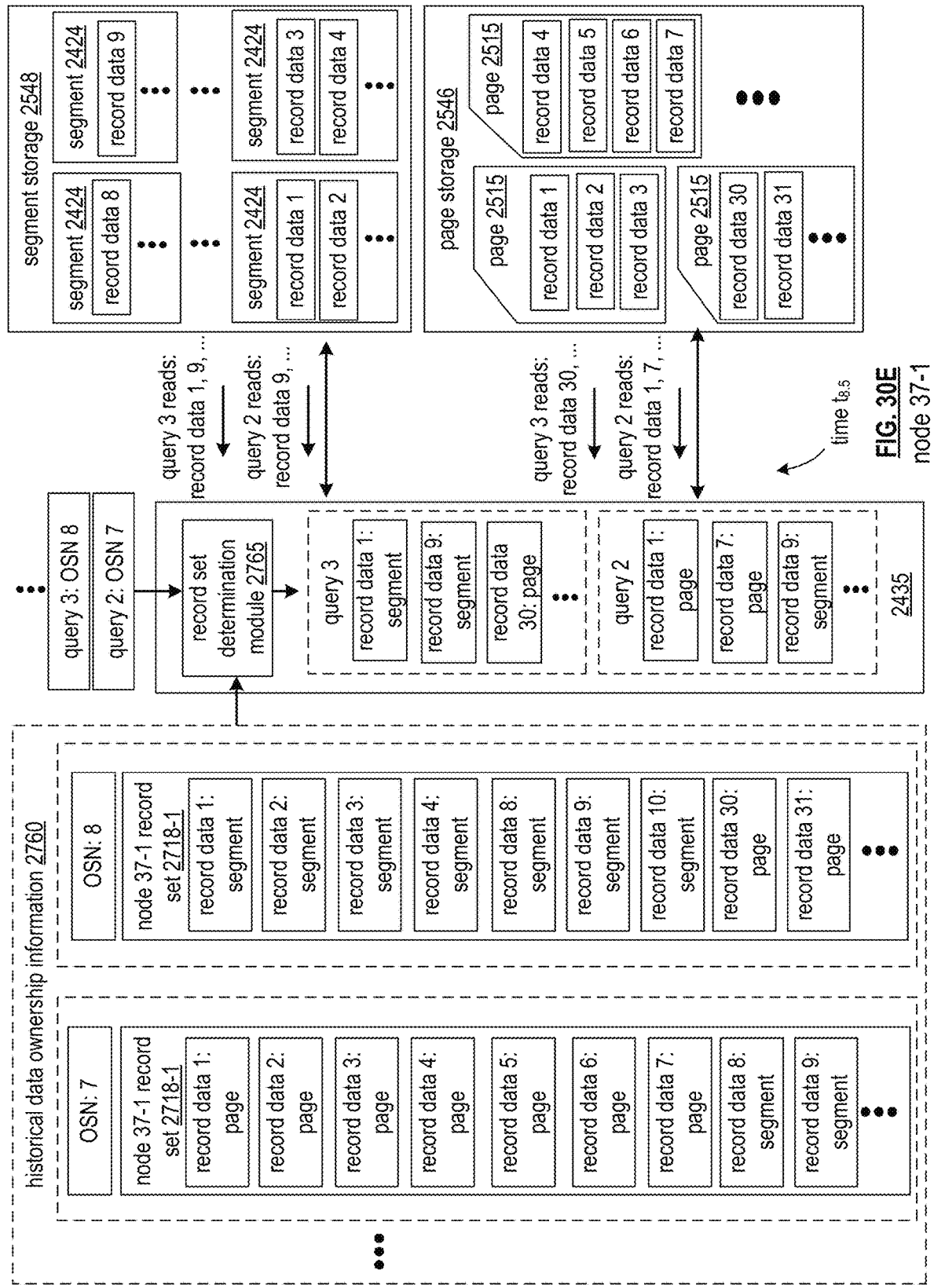
FIG. 30E is a schematic block diagram of an embodiment of a node that reads row data in conjunction with query executions based on data ownership information in accordance with various embodiments of the present invention.

The execution of these queries by node 37-1 in accordance with determined OSNs for these queries is reflected in FIG. 30E. The node 37-1 can implement a record set determination module 2765 for incoming queries to determine which records it is assigned and to further determine whether to access the assigned records as pages or segments for incoming queries based on data ownership information generated over time and based on OSNs tagged to each incoming query. The record set determination module 2765 can be by any node 37 in the database system 10 discussed herein, and functionality of node 37-1 of FIG. 30E in facilitating reads to pages and/or segments query execution can be utilized to implement the node 37 of FIG. 25E, nodes 37 at IO level 2416 of FIG. 24A, nodes 37 of FIGS. 29B-29D, and/or any other embodiments of nodes 37 that access records in query executions discussed herein.

The record set determination module 2765 can determine the record set for each incoming query based on the OSN assigned to and/or determined for each incoming query. For a given query with a corresponding tagged OSN, record set determination module 2765 can access its node record set 2718 in the data ownership information 2710 with the corresponding OSN. In particular, each node can access locally stored, retrievable, or otherwise determinable historical data ownership information 2760 that indicates a plurality of versions, such as a subset of all versions over time corresponding to the most recent versions still determined to be relevant and/or all versions historically.

While not illustrated, the historical data ownership information can be represented as a plurality of (record data, OSN) pairs for the node. The record data of the node's node record set 2718 in the data ownership information for a given OSN can be each be indicated in a corresponding set of (record data, OSN) pairs with the given OSN. In executing a query tagged with a given OSN, only record data included in (record data, OSN) pairs that reflect the corresponding OSN are utilized. Thus, the node segment set for a given OSN is derived from and/or represented as the all of record data included in the node's (record data, OSN) pairs with the given OSN.

The particular node record set 2718 in the data ownership information 2710 with the OSN tagged to an incoming query can be utilized to generate the set of records for this incoming query, and to further indicate how each record is to be accessed. In particular, the record set of this incoming query must be a subset of the node record set 2718 of the data ownership information 2710 with an OSN that matches that of the incoming query or otherwise compares favorably to the incoming query. In some cases, the record set of an incoming query is only a proper subset of the corresponding node record set 2718, for example, based on one or more nodes being determined not to be necessary to process the query and/or not being included in the query domain of the query. Filtering the node record set 2718 to generate the corresponding record set of a given query can include extracting information from the query itself to determine which particular proper subset of segments are required.

The OSN 2720 assigned to each query can be received by the node 37 in conjunction with receiving a request to execute the query and/or can be received in conjunction with the query itself, for example, where the OSN is generated by another entity of the database system 10 and/or of the corresponding storage cluster 35 and is sent to and/or accessible by all nodes executing the query in conjunction with information regarding the query for execution itself. In some cases, the OSN is included in the query execution plan data of FIG. 25A. The OSN of a given query can be alternatively determined by each node based on the query, for example, by comparing a timestamp of the query to timestamps associated with each of the plurality of versions, and selecting the most recent one of the plurality of OSN versions that has a corresponding timestamp indicating it was generated prior to the query and/or indicating it can be utilized on incoming queries after a particular point in time, such as $t_{i,1}$. The node can alternatively perform another deterministic function on a given query to determine the OSN assigned to the given query.

The mechanism utilized by a node to determine a query's OSN can be the same for all nodes in the storage cluster 35 to ensure that a given query executed by multiple nodes in the storage cluster 35 will assign a node the same OSN, thus ensuring a correct query result as each required segments will be read by a corresponding node, and as each required segment will be read by only one node.

Furthermore, if multiple storage clusters are required for execution of a query, nodes in different clusters will thus assign a given query different OSNs for corresponding different data ownership information of their storage cluster. However, despite different storage clusters being on different revisions of their data ownership data and mediating their data ownership data separately, query correctness can still be guaranteed where each required segment is read once and exactly once so long as nodes in the same storage cluster each utilize the same one of their revised data ownership information 2710 for the query, and so long as each storage cluster maintains ownership of their own fixed, full set of nodes in their set of revisions over time.

The generation of record sets for each query based on an OSN determined for the query to adhere to a corresponding version of the data ownership information ensures that a particular version of the data ownership information is used by every node in the storage cluster for execution of the query, and persists for the life of the query regardless of new versions of the data ownership information that are determined while the query is executing and/or regardless of changes in storage circumstances while the query is executing.

In particular, in this example, all nodes in the storage cluster, including nodes 37-1 and 37-2, determine to execute query 1 by utilizing the data ownership information with OSN 7, to execute query 2 by utilizing the data ownership information with OSN 7, and to execute query 3 utilizing the data ownership information with OSN 8. These determination of OSNs tagged to each query can be based on determining that the most recent OSN when each query was received and/or began executing. Queries 1 and 2 were received and/or began executing with data ownership information with OSN 7 being the most recent, as illustrated in timeline 2740 of FIG. 30C, and are tagged with OSNs accordingly. The data ownership information was updated to the data ownership information with OSN 8 prior to receiving and/or initiating execution of query 3, so query 3 can be tagged to OSN 8.

Assume in this example that queries 2 and 3 require utilization of identical records, and thus, if executed by the same node with the same OSN, would have identical record sets utilized by that node. However, in this example, each of these queries are tagged to different OSNs, and thus have records accessed differently. As illustrated in FIG. 30E, for query 2, node 37-1 performs reads of record data 1 and 7 via access to pages 2515 and performs reads to record data 9 via access to a segment 2424 based on this record data being required for the query and based on their denoted format for access in node 37-1's record set 2718 for OSN 7 in the historical data ownership information 2760. For query 3, node 37-1 performs reads of record data 30 via access to pages 2515 based on the addition of record data 30 in OSN 8. Node 37-1 performs reads of record data 1 and 9 via access to segments 2424 based on record data 9 being denoted for access as a segment rather than a page in OSN 8, despite being available for access in a page in OSN 8. Record data 7 is not accessed for query 3 based on not being indicated in the record set 2718 for node 37-1 in OSN 8, despite being available in the page accessed for query 2. For example, a different node 37 may store record data 7 in a segment generated in the conversion process, and this other node accesses record data 7 in its own execution of query 3 based on being indicated in its record set 2718 for access via a segment.

Note that as illustrated in FIG. 30C, at a time $t_{10}$, a page deletion process of the pages with record data 1-7, 10-12, and 19-23 can be initiated based on having been converted into segments. Note that this could impact the execution of query 3 for any records still denoted to be read as pages. However, in some cases, all records data converted into segments in the page conversion process completed at time ta are denoted to be read as segments in the data ownership information 2710 of OSN 8 based on having been converted into segments for long term storage and based on deletion of the corresponding pages pending due to their successful conversion. In such cases, because query 3 is tagged to OSN 8 based on being initiated after OSN 8 data ownership information was generated, query 3 will not undergo problems relating to the deletion of pages of the illustrated conversion process.

In some embodiments, for any given data ownership information 2710, all record data of any given page 2515 is all either assigned to a same node 37, or is not assigned to any nodes based on the corresponding records being designated for reading as segments. Similarly, for any given data ownership information 2710, all record data of any given segment 2424 can be all either assigned to a same node 37, or is not assigned to any nodes based on the corresponding records being designated for reading as pages. In this fashion, multiple nodes will not be assigned access to a same page, and multiple nodes will not be assigned access to a same segment. In some cases, the node that stores a given page is assigned all record data of the given page, and the node that stores a given segment is assigned all record data of the given segment. In embodiments where the record data is implemented as a full page or a full segment, this is accomplished by the record data being assigned to exactly one node.

In some embodiments, if a portion of record data included in a given page is designated to be read from a segment by a given node in the data ownership information 2710, all record data included in the given page is designated to be read from segments. Note that as illustrated in FIG. 26C, records from a given page may be included in multiple different record groups for inclusion in multiple different segments that could be stored by any one or more nodes. Therefore, for a set of records in a given page that was previously assigned to a given node in previous data ownership information, the updated ownership information can designate that the set of records from this given page are read via a plurality of segments due to being dispersed across the plurality of segments. Each of this plurality of segments can be assigned to same or different ones of a plurality of different nodes, for example, that store given ones of the plurality of segments. Similarly, as illustrated in FIG. 26C, a given segment can include records from many different pages. Therefore, for a set of records in a given segment that were previously assigned to multiple different nodes in previous data ownership information based on being included in multiple different pages, the updated ownership information can designate that the set of records are read from this given segment via a single assigned node.

Figure 30F:
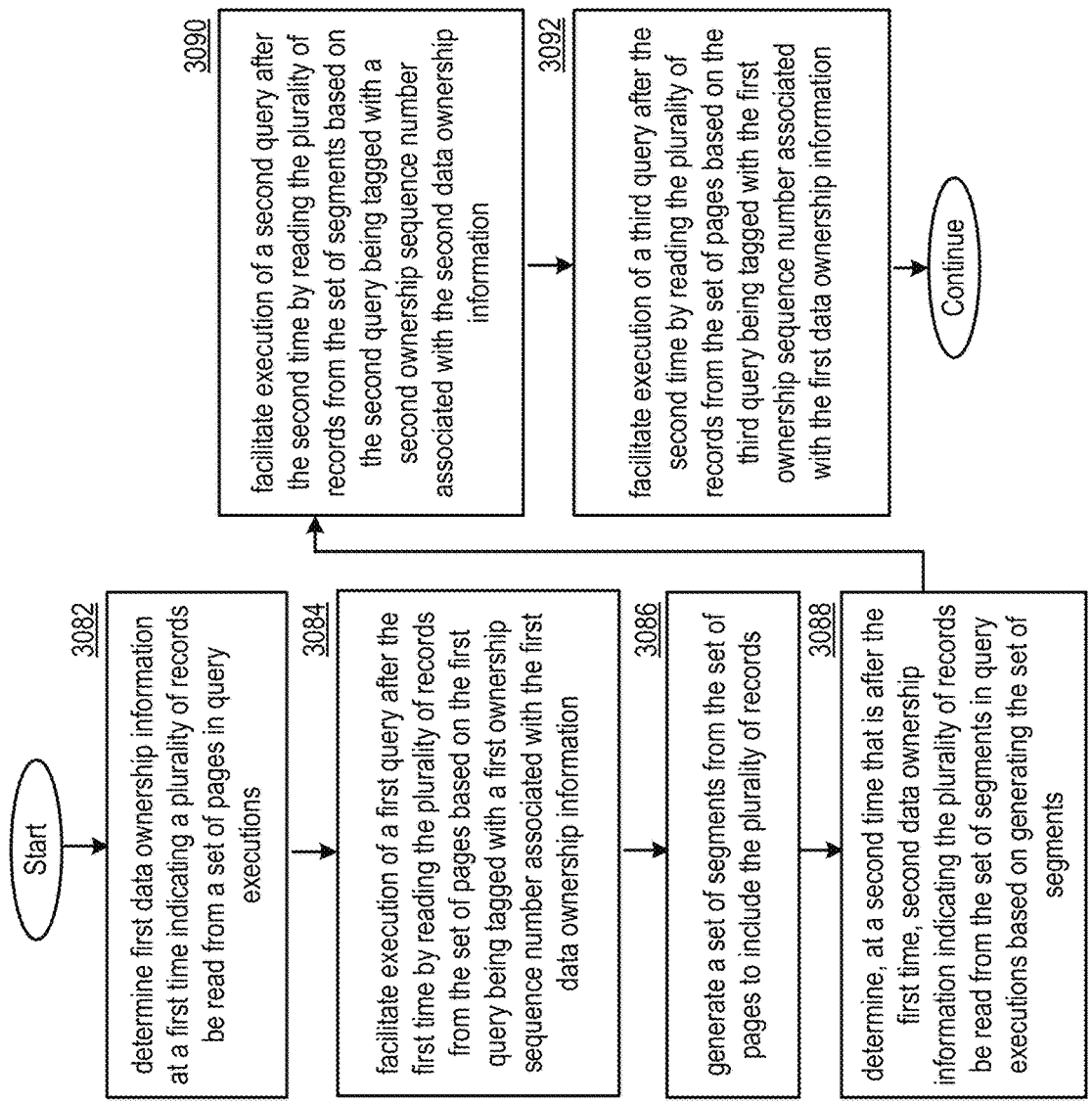
FIG. 30F is a logic diagram illustrating a method of facilitating query executions based on data ownership information in accordance with various embodiments of the present invention.

FIG. 30F illustrates a method for execution by a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30F. For example, some or all of the steps of FIG. 30F can be performed via a plurality of nodes 37 included in a same storage cluster 35. Some or all of the method of FIG. 30F can be performed via the page and segment ownership consensus of FIG. 30A, for example, by utilizing a data ownership consensus module 2730 of one or more nodes 37. Some or all of the method of FIG. 30F can be performed by a query processing module 2435 of one or more nodes 37, for example, as discussed in conjunction with FIG. 30E. Some or all of the steps of FIG. 30F can be performed by the query processing module 2435 of one or more nodes 37 participating at IO level 2416 of a query execution plan 2405. Some or all of the steps of FIG. 30F can optionally be performed by any other processing module of the database system 10. Some or all of the steps of FIG. 30F can be performed to implement some or all of the functionality of the database system of FIG. 25A. Some or all of the steps of FIG. 30F can be performed to implement some or all of the functionality described in conjunction with the page and segment ownership consensus of FIG. 25B and/or FIG. 30A. Some or all steps of FIG. 30F can be performed by database system 10 in accordance with other embodiments of the database system 10 and/or nodes 37 discussed herein.

Step 3082 includes determining first data ownership information at a first time indicating a plurality of records be read from a set of pages in query executions. For example, the first data ownership information is determined via execution of a consensus protocol via a plurality of nodes. Step 3084 includes facilitating execution of a first query after the first time by reading the plurality of records from the set of pages based on the first query being tagged with a first ownership sequence number associated with the first data ownership information. For example, the plurality of nodes each utilize the first data ownership information based on the first ownership sequence number being tagged to the first query to determine to access their assigned subset of the plurality of records indicated in the first data ownership information from their assigned subset of the set of pages.

Step 3086 includes generating a set of segments from the set of pages to include the plurality of records. For example, the set of pages are included in a conversion page set 2655 and a segment generator 2517 generates the set of segments via a conversion process performed on conversion page set 2655. Step 3088 includes determining, at a second time that is after the first time, second data ownership information indicating the plurality of records be read from the set of segments in query executions. For example, the second data ownership information is determined via execution of a consensus protocol via a plurality of nodes based on generating the set of segments and/or storage of the set of segments.

Step 3090 includes facilitating execution of a second query after the second time by reading the plurality of records from the set of segments based on the second query being tagged with a second ownership sequence number associated with the second data ownership information. For example, the plurality of nodes each utilize the second data ownership information based on the second ownership sequence number being tagged to the second query to determine to access their assigned subset of the plurality of records indicated in the second data ownership information from their assigned subset of the set of segments. The set of pages are not accessed for execution of the second query based on all of the plurality of records instead being accessed via the set of segments due to the second data ownership information being utilized.

Step 3092 includes facilitating execution of a third query after the second time by reading the plurality of records from the set of pages based on the third query being tagged with the first ownership sequence number associated with the first data ownership information. For example, the third query is tagged with the first ownership sequence number based on having been initiated prior to the second time but not being completed before the second time. The plurality of nodes each utilize the first data ownership information based on the first ownership sequence number being tagged to the third query to determine to access their assigned subset of the plurality of records indicated in the first data ownership information from their assigned subset of the set of pages. The set of segments are not accessed for execution of the third query based on all of the plurality of records instead being accessed via the set of pages due to the first data ownership information being utilized.

Figure 31B:
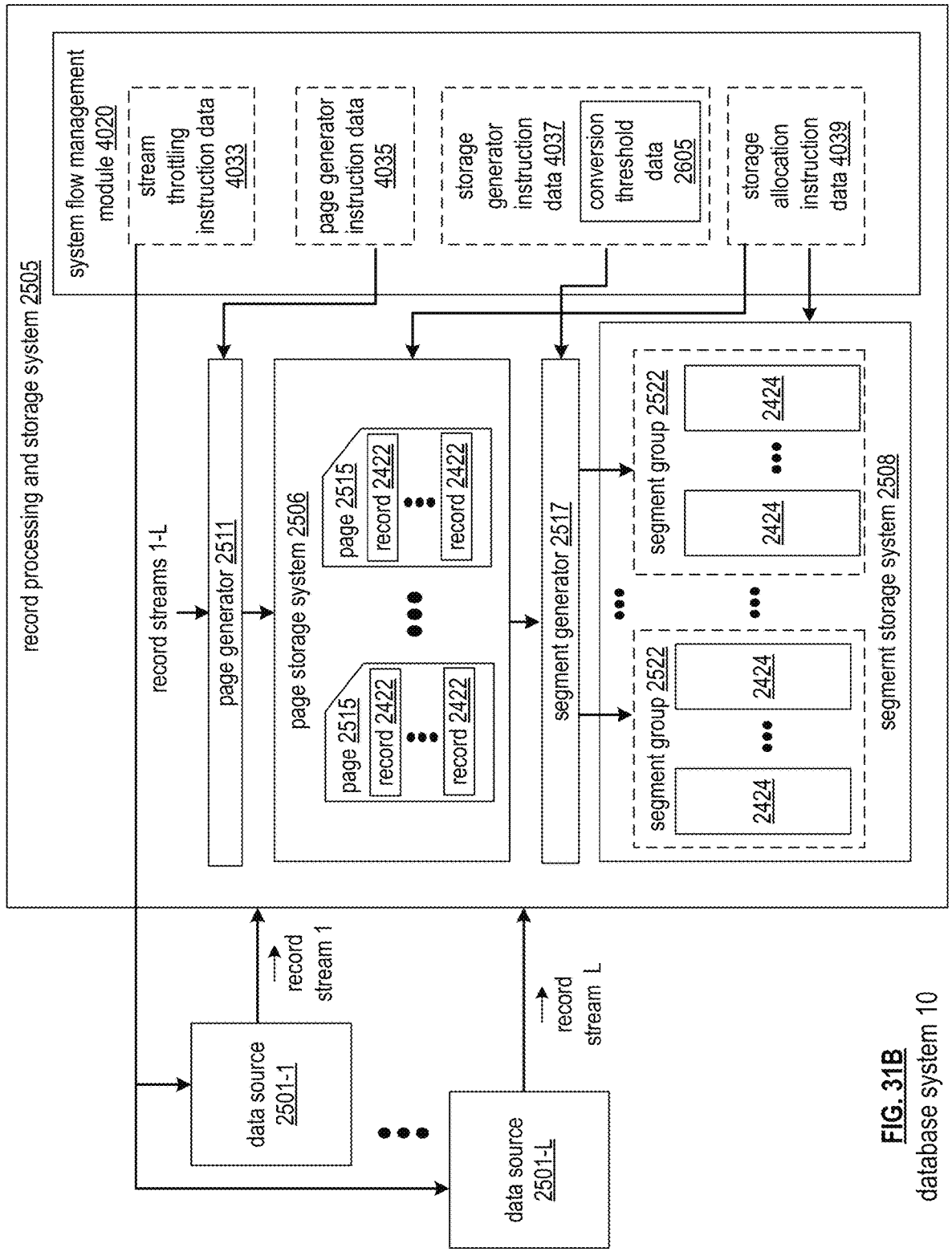

FIGS. 31A-31B illustrate embodiments of a record processing and storage system 2505 that is operable to monitor and manage system flow. In particular, more efficient allocation of resources and/or more efficient system flow of the record processing and storage system 2505 can be achieved based on determining various trends by tracking the loader and data stream over time. Some or all features and/or functionality of embodiments of the record processing and storage system 2505 described in conjunction FIGS. 31A-31B can be utilized to implement the record processing and storage system 2505 of FIG. 25A, the record processing and storage system 2505 of FIG. 25B, and/or any other embodiment of the record processing and storage system 2505 discussed herein.

As illustrated in FIG. 31A, the record processing and storage system 2505 can include a system flow management module 4020. The system flow management module 4020 can performs its functionality as described herein via at least one processor and/or at least one memory. For example, the system flow management module 4020 can be implemented via at least one computing device 18 of database system 10.

The system flow management module 4020 can include a performance tracking module 4010. The performance tracking module 4010 can track, measure, receive, and/or compute various metrics relating to performance of the record processing and storage system 2505 over time. These metrics can be collected and/or generated in predetermined intervals, in accordance with a schedule, in response to a command, based on a user configuration, in response to changes of the record processing and storage system, based on initiation of and/or performance of a conversion process performed upon a conversion page set 2655 as discussed in conjunction with of FIGS. 26A-26C, and/or based on another determination.

The metric collected by the performance tracking module 4010 can include one or more metrics relating to record streams 1-L. The performance tracking module 4010 can implement a stream tracking module 4012 that generates tracked stream data 4013 based on record streams 1-L and/or based on information received from and/or relating to one or more data sources 2501. For example, the tracked stream data 4013 can indicate incoming data rate measurements of record streams 1-L individually and/or collectively and/or can otherwise indicate other measurements relating to record streams 1-L.

The metrics collected by the performance tracking module 4010 can alternatively or additionally include one or more metrics relating to generation of pages via page generator 2511. The performance tracking module 4010 can implement a page generation tracking module 4014 that generates tracked page generation data 4015 based on performance of page generator 2511 and/or metrics relating to page generator 2511. For example, the tracked page generation data 4015 can indicate a rate at which pages are generated by page generator 2511, an amount of records included in pages generated by page generator 2511, metrics relating to deduplication of records in pages 2515, metrics relating to an amount of time to generate pages 2515, metrics relating to utilization, failures, and/or health of different processing and/or memory resources of the page generator 2511 such as one or more nodes 37 and/or one or more computing devices 18 of the page generator 2511, and/or other metrics relating to generation of pages.

The metrics collected by the performance tracking module 4010 can alternatively or additionally include one or more metrics relating to generation of segments via segment generator 2517. The performance tracking module 4010 can implement a segment generation tracking module 4016 that generates tracked segment generation data 4017 based on performance of segment generator 2511, based on performance of different conversion processes conducted over time as discussed in conjunction with FIG. 26B, and/or metrics relating to segment generator 2517. For example, the tracked segment generation data 4017 can indicate: amounts of time between conversion processes: numbers of pages in conversion page sets 2655 for different conversion processes: storage utilization data 2606 triggering different page conversion processes: metrics indicating levels of clustering achieved in different conversion processes: numbers of records included in generated segments: an amount of time to complete a given conversion process: metrics indicating performance of the cluster key-based grouping module 2620, columnar rotation module: and/or metadata generator module 2640 for different conversion processes: metrics relating to utilization, failures, and/or health of processing and/or memory resources of the segment generator 2517 such as one or more nodes 37 and/or one or more computing devices 18 of the segment generator 2517: and/or other metrics relating to generation of segments and/or performance of conversion processes.

The metrics collected by the performance tracking module 4010 can alternatively or additionally include one or more metrics relating to storage utilization of the record processing and storage system 2505. The performance tracking module 4010 can implement a storage utilization generation tracking module 4018 that generates tracked storage utilization data 4019 based on storage utilization of page storage system 2506 and/or segment storage system 2508. For example, the tracked storage utilization data 4019 can indicate: numbers of pages stored by the one or more memory resources of the page storage system 2506 at various times: numbers of segments stored by one or more memory resources of the segment storage system 2508 at various times: changes in storage utilization and/or memory availability of one or more memory resources of the page storage system 2506 at various times: changes in storage utilization and/or memory availability of one or more memory resources of the segment storage system 2508 at various times: failures and/or health of processing and/or memory resources of the page storage system 2506 such as one or more nodes 37 and/or one or more computing devices 18 utilized to implement the page storage system 2506: failures and/or health of processing and/or memory resources of the segment storage system 2508 such as one or more nodes 37 and/or one or more computing devices 18 utilized to implement the segment storage system 2508: and/or numbers of pages in conversion page sets 2655 for different conversion processes; and/or other metrics relating to storage utilization.

As illustrated in FIG. 31A, the tracked storage utilization data 4019 can optionally include and/or be based on the storage utilization data 2606 discussed in conjunction with FIG. 26A. The tracked storage utilization data 4019 can indicate any embodiment of the storage utilization data 2606 discussed herein. The tracked storage utilization data 4019 can include storage utilization data 2606 triggering different page conversion processes and/or can include storage utilization data 2606 collected at other various times that did not trigger page conversion processes. In some cases, all storage utilization data 2606 measured over time for use by the page conversion determination model 2610 as discussed in conjunction with FIG. 26A can be automatically collected via the performance tracking module 4010. In some cases, some or all storage utilization data 2606 measured over time for use by the page conversion determination model 2610 as discussed in conjunction with FIG. 26A can be generated by the performance tracking module 4010 and/or can be sent to the page conversion determination module 2610 by the performance tracking module 4010.

Some or all of various metrics generated and/or otherwise collected over time can be stored in at least one memory of the system flow management module 4020 for use by a performance analysis module 4021. For example, the system flow management module 4020 can store a plurality of tracked stream data 4013 collected over time, a plurality of tracked page generation data 4015 collected over time, a plurality of tracked segment generation data 4017 collected over time, and/or a plurality of tracked storage utilization data 4019 collected over time via at least one memory.

The performance analysis module 4021 can aggregate and/or perform analysis upon the various metrics collected by the performance tracking module 4010 over time to generate trend data relating to performance of the record processing and storage system 2505. This trend data can be collected and/or generated in predetermined intervals, in accordance with a schedule, in response to a command, based on a user configuration, in response to changes of the record processing and storage system, based on initiation of and/or performance of a conversion process performed upon a conversion page set 2655 as discussed in conjunction with of FIGS. 26A-26C, and/or based on another determination. This trend data can be generated utilizing all stored metrics collected over time and/or based on utilizing recently collected metrics, such as only metrics collected since most recent trend data was generated. This trend data can be generated based on generating and/or utilizing at least one statistical model and/or at least one supervised and/or unsupervised machine learning model. This trend data can optionally include aggregation data, prediction data and/or inference data generated based on metrics collected over time.

The trend data generated by performance analysis module 4021 can include trends relating to record streams 1-L. The performance tracking module 4010 can implement a stream trend generator module 4022 that generates stream trend data 4023 based on processing of and/or analysis performed upon tracked stream data 4013 collected over time. The stream trend data 4023 can indicate one or more statistical measures and/or models relating to record streams 1-L based on the tracked stream data 4013 collected over time, one or more predictions relating to record streams 1-L based on the tracked stream data 4013 collected over time, inference data relating to record streams 1-L based on the tracked stream data 4013 collected over time, and/or other trends relating to record streams 1-L based on the tracked stream data 4013 collected over time. The stream trend generator module 4022 can optionally generate the stream trend data 4023 additionally based on tracked page generation data 4015, tracked segment generation data 4017, and/or tracked storage utilization data 4019.

The trend data generated by performance analysis module 4021 can alternatively or additionally include trends relating to page generation. The performance tracking module 4010 can implement a page generation trend generator module 4024 that generates page generation trend data 4025 based on processing of and/or analysis performed upon tracked page generation data 4015 collected over time. The page generation trend data 4025 can indicate one or more statistical measures and/or models relating to page generation based on the tracked page generation data 4015 collected over time, one or more predictions relating to page generation based on the tracked page generation data 4015 collected over time, inference data relating to page generation based on the tracked page generation data 4015 collected over time, and/or other trends relating to page generation based on the tracked page generation data 4015 collected over time. The page generation trend generator module 4024 can optionally generate the page generation trend data 4025 additionally based on tracked stream data 4013, tracked segment generation data 4017, and/or tracked storage utilization data 4019.

The trend data generated by performance analysis module 4021 can alternatively or additionally include trends relating to segment generation. The performance tracking module 4010 can implement a segment generation trend generator module 4026 that generates segment generation trend data 4027 based on processing of and/or analysis performed upon tracked segment generation data 4017 collected over time. In particular, the segment generation trend data 4027 can optionally indicate clustering trend data 4052 indicating trends relating to levels of clustering achieved over time for various segments and/or various conversion processes as illustrated in FIG. 31A. The segment generation trend data 4027 can indicate one or more statistical measures and/or models relating to segment generation based on the tracked segment generation data 4017 collected over time, one or more predictions relating to segment generation based on the tracked segment generation data 4017 collected over time, inference data relating to segment generation based on the tracked segment generation data 4017 collected over time, and/or other trends relating to segment generation based on the tracked segment generation data 4017 collected over time. The segment generation trend generator module 4026 can optionally generate the segment generation trend data 4027 additionally based on tracked stream data 4013, tracked page generation data 4015, and/or tracked storage utilization data 4019.

The trend data generated by performance analysis module 4021 can alternatively or additionally include trends relating to storage utilization. The performance tracking module 4010 can implement a storage utilization trend generator module 4028 that generates storage utilization trend data 4029 based on processing of and/or analysis performed upon tracked storage utilization data 4019 collected over time. The storage utilization trend data 4029 can indicate one or more statistical measures and/or models relating to storage utilization based on the tracked storage utilization data 4019 collected over time, one or more predictions relating to storage utilization based on the tracked storage utilization data 4019 collected over time, inference data relating to storage utilization based on the tracked storage utilization data 4019 collected over time, and/or other trends relating to storage utilization based on the tracked storage utilization data 4019 collected over time. As a particular example, the storage utilization trend data 4029 can optionally indicate trends in storage utilization data 2606 based on the storage utilization data 2606 measured over time and/or the storage utilization data 2606 triggering various conversion processes of FIGS. 26A-26C. The storage utilization trend generator module 4028 can optionally generate the storage utilization trend data 4029 additionally based on tracked stream data 4013, tracked page generation data 4015, and/or tracked segment generation data 4017.

A system flow rebalancing module 4030 can receive and process the various trend data to rebalance performance of the record processing and storage system 2505. This can include generating various instruction data to rebalance performance of various functionality of the record processing and storage system 2505 as described herein at given times and/or in accordance with scheduled time. The various instruction data can be generated based on automatically processing, analyzing, and/or evaluating stream trend data 4023, page generation trend data 4025, segment generation trend data 4027, and/or storage utilization trend data 4029. The various instruction data can be generated based on performing an optimization algorithm and/or increasing efficiency of one or more functionalities of the record processing and storage system 2505. In some cases, the various instruction data can be generated to increase the levels of clustering attained in conversion processes performed on future conversion page sets 2655, for example, by increasing storage resources utilized by the page storage system 2506 to enable storage of more pages and/or by increasing processing resources utilized by the segment generator 2517 to enable more effective clustering algorithms be performed by cluster key-based grouping module 2620.

In some cases, the various instruction data can be generated based on predetermined system flow requirement data, for example, as illustrated in FIG. 31A. For example, the predetermined system flow requirement data can indicate requirements regarding: efficiency: amount of time to generate segments and/or pages: rate that records must be received and processed in to pages: levels of clustering that must be attained in segment generation: amount of time between conversion processes: and/or other requirements. In some cases, the predetermined system flow requirement data is received, is retrieved from memory, is configured via user input, is automatically generated, and/or is otherwise determined. In some cases, generating instruction data includes determining trend data indicates that one or more requirements of the predetermined system flow requirement data are not met, where the instruction data reallocates resources accordingly to meet these one or more requirements in future conversion processes and/or other operations of the record processing and storage system 2505 and/or causes the record processing and storage system 2505 to begin to meet these one or more requirements.

This can include automatically reassigning nodes 37 and/or computing devices 18 to different modules and/or functionality of record processing and storage system 2505 and/or can otherwise include reallocation of resources based on trend data. This can include automatically reassigning processing modules, such as one or more processing core resources 48 of one or more nodes 37. For example, this can include reassigning processing modules from generating pages via page generator 2511 to generating segments via segment generator 2517, or vice versa. This can include reassigning memory resources of the record processing and storage system 2505 from storage of pages in page storage system 2506 to storage of segments in segment storage system 2508, or vice versa.

The system flow rebalancing module can generate stream throttling instruction data 4033 based on the stream trend data 4023, the page generation trend data 4025, the segment generation trend data 4027, and/or the storage utilization trend data 4029. The stream throttling instruction data 4033 can indicate changes to allowed input rates of one or more record streams 1-L, such as lowering and/or raising of a threshold maximum data rate of one or more individual record streams 1-L and/or lowering and/or raising of a threshold maximum data rate of the record streams 1-L collectively. This may be based on determining the rate of page generation cannot meet the current input rates. This may be based on determining to reallocate resources to and/or from page generator 2511 in page generator instruction data 4035 that will cause the page generator 2511 to generate pages at a lower rate and/or higher rate. This may be based on determining a conversion process is about to initiate, where more resources of page generator 2511 will be instead allocated for segment generation. In some cases, the stream throttling instruction data can indicate a schedule, such as scheduled times to lower threshold maximum data rates in accordance with a scheduled time to perform a page conversion process. The stream throttling instruction data 4033 can indicate other instructions for use by data sources 1-L in their generation and/or sending of records.

The system flow rebalancing module 4030 can alternatively or additionally generate page generator instruction data 4035 based on the stream trend data 4023, the page generation trend data 4025, the segment generation trend data 4027, and/or the storage utilization trend data 4029. The page generator instruction data 4035 can indicate changes to resources allocated to the page generator 2511 and/or changes to operations and/or performance of the page generator. For example, more resources can be allocated to the page generator 2511 based on the stream trend data 4023 indicating and/or predicting increases in data input rates. This can include allocating more resources to the page generator 2511 at particular times based on the stream trend data 4023 indicating corresponding peak times with higher input data rates. As another example, resources of the page generator 2511 can be reallocated to the segment generator 2517, for example at a scheduled time and/or during conversion processes. As another example, more resources can be allocated to the page generator 2511 based on the page generation trend data 4025 indicating unfavorable performance of the page generator 2511, such as performance of the page generator 2511 that compares unfavorably to predetermined system flow requirement data.

The system flow rebalancing module 4030 can alternatively or additionally generate segment generator instruction data 4037 based on the stream trend data 4023, the page generation trend data 4025, the segment generation trend data 4027, and/or the storage utilization trend data 4029. The segment generator instruction data 4037 can indicate changes to resources allocated to the segment generator 2517 and/or changes to operations and/or performance of the segment generator 2517. For example, more resources can be allocated to the segment generator 2517 based on the segment generation trend data 4027 indicating unfavorable performance of the segment generator 2517, such as performance of the segment generator 2517 that compares unfavorably to predetermined system flow requirement data. As another example, more resources can be allocated to the segment generator 2517 particular times based on the segment generation trend data 4027 and/or the storage utilization data 2606 in the tracked storage utilization data 4019 indicating predicted times and/or cyclical trends relating to the amount of time between conversion processes and/or the time of the next conversion process, where more resources are segment generator 2517 based on a predicted and/or scheduled time of an upcoming conversion process. As another example, resources of the segment generator 2517 can be reallocated to the page generator 2511 based on a conversion process ending and/or based on predicting that the next conversion process will not occur for a while.

The system flow rebalancing module 4030 can alternatively or additionally generate storage allocation instruction data 4039 based on the stream trend data 4023, the page generation trend data 4025, the segment generation trend data 4027, and/or the storage utilization trend data 4029. The storage allocation instruction data 4039 can indicate changes to storage resources allocated to the segment storage system 2508 and/or the page storage system 2506. For example, resources can be reallocated to the page storage system 2506 from the segment storage system 2508 to increase the total capacity of page storage system 2506 to increase the size of future conversion page sets 2655 to attain more favorable levels of clustering, for example, based on the clustering trend data 4052 indicating and/or predicting unfavorable levels of clustering. As another example, resources can be reallocated to the segment storage system 2508 from the page storage system 2506 to increase the total capacity of segment storage system 2508 based on storage of greater numbers of segments being required as more data is received and converted for long term storage over time, and/or based on the need to rebuild segments due to failed memory drives.

In some cases, the system flow rebalancing module 4030 is operable to automatically generate and/or update the predetermined conversion threshold data 2605 utilized to trigger conversion processes as discussed in conjunction with FIGS. 26A-26C and/or to rebalance system resources to enable changes to the predetermined conversion threshold data 2605. This can be indicated in the segment generator instruction data 4037 as illustrated in FIG. 31A. The page conversion determination module 2610 of segment generator 2517 can utilize the most recently generated conversion threshold data 2605 in upcoming conversion processes.

For example, the conversion threshold data 2605 can be updated to reflect a greater number of pages must be collected to trigger the conversion process based on the clustering trend data 4052 indicating unfavorable trends in levels of clustering attained in previous conversion processes. For example, this can be based on the clustering trend data 4052 comparing unfavorably to the predetermined system flow requirement data. In such cases, the storage allocation instruction data 4039 can indicate a greater amount of storage resources be allocated for use by the page storage system 2506 to enable this required increase in number of records that must be stored by page storage system 2506. For example, the updated conversion threshold data 2605 can indicate and reflect this new, increased capacity of the page storage system 2506, where conversion is triggered once this greater storage capacity is reached.

As another example, the conversion threshold data 2605 can be updated to reflect lowered storage utilization will trigger the conversion process. This can be based on the storage utilization trend data 4029 indicating that the storage resources of the segment storage system 2508 are required to store segments, where the storage allocation instruction data 4039 indicates reallocation of storage resources of the page storage system 2506 for use by the segment storage system 2508 in response, thus lowering the capacity of page storage system 2506. This can alternatively be based on the storage utilization trend data 4029 indicating that the conversion threshold data 2605 indicates a minimum level of utilization that is too close to the maximum capacity of the page storage system 2506, for example based on not having enough of a buffer to accommodate the rate of page generation induced by the predicted and/or recent rate of incoming records indicated in the stream trend data 4023 and/or to further accommodate the amount of time to perform the conversion process before the conversion page set can be deleted to accommodate new pages based on recent and/or predicted amounts of time to perform the conversion process indicated in the segment generation trend data 4027. In such cases, the lowered storage utilization can be deemed acceptable, for example, based on the clustering trend data 4052 indicating that favorable levels of clustering will still be attained even with the lowered number of records that will be included in conversion page sets 2655.

As illustrated in FIG. 31B, the various instruction data generated by the system flow rebalancing module 4030 can be implemented by the record processing and storage system 2505. In particular, the stream throttling instruction data 4033 can be transmitted to corresponding data sources 2501-1-2501-L for implementation by some or all of the data sources 2501-1-2501-L. Alternatively or in addition, the page generator instruction data 4035 can sent to and/or can otherwise be accessible by the page generator 2511 for implementation by the page generator 2511. Alternatively or in addition, the segment generator instruction data 4037 can sent to and/or can otherwise be accessible by the segment generator 2517 for implementation by the segment generator 2517. Alternatively or in addition, the storage allocation instruction data 4039 can be sent to and/or can otherwise be accessible by the page storage system 2506 and/or the segment storage system 2508 for implementation by the page storage system 2506 and/or the segment storage system 2508. Alternatively or in addition, instruction data indicating reallocation of particular computing devices 18, nodes 37, and/or processing core resources 48 can be sent to, can be accessible by, and/or can otherwise be implemented by the particular computing devices 18, nodes 37, and/or processing core resources 48 accordingly.

Updates to the instruction data can be generated by the over time for implementation by the record processing and storage system 2505 accordingly. For example, as new tracked data is generated over time by the performance tracking module 4010, updated trend data is generated by the performance analysis module 4021 accordingly. The system flow rebalancing module 4030 can update and/or generate new instruction data based on changes to trend data over time. The corresponding changes in functionality of the record processing and storage system 2505 can be adapted accordingly as new instruction data is generated over time.

Figure 31C:
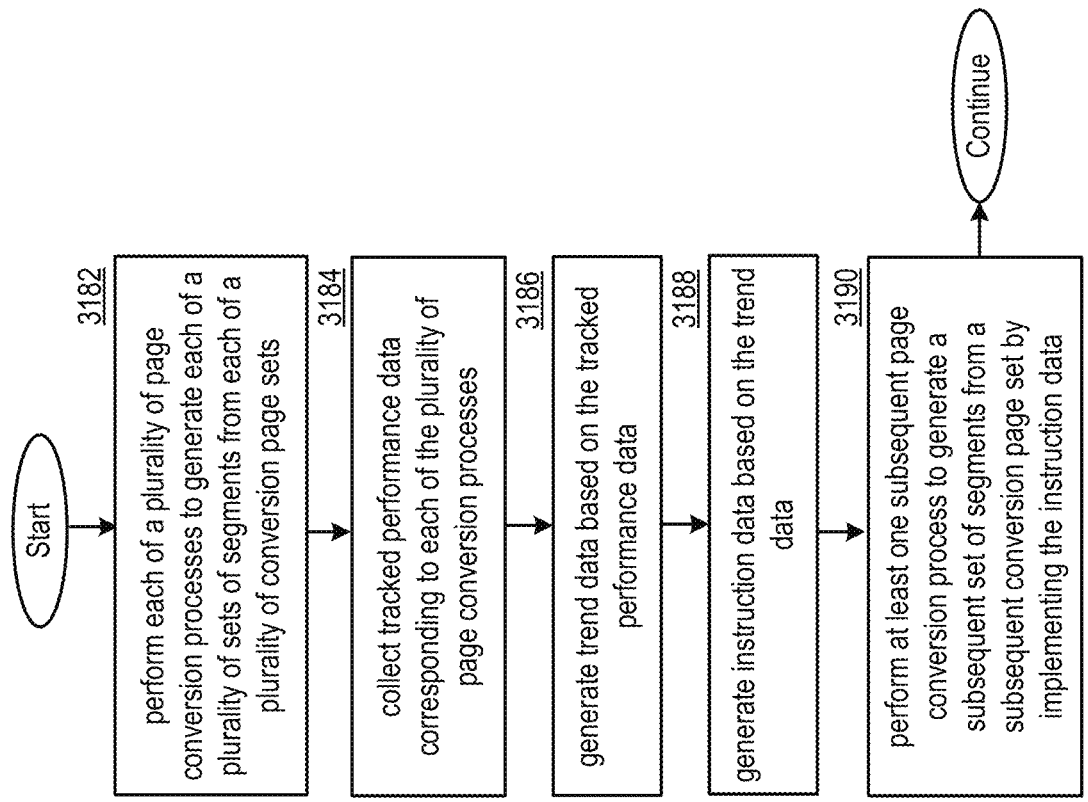
FIG. 31C is a logic diagram illustrating a method of managing system flow in accordance with various embodiments of the present invention.

FIG. 31C illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 31C. Some or all of the method of FIG. 31C can be performed by the record processing and storage system 2505 of FIGS. 31A-31B, for example, by utilizing the system flow management module 4020. Some or all of the method of FIG. 31C can be performed by utilizing the performance tracking module 4010, the performance analysis module 4021, and/or the system flow rebalancing module 4030 of FIGS. 31A-31B. Some or all of the steps of FIG. 31C can optionally be performed by any other processing module of the database system 10. Some or all of the steps of FIG. 31C can be performed to implement some or all of the functionality of the record processing and storage system 2505 of FIG. 25A. Some or all steps of FIG. 31C can be performed by database system 10 in accordance with other embodiments of the database system 10 and/or nodes 37 discussed herein.

Step 3182 includes performing each of a plurality of page conversion processes to generate each of a plurality of sets of segments from each of a plurality of conversion page sets. For example, each of a plurality of page conversion processes is performed by the segment generator 2517 upon conversion page set 2655 as discussed in conjunction with FIGS. 26A-26C, where the plurality of page conversion processes are performed in sequence over time as discussed in conjunction with FIG. 26B.

Step 3184 includes collecting tracked performance data corresponding to each of the plurality of page conversion processes, for example, by utilizing a performance tracking module 4010 of system flow management module 4020. The tracked performance data can optionally include tracked stream data 4013, tracked page generation data 4015, tracked segment generation data 4017, and/or tracked storage utilization data 4019 of FIG. 31A. The tracked performance data can optionally include the storage utilization data 2606 measured over time as discussed in conjunction with FIGS. 26A-26B.

Step 3186 includes generating trend data based on the tracked performance data, for example, by utilizing a performance analysis module 4021 of system flow management module 4020. The trend data can optionally include stream trend data 4023, page generation trend data 4025, segment generation trend data 4027, and/or storage utilization trend data 4029 of FIG. 31A. The trend data can optionally include clustering trend data 4052.

Step 3188 includes generating instruction data based on the trend data, for example, by utilizing system flow rebalancing module 4030 of system flow management module 4020. The instruction data can include stream throttling instruction data 4033, page generator instruction data 4035, segment generator instruction data 4037, and/or storage allocation instruction data 4039. The instruction data can optionally include an automatically generated and/or update to conversion threshold data 2605 of FIG. 26A.

Step 3190 includes performing at least one subsequent page conversion process to generate a subsequent set of segments from a subsequent conversion page set by implementing the instruction data. For example, changes in resource allocation and/or functionality can be implemented by the record processing and storage system 2505 based on applying and/or executing the instruction data. As a particular example, an automatically generated and/or update to conversion threshold data 2605 indicated in the instruction data can be applied by the page conversion determination module 2610 of segment generator 2517 in performing the at least one subsequent page conversion process as discussed in conjunction with FIG. 26A.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a record processing and storage system, comprising:
    receiving a set of records for storage, wherein the set of records are included in a plurality of pages stored by a page storage system, and wherein each page of the plurality of pages includes a plurality of records in the set of records;
    generating key value-based record distribution data for the set of records based on a plurality of cluster key values of the set of records;
    dividing a cluster key domain spanned by the plurality of cluster key values into a plurality of key space sub-intervals based on the key value-based record distribution data;
    segregating the set of records into a plurality of row subsets corresponding to the plurality of key space sub-intervals; and
    generating a plurality sets of segments by processing the plurality of row subsets in parallel.

2. The method of claim 1, further comprising:
    generating the plurality of pages; and
    determining to convert the plurality of pages into the plurality of records based on storage utilization data.

3. The method of claim 1, wherein segregating the set of records into the plurality of row subsets is based on:
    accessing each of the plurality of pages; and
    extracting ones of the plurality of records in the each of the plurality of pages having cluster key values included in a corresponding one of the plurality of key space sub-intervals for inclusion in a corresponding one of the plurality of row subsets.

4. The method of claim 1,
    wherein one plurality of records of one page of the plurality of pages includes:
        a first record having a first cluster key value included in a first one of the plurality of key space sub-intervals; and
        a second record having a second cluster key value included in a second one of the plurality of key space sub-intervals;
    wherein another plurality of records of another page of the plurality of pages includes:
        a third record having a third cluster key value included in the first one of the plurality of key space sub-intervals; and
        a fourth record having a fourth cluster key value included in the second one of the plurality of key space sub-intervals.

5. The method of claim 1, wherein the plurality of sets of segments are generated from the set of records via a plurality of processing core resources, wherein each processing core resource in the plurality of processing core resources generates a subset of the plurality of sets of segments by:
    identifying, via each processing core resource, a corresponding row subset of the plurality of row subsets based on corresponding to a key space sub-interval of the plurality of key space sub-intervals assigned to the each processing core resource; and
    generating, via the each processing core resource, the subset of the plurality of sets of segments to include ones of the set of records included in the corresponding row subset.

6. The method of claim 5, further comprising:
    determining a selected number of key space sub-intervals to be generated based on a number of processing core resources in the plurality of processing core resources:
    wherein the cluster key domain is segregated into the selected number of key space sub-intervals.

7. The method of claim 5, further comprising:
    determining a target number of records to be included in each row subset of the plurality of row subsets based on at least one of: a total number of records in the set of records, or a selected number of key space sub-intervals to be generated:
    wherein the cluster key domain is segregated into number of key space sub-intervals selected based on the target number of records.

8. The method of claim 1, wherein each the plurality of key space sub-intervals includes a corresponding one of a plurality of proper subsets of the plurality of cluster key values of the cluster key domain, wherein each of the plurality of proper subsets of the plurality of cluster key values are mutually exclusive and collectively exhaustive with respect to the plurality of cluster key values, and wherein each of the plurality of proper subsets of the plurality of cluster key values include sequential ones of the plurality of cluster key values in accordance with an ordering of the plurality of cluster key values.

9. The method of claim 8, wherein a first proper subset of the plurality of proper subsets includes a first number of cluster key values, and wherein a second proper subset of the plurality of proper subsets includes a second number of cluster key values that is different from the first number of cluster key values.

10. The method of claim 1, wherein generating the plurality of sets of segments from the set of records is based on accessing the set of records from storage in a row-based format, wherein each of the plurality of sets of segments are generated to include a corresponding subset of the set of records in a column-based format.

11. The method of claim 10, wherein generating the plurality of sets of segments from the set of records is further based on, for each row subset of the plurality of row subsets:
    generating a plurality of record groups from the each row subset based on cluster key values of records included in the each row subset:
    generating a set of column-formatted record data for each of the plurality of record groups; and
    generating a set of segments from each set of column-formatted record data.

12. The method of claim 11, wherein generating the set of segments from each set of column-formatted record data includes generating segment metadata for each set of segments.

13. The method of claim 11, wherein generating the set of segments from each set of column-formatted record data includes applying a redundancy storage error coding scheme to each set of column-formatted record data to generate a corresponding set of segments.

14. The method of claim 1, wherein the key value-based record distribution data is based on empirical data indicating a number of records in the set of records having each of the plurality of cluster key values.

15. The method of claim 1, wherein dividing the cluster key domain spanned by the plurality of cluster key values into the plurality of key space sub-intervals is based on recursively splitting intervals of the cluster key domain into two intervals until a plurality of intervals that includes a target number of intervals are created, wherein each of the plurality of key space sub-intervals corresponds to one of the plurality of intervals.

16. The method of claim 15, wherein a given interval is split into two corresponding intervals, wherein the two corresponding intervals includes a first corresponding interval and a second corresponding interval, wherein a first subset of records of the set of records have first corresponding cluster key values included in the first corresponding interval, wherein a second subset of records of the set of records have second corresponding cluster key values included in the second corresponding interval, and wherein splitting of the given interval into the two corresponding intervals is based on minimizing a difference between a first number of records included in the first subset of records and a second number of records included in the second subset of records.

17. The method of claim 15, wherein a given interval is split into two corresponding intervals, wherein the two corresponding intervals includes a first corresponding interval and a second corresponding interval, wherein the first corresponding interval of the cluster key domain includes a first subset of cluster keys of the cluster key domain, wherein the second corresponding interval of the cluster key domain includes a second subset of cluster keys of the cluster key domain, wherein the first subset of cluster keys and the second subset of cluster keys are mutually exclusive, wherein all cluster keys included in the first subset of cluster keys are strictly less than all cluster keys included in the second subset of cluster keys.

18. The method of claim 17, wherein an interval division value defines separation between the first corresponding interval and the second corresponding interval, and wherein performing the splitting of the given interval into the two corresponding intervals is based on selecting the interval division value as one of:

a highest possible cluster key value that renders a first number of records having first cluster keys included in the first corresponding interval as less than or equal to a second number of records having second cluster keys included in the second corresponding interval, or a lowest possible cluster key value that renders the first number of records having first cluster keys included in the first corresponding interval as greater than or equal to the second number of records having second cluster keys included in the second corresponding interval.

19. A record processing and storage system comprises:
at least one processor; and
a memory that stores operational instructions that, when executed by the at least one processor, cause the record processing and storage system to:
receive a set of records for storage, wherein the set of records are included in a plurality of pages stored by a page storage system, and wherein each page of the plurality of pages includes a plurality of records in the set of records;
generate key value-based record distribution data for the set of records based on a plurality of cluster key values of the set of records;
divide a cluster key domain spanned by the plurality of cluster key values into a plurality of key space sub-intervals based on the key value-based record distribution data;
segregate the set of records into a plurality of row subsets corresponding to the plurality of key space sub-intervals; and
generate a plurality sets of segments by processing the plurality of row subsets in parallel.

20. A non-transitory computer readable storage medium comprises:
at least one memory section that stores operational instructions that, when executed by a processing module that includes a processor and a memory, causes the processing module to:
receive a set of records for storage, wherein the set of records are included in a plurality of pages stored by a page storage system, and wherein each page of the plurality of pages includes a plurality of records in the set of records;
generate key value-based record distribution data for the set of records based on a plurality of cluster key values of the set of records;
divide a cluster key domain spanned by the plurality of cluster key values into a plurality of key space sub-intervals based on the key value-based record distribution data;
segregate the set of records into a plurality of row subsets corresponding to the plurality of key space sub-intervals; and
generate a plurality sets of segments by processing the plurality of row subsets in parallel.

* * * * *